United States Patent
Mitlin et al.

(10) Patent No.: US 7,110,467 B2
(45) Date of Patent: Sep. 19, 2006

(54) PERFORMANCE EVALUATION OF A G.DMT-COMPLIANT DIGITAL SUBSCRIBER LINE SYSTEM

(75) Inventors: Vlad Mitlin, San Diego, CA (US); Timothy F. Murphy, Ramona, CA (US)

(73) Assignee: 3Com Corporation, Marlborough, MA (US)

( * ) Notice: Subject to any disclaimer, the term of this patent is extended or adjusted under 35 U.S.C. 154(b) by 936 days.

(21) Appl. No.: 09/742,686

(22) Filed: Dec. 20, 2000

(65) Prior Publication Data

US 2002/0118766 A1  Aug. 29, 2002

Related U.S. Application Data

(60) Provisional application No. 60/239,811, filed on Oct. 12, 2000.

(51) Int. Cl.
*H04L 27/04* (2006.01)
*H04B 1/38* (2006.01)

(52) U.S. Cl. .................... 375/295; 375/222

(58) Field of Classification Search ............ 375/261, 375/233, 222, 295, 316; 370/252, 333; 714/774, 714/704, 755, 708
See application file for complete search history.

(56) References Cited

U.S. PATENT DOCUMENTS

| | | | |
|---|---|---|---|
| 5,479,447 A | | 12/1995 | Chow et al. |
| 5,511,079 A | * | 4/1996 | Dillon .................. 714/774 |
| 5,600,663 A | * | 2/1997 | Ayanoglu et al. .......... 714/774 |
| 5,699,365 A | * | 12/1997 | Klayman et al. .......... 714/708 |
| 5,699,369 A | * | 12/1997 | Guha ................... 714/774 |
| 5,852,633 A | | 12/1998 | Levin |
| 5,896,391 A | * | 4/1999 | Solheim et al. ............ 714/704 |
| 6,064,692 A | | 5/2000 | Chow |
| 6,072,779 A | | 6/2000 | Tzannes et al. |
| 6,075,821 A | | 6/2000 | Kao et al. |
| 6,088,390 A | * | 7/2000 | Russell et al. ............ 375/233 |
| 6,092,230 A | * | 7/2000 | Wood et al. ............. 714/755 |
| 6,101,223 A | * | 8/2000 | Betts ................... 375/261 |
| 6,128,763 A | * | 10/2000 | LoGalbo et al. ........... 714/774 |
| 6,130,882 A | * | 10/2000 | Levin .................. 370/252 |
| 6,163,766 A | * | 12/2000 | Kleider et al. ........... 704/229 |
| 2003/0066005 A1 | | 4/2003 | Iglesia et al. |

OTHER PUBLICATIONS

Numerical Recipes in C: The Art of Scientific Computing, Cambridge, MA, 1992, pp. 212-221.

D. Bertsekas et al, Data Networks, (©1992, Prentice Hall), pp. 64-86 and 149-240.

John A.C. Bingham, "Multicarrier Modulation for Data Transmission: An Idea Whose Time Has Come", IEEE Communications Magazine, May 1990, pp. 5-14.

(Continued)

*Primary Examiner*—Kenneth Vanderpuye
*Assistant Examiner*—Jason M. Perilla

(57) ABSTRACT

A method and apparatus selects forward error correction parameters in a channel having a plurality of subchannels in a multicarrier communications system. A signal-to-noise ratio representing a subset of the subchannels is determined. A number (s) of discrete multi-tone symbols in a forward-error-correction frame, a number (z) of forward-error-correction control symbols in the discrete multitone symbol associated with the signal-to-noise ratio, a number of subchannels associated with the signal-to-noise ratio, and a net coding gain for different values of s, z, signal-to-noise ratios and numbers of subchannels is stored in a table. Forward error correction parameters of the channel are selected based on the net coding gain by applying an approximation to a subset of values in the table.

51 Claims, 9 Drawing Sheets

OTHER PUBLICATIONS

Walter Y. Chen, DSL: Simulation Techniques and Standards Development for Digital Subscriber Line Systems, (©1998, MacMillan Technical Publishing), pp. 465, 11, and 119-121.

Peter S. Chow, "Bandwidth Optimized Digital Transmission Techniques for Spectrally Shaped Channels with Impulse Noise", Ph.D. thesis, Stanford University, May 1993, pp. ii-187.

Chow et al, "A Practical Discrete Multitone Transceiver Loading Algorithm for Data Transmission over Spectrally Shaped Channels", IEEE Transactions on Communications, vol. 43, No. 2/3/4, Feb./Mar./Apr. 1995, pp. 773-775.

N.G. de Bruijn, Asymptotic Methods in Analysis, (©1981, Dover Publications, Inc.), pp. 22-23.

F.J. MacWilliams et al, Chapter 10, Section 10, "Reed-Solomon and Justesen Codes —Decoding RS codes", The Theory of Error-Correcting Codes, (©1977, Elsevier Science), p. 306.

V.S. Mitlin, Nonlinear Dynamics of Reservoir Mixtures, (©1993, CRC Press), pp. 173-177.

J. Proakis, "Digital Communications", McGraw-Hill, New York, 1995, pp. 260-263, 278-282, 441, 464-67.

ITU Recommendation G.992.1:Asymmetric Digital Subscriber Line (ADSL) Transceivers, Geneva, 1999, pp. i-240.

ITU Recommendation G.992.2: Splitterless Asymmetric Digital Subscriber Line (ADSL) Transceivers, Geneva, 1999, pp. i-165.

* cited by examiner

PERFORMANCE EVALUATION OF A G.DMT-COMPLIANT DIGITAL SUBSCRIBER LINE SYSTEM

The present application claims priority to U.S. Provisional patent application Ser. No. 60/239,811 filed on Oct. 12, 2000, entitled "Performance Evaluation of Multicarrier Channels," by inventors Vlad Mitlin, Tim Murphy, Richard G. C. Williams, and A. Joseph Mueller, which is incorporated herein by reference in its entirety.

The present application is related to application Ser. No. 09/689,367 filed on Oct. 12, 2000, entitled "Method of Selecting Initialization Parameters for Multi-channel Data Communication with Forward Error Correction," by inventors Vlad Mitlin, Tim Murphy and Richard G. C. Williams, which is incorporated herein by reference in its entirety.

FIELD OF THE INVENTION

The present invention relates to multi-carrier data communications; and, more particularly, to evaluating the performance of multi-carrier channels to select transmission parameters comprising forward error correction (FEC) parameters in a G.dmt compliant transmission system.

BACKGROUND OF THE DISCLOSURE

Demand for digital subscriber line (DSL) service across existing twisted pair copper wires between a central office and a remote location is increasing. Typically, DSL services operate in accordance with DSL standards recommended by the Telecommunication Standardization Sector of the International Telecommunication Union (ITU). A family of DSL Recommendations from the ITU includes: G.992.1, G.992.2, G.991.1, G.996.1, G.994.1, G.997.1 and G.995.1. Recommendation G.995.1 provides an overview of these standards. Recommendations G.991.1, G.992.1, G.992.2 have developed techniques for transmitting a range of bit rates over the copper wires of the local network including high bit rates at relatively short distances, and lower bit rates at longer distances. In particular, the G.992.1 and G.992.2 recommendations are based on asymmetric digital subscriber line technology that has different data rates in each direction of transmission. The G.992.1 recommendation is referred to as G.dmt and requires a splitter, which filters the voicegrade signals at the remote location. The G.992.2 recommendation is referred to as G.lite and does not require a splitter. Recommendations G.994.1, G.996.1 and G.997.1 support the G.992.1 and G.992.2 recommendations by providing common handshake, management and testing procedures. These standards allow substantial flexibility in implementation.

Reed-Solomon encoding is a method of forward error correction used in DSL communications to detect and correct transmission errors, effectively increasing the signal-to-noise ratio of the communications channel. By encoding information, errors may be reduced without decreasing the data rate. In Reed-Solomon encoding, redundant symbols are added to information symbols to allow errors to be detected and corrected. As the number of redundant symbols increases, a greater level of noise may be tolerated. Among the transmission parameters to be selected in DSL communications are FEC parameters for Reed-Solomon encoding. The FEC parameters determine the amount of information data in an information field, and a number of redundancy symbols that are associated with the information field.

To initiate a DSL communication session, Reed-Solomon encoding parameters for forward error correction (FEC) are selected. During initialization, the channel is analyzed and FEC parameters are determined and exchanged. While the ITU recommendations proscribe protocols for initialization, the ITU recommendations do not describe how the ATU equipment at the central office (ATU-C) or the remote user location (ATU-R) should act on data produced by the channel analysis or how the ATUs should select FEC parameters. The recommendations set a bit error rate standard (BER) of $10^{-7}$, but provide no guidance on selection of FEC parameters to most effectively achieve that bit error rate. Therefore, a method and apparatus of selecting FEC parameters based on available channel analysis data is needed. The FEC parameters should also yield a target bit error rate. The method and apparatus should select FEC parameters in a G.dmt compliant transmission system.

SUMMARY OF THE INVENTION

A method and apparatus selects forward error correction parameters in a channel having a plurality of subchannels in a multicarrier communications system. A signal-to-noise ratio representing a subset of the subchannels is determined. A number (s) of discrete multi-tone symbols in a forward-error-correction frame, a number (z) of forward-error-correction control symbols in the discrete multitone symbol associated with the signal-to-noise ratio, a number of subchannels associated with the signal-to-noise ratio, and a net coding gain for different values of s, z, signal-to-noise ratios and numbers of subchannels is stored in a table. Forward error correction parameters of the channel are selected based on the net coding gain by applying an approximation to a subset of values in the table.

In particular, the method and apparatus are applied to a DSL system compliant with the G.dmt standard. A subset of the tables generated for the G.dmt may be used in a DSL system compliant with the G.lite standard.

In another aspect of the invention, a method and apparatus select forward error correction parameters while optimizing the bit load of a subchannel. Various relationships are presented which may be used to determine the optimum bit load per subchannel by selecting a maximum number of errors that can be corrected and a size of the information field of a frame.

BRIEF DESCRIPTION OF THE DRAWINGS

To facilitate understanding, identical reference numerals have been used, where possible, to designate identical elements that are common to some of the figures.

DETAILED DESCRIPTION OF THE PREFERRED EMBODIMENTS

Figure 1:
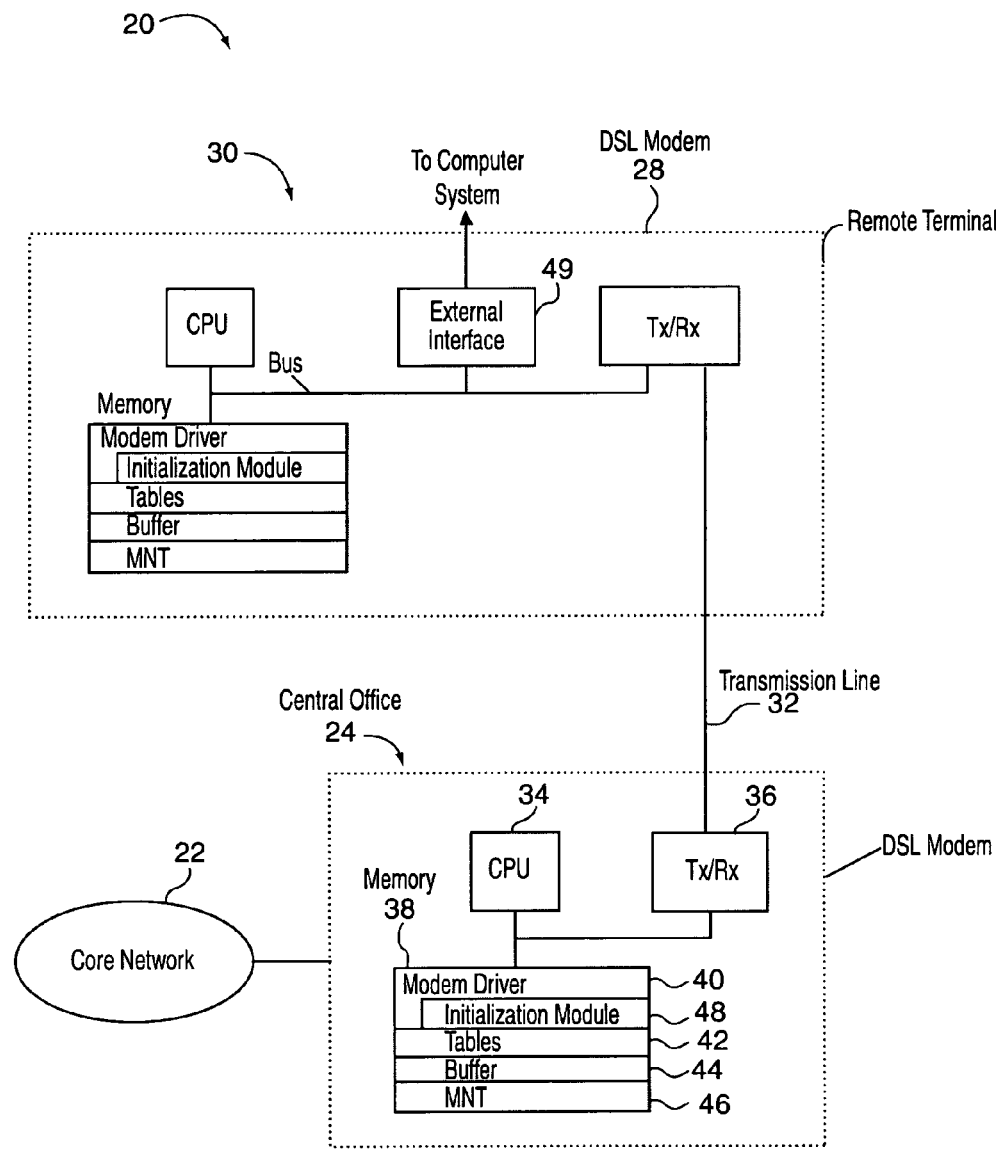
FIG. 1 is a block diagram of a digital subscriber line (DSL) modem at a central office, transmission line, and DSL modem at a remote terminal.

The following description has three sections. In section I, a method of determining forward error correction parameters in a discrete multi-tone system is described. Section I also describes the selection of forward error correction parameters in a discrete multi-tone system that uses ARQ. Section II describes the role of ARQ in further detail. In section III, optimal FEC parameters for G.dmt compliant asymmetric digital subscriber line systems (ADSL) are described.

I. Determining Forward Error Correction Parameters in a Discrete Multi-Tone System Referring to FIG. 1, a block diagram of an exemplary discrete multi-tone (DMT) communications system or channel 20 is shown. In one embodiment, the DMT communications system 20 is a DSL system. The DMT communications system 20 connects to a core network 22 at a central office 24. The core network 22 may include functions such as a concentrator, a switch and interfaces to broadband and narrowband networks. The DMT communications system 20 has a modem 26 at the central office 24 and a modem 28 at a remote terminal 30 that are interconnected by a transmission line 32. The modems 26, 28 implement a multicarrier transmission method in accordance with the present invention. The modem 26 at the central office 24 includes a processor (CPU) 34, a transmitter/receiver (Tx/Rx) 36, and a memory 38, which are interconnected by a bus 39. The memory 38 stores a modem driver procedure 40 that is executed by the processor 34, tables 42 in accordance with various embodiments of the present invention, a buffer 44 to store at least one frame of data for retransmission in certain embodiments if needed, and a maximum number of transmissions (MNT) value 46 when ARQ is used. At least a subset of the tables 42 store FEC parameters. The modem driver procedure 40 includes an initialization procedure 48 that generates the various tables of the present invention. In an alternate embodiment, the initialization procedure 48 is not executed once, but may be executed periodically to monitor the data, update the tables 42, and adjust the FEC parameters, if needed, during system operation. The memory 38 may be implemented using RAM or ROM, or a combination thereof. In an alternate embodiment, the modem driver procedure 40, and/or portions thereof, may be implemented in hardware, for example, using an application-specific integrated circuit (ASIC).

The modem 28 at the remote terminal 30 includes the same components as the modem 26 at the central office 24, and also includes an external interface 50 to connect to a computer system. The external interface 50 may be a PCI, internet, or USB interface. In an alternate embodiment, the modem 38 is internal to the computer system.

The communications channel uses a discrete multitone (DMT) signal to carry data downstream and upstream on the transmission line 32. The downstream direction is from the central office 24 to the remote terminal 30; and the upstream direction is from the remote terminal 30 to the central office 24. Typically, higher data rates are supported for transmitting data in the downstream direction than the upstream direction. The DMT signal comprises multiple subchannels, each of which is assigned a frequency belonging to a discrete frequency band. Because individual subchannels operate at different frequencies, the subchannels may have different operating characteristics. For instance, more power may be used at higher frequencies. Different numbers of bits may be loaded on different subchannels in accordance with their capacity, which depends on frequency, power, signal-to-noise ratio and other signal and transmission line characteristics.

In one embodiment, a method evaluates the performance of a DMT system that comprises FEC to select FEC parameters. In another embodiment, a method evaluates the performance of a DMT system that comprises both FEC and ARQ to select the FEC parameters and the maximum number of transmissions. These methods are based on general analytical results for quadrature amplitude modulation. More particularly, the signal transported by each subchannel is produced by a quadrature-amplitude-modulation (QAM) modem. The signals produced by different QAM modems are combined to provide the DMT symbol for transmission. As will be shown below, for not very poor quality DMT channels, DMT channel performance is equivalent to the performance of a single QAM modem with characteristics derived from an average taken over all, or alternately at least a subset of, subchannels. This reduces the complexity of evaluating the performance of the DMT channel.

In another embodiment, the method is applied to DSL systems compliant with the International Telecommunication Union (ITU) Recommendation G.992.2 standard. The G.992.2 standard specifies allowable sets of Reed-Solomon code parameters that are applied equally across all subchannels. The optimal coding parameters are found depending on the signal-to-noise ratio (SNR) distribution over the channel's frequency band and on the number of subchannels used. In an alternate embodiment, the present invention can be applied to any multi-carrier system.

In yet another embodiment, a relationship between the output error rate of the system and the coding parameters selected for a given channel error rate is determined. This relationship is used to determine a maximum number of bits supported by a DMT symbol. In another embodiment, a "mean-field approximation" is applied to reduce the complexity of selecting coding parameters. In another alternate embodiment, results for the optimization of a G.992.2-compliant modem are presented.

1. Analyzing Channel Performance

The performance of the channel will now be analyzed. Consider data transmission between two modems where a Reed-Solomon (RS) code is used for FEC in combination with a cyclic redundancy check (CRC). Data is transmitted in information frames. Each information frame of length N has an information field of a length of K RS symbols, a CRC field of a length of C symbols, and a redundancy field of a length of R symbols. The length of the redundancy field R determines a maximum number of symbol errors t that the Reed-Solomon code can correct. The channel introduces an error rate of $p_e$ into the RS symbols.

In this description, an information frame with t or fewer symbol errors will be corrected by FEC. An information frame with more than t symbol errors will pass through FEC with remaining errors. The CRC will then detect those errors and the frame will be retransmitted.

The probability p of an information frame being accepted by this scheme is:

$$p = \sum_{i=0}^{t} p_e^i (1-p_e)^{N-i} \binom{N}{i}, \quad (2.1)$$

and 1−p is the probability of an information frame being rejected and retransmitted.

The above definition can be generalized if erasures are used in the decoding procedure. If $e_r$ positions of supposedly unreliable RS symbols (erasures) are made known to the decoder then a direct consideration of the Reed-Solomon decoding procedure, yields the following expression for t, the maximum number of errors that can be corrected by FEC with redundancy R:

$$t = \left\lfloor \frac{R+1+e_r}{2} \right\rfloor \quad (2.2)$$

The number of erasures cannot exceed the length of the redundancy field R, i.e., $e_r \leq R$. It follows from Equation (2.2) that R is the maximum number of errors corrected by introducing erasures (reached at $e_r=R$); and $R=e_r=0$ in the uncoded case.

The fraction of erroneous RS symbols in the output stream after all detection, correction and retransmission is performed, the "(RS) symbol error rate" (SER), can be estimated using Equations (2.1) and (2.2). An information frame at the receiver has errors only if the information frame has not passed through FEC and CRC, without error, after k transmissions. An information frame with a number of errors i greater than the maximum number of correctable errors t will be encountered in the output stream with probability qi in accordance with the following equation:

$$q_i = (1-p)^{k-1} p_e^i (1-p_e)^{N-i} \binom{N}{i}. \quad (2.3)$$

Equation (2.3) means that more than t errors were found in the frame in each of the first k−1 transmissions, and i>t errors were found after the last transmission allowed. The rest of the output stream is error-free. Thus the SER is determined in accordance with the following relationship:

$$SER = \frac{1}{N} \sum_{i=t+1}^{N} i q_i = \quad (2.4)$$

$$\left[ \sum_{i=t+1}^{N} p_e^i (1-p_e)^{N-i} \binom{N-1}{i-1} \right] \left[ \sum_{i=t+1}^{N} p_e^i (1-p_e)^{N-i} \binom{N}{i} \right]^{k-1}$$

In Equation (2.4), the maximum number of correctable errors t is determined by Equation (2.2) which accounts for the possible use of erasures in the decoding scheme. The SER tends to zero when the maximum number of transmissions k is large. When information frames are transmitted once, the maximum number of transmissions k is equal to 1, and the SER is determined in accordance with the following equation:

$$SER = \sum_{i=t+1}^{N} p_e^i (1-p_e)^{N-i} \binom{N-1}{i-1} \quad (2.5)$$

Another useful parameter is the average number of transmissions v for a frame to reach the output stream. The average number of transmissions v can be expressed in accordance with the following relationship:

$$v = 1 \cdot p + 2 \cdot p(1-p) + \ldots + k \cdot p(1-p)^{k-1} + k \cdot (1-p)^k \quad (2.6)$$

Equation (2.6) means that a frame either is good after FEC at the first, or the second, or the $(k-1)^{th}$ transmission, or the frame is acknowledged to be non-correctable at the $k^{th}$ transmission and is still passed to the output stream. Summing the series of Equation (2.6) yields the following relationship for the average number of transmissions v.

$$v = \frac{1-(kp+1)(1-p)^k}{p} + k(1-p)^k = \frac{1-(1-p)^k}{p} \quad (2.7)$$

Using Equation (2.7), the average number of transmissions v is equal to 1 when the maximum number of transmissions k is equal to 1.

2. Determination of the Uncoded SER from the SER After FEC and ARQ

If ε represents a specified BER level for the data at the output of the receiver after demodulation and applying error control, then the SER level $\epsilon_s$ is determined in accordance with the following relationship:

$$\varepsilon_S = 1 - \left(1 - \frac{\varepsilon}{\beta}\right)^\alpha \quad (3.1)$$

where α is the number of bits per RS symbol, and the coefficient β accounts for the effect of a descrambler. For a scrambler polynomial with $m_{scr}$ nonzero coefficients, the coefficient β is approximately equal to the number of nonzero coefficients $m_{scr}$ ($\beta \sim m_{scr}$). Typically, the number of bits per RS symbol α is equal to eight, and the specified SER level $\epsilon_s$ is equal to $10^{-7}$. The SER determined in the previous section (Equations (2.4) and (2.5)) depends on the channel symbol error rate, $p_e$. In this section, this dependency will be inverted, i.e., the channel symbol error rate $p_e$ will be presented in the form of a function of the SER after FEC and ARQ. First the channel symbol error rate $p_e$ is determined in the case of no ARQ. At the SER level of $\epsilon_s$, $$SER(t,K,p_e(t,K)) = \epsilon_s \ll 1 \quad (3.2)$$

Using Equation (2.5), Equation (3.2) can be rewritten as follows:

$$\varepsilon_S^{1/(t+1)} = \frac{p_e}{w(p_e)} \quad (3.3)$$

$$w(p_e) = \left[\sum_{i=t+1}^{N} p_e^{i-t-1}(1-p_e)^{N-i}\binom{N-1}{i-1}\right]^{-1/(t+1)} \quad (3.4)$$

Applying the Burmann-Lagrange method to Equation (3.3) yields the following equation for the channel symbol error rate $p_e$:

$$p_e = W(t,K)\epsilon_s^{1/(t+1)} + O(\epsilon_s^{2/(t+1)}), \quad W(t,K)=w(0) \quad (3.5)$$

Since $$N = K + C + R \quad (3.6)$$

Equation (3.4) can be rewritten as follows:

$$W(t, K) = \left[\binom{K+C+R-1}{t}\right]^{-1/(t+1)} \quad (3.7)$$

When ARQ is considered, Equation (3.3) has the following form (compare to Equation (2.4)):

$$\varepsilon_S = p_e^{(t+1)k}\left[\sum_{i=t+1}^{N} p_e^{i-t-1}(1-p_e)^{N-i}\binom{N-1}{i-1}\right]\left[\sum_{i=t+1}^{N} p_e^{i-t-1}(1-p_e)^{N-i}\binom{N}{i}\right]^{k-1} \quad (3.8)$$

Equation (3.8) can be reduced to the following form:

$$\frac{1}{\varepsilon_S^{(t+1)k}} = \frac{p_e}{w(p_e)}, \quad (3.9)$$

where $$w(p_e) = \left[\sum_{i=t+1}^{N} p_e^{i-t-1}(1-p_e)^{N-i}\binom{N-1}{i-1}\right]^{\frac{1}{(t+1)k}}\left[\sum_{i=t+1}^{N} p_e^{i-t-1}(1-p_e)^{N-i}\binom{N}{i}\right]^{\frac{k-1}{(t+1)k}} \quad (3.10)$$

The solution of Equation (3.9) is:

$$p_e = W(t, K, k)\varepsilon_S^{\frac{1}{(t+1)k}} + O\left(\varepsilon_S^{\frac{2}{(t+1)k}}\right), \quad (3.11)$$

$$W(t, K, k) = w(0)$$

$$W(t, K, k) = \left[\binom{K+C+R-1}{t}\right]^{\frac{1}{(t+1)k}}\left[\binom{K+C+R}{t+1}\right]^{\frac{k-1}{(t+1)k}} \quad (3.12)$$

When a frame is transmitted once (k=1), Equation (3.12) reduces to the form of Equation (3.7).

The uncoded bit error rate $p_b$ corresponding to the channel symbol error rate $p_e$ is found in accordance with the following relationship:

$$p_e = 1 - (1-p_b)^\alpha \quad (3.13)$$

that, when combined with Equation (3.11), yields the following equation:

$$p_b = 1 - (1-p_e)^{1/\alpha} = 1 - \left(1 - W(t,K,k)\varepsilon_S^{\frac{1}{(t+1)k}}\right)^{1/\alpha} \quad (3.14)$$

The average number of transmissions v that was calculated in the previous section could also be evaluated using the approach presented above. The probability p of an information frame being accepted, defined in Equation (2.1), can be represented as follows:

$$p = \sum_{i=0}^{t} p_e^i(1-p_e)^{N-i}\binom{N}{i} = 1 - p_e^{t+1}\sum_{i=t+1}^{N} p_e^{i-t-1}(1-p_e)^{N-i}\binom{N}{i} \quad (3.15)$$

Combining Equation (3.15) with Equations (3.11), (3.12), and (3.6) yields:

$$P = 1 - W^{t+1}(t, K, k)\varepsilon_S^{1/k}\binom{K+c+R}{t+1}\left[1 + O\left(\varepsilon_S^{\frac{1}{(t+1)k}}\right)\right] = \quad (3.16)$$

$$1 - \left[\frac{K+c+R}{t+1}\varepsilon_S\right]^{\frac{1}{k}}$$

Introducing Equation (3.16) into Equation (2.7) yields the following relationship for the average number of transmissions v:

$$v = \left(1 - \frac{K+C+R}{t+1}\varepsilon_s\right) \Big/ \left[1 - \left(\frac{K+C+R}{t+1}\varepsilon_s\right)^{1/k}\right] \quad (3.17)$$

The Burmann-Lagrange method allows higher-order terms in Equation (3.5) to be obtained. For instance, in the case when the maximum number of transmissions k is equal to 1 (k=1), the channel symbol error rate $p_e$ can be represented as follows:

$$p_e = \quad (3.18)$$

$$W(t, K)\varepsilon_S^{1/(t+1)} - \frac{K+C+R-t-1}{(t+1)^2}W^2(t,K)\varepsilon_S^{2/(t+1)} + O(\varepsilon_S^{3/(t+1)}),$$

$$W(t, K) = w(0)$$

In simulations, applying the second-order correction of Equation (3.18) for typical G.992.2 parameters yielded no more than a 1% change in the channel symbol error rate $p_e$. Thus, at least the second-order and higher terms can be neglected when finding the channel symbol error rate $p_e$ in this embodiment. In an alternate embodiment, the second-order term is not neglected, but higher order terms may be neglected.

The behavior of the channel symbol error rate $p_e$ at large values of the maximum number of transmissions k is discussed in more detail below in subsection 9 of this section.

3. QAM Symbol Error Versus Bit Error

In multicarrier systems, the digital information is transformed by the modem into an analog form that is a sequence of DMT symbols. A DMT symbol is different from a RS symbol, and may comprise RS symbols. Generally, a DMT symbol comprises a number of bits that are loaded on all, or at least a predefined subset, of the subchannels in one direction during one transmission interval. One second of a DMT symbol may include an average of about 4,000 data carrying DMT symbol transmission intervals. Typically, in a DMT frame, 68 data carrying DMT symbols are followed by a synchronization symbol.

Each DMT symbol bears information in the form of an array of zeroes and ones, comprising several $b_i$-sized sub-arrays. In a DMT symbol, each sub-array is associated with a subchannel, and corresponds to a QAM waveform representing a $2^{b_i}$-point constellation. The DMT symbol waveform is the superposition of these QAM waveforms. The channel itself is characterized by a set of signal-to-noise ratios $\{\gamma_i\}$, where $\gamma_i$ is the signal-to-noise ratio at the $i^{th}$ carrier frequency, i.e., associated with the $i^{th}$ subchannel. Although most DMT implementations constrain each $b_i$ to be an integer, theoretically, there is no need for this restriction. However, in practice, each DMT symbol carries an integer number of bits.

Assuming that equal error protection is applied, the number of bits associated with the $i^{th}$ subchannel $b_i$ is determined as follows: for each subchannel, the bit error rate does not exceed the BER level prior to decoding and retransmission $p_b$. However, the standard QAM error determination procedure yields the QAM symbol error rate rather than the bit error rate required.

An average fraction of erroneous bits in an erroneous $b_i$-sized QAM symbol is represented as $\omega(\gamma_i, b_i)$. If $p_{QAM}(\gamma_i, b_i)$ is the QAM symbol error rate, the bit error rate, for this QAM symbol, is equal to $p_{QAM}(\gamma_i, b_i)\omega(\gamma_i, b_i)$. In a multicarrier system, for each subchannel, the following relationship holds:

$$p_{QAM}(\gamma_i, b_i)\omega(\gamma_i, b_i) \leq p_b, \quad (4.1)$$

where $p_b$ is given by Equation (3.14). To improve performance, the number of bits associated with the $i^{th}$ subchannel $b_i$ should maximize the left hand side of Equation (4.1).

An expression for the average fraction of erroneous bits as a function of the signal-to-noise ratio and the number of bits per subchannel $\omega(\gamma_i, b_i)$ will now be determined. The problem is formulated as follows: assuming that a b-sized subchannel is in error, determine the average fraction of bits in error in such a subchannel, $\omega(\gamma, b)$. In one embodiment, the average fraction of erroneous bits $\omega(\gamma, b)$ is determined at a sufficiently large signal-to-noise ratio (i.e., far enough from the channel capacity value). In this case, the average fraction of erroneous bits $\omega(\gamma, b)$ is essentially independent of the signal-to-noise ratio $\gamma$, and computing the average fraction of erroneous bits $\omega(b)$ is geometrical, as described below.

Figure 2:
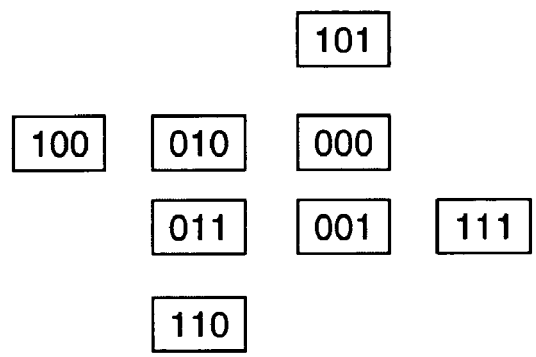
FIG. 2 depicts an eight-point G.992.2 signal constellation.

Referring to FIG. 2, an 8-point G.992.2 constellation is shown. Consider an arbitrary $2^b$ signal constellation on a square lattice, for example, in FIG. 2, b is equal to three. Let $a_i$ be the binary representation of the label for the $i^{th}$ point of the constellation. Let $\chi_i$ represent the coordination number of the $i^{th}$ point, i.e., the total number of its nearest neighbors in the constellation. In FIG. 2, the coordination number is equal to 3 for each of the four internal points and is equal to 1 for each of the four external points of this constellation. The average fraction of erroneous bits $\omega(b)$ is determined in accordance with the following relationship:

$$\omega(b) = \frac{1}{b \cdot 2^b} \sum_{i=1}^{2^b} \sum_{j \neq i}^{\chi_i} \frac{d_H(a_i, a_j)}{\chi_i} \quad (4.2)$$

Here $d_H(\bullet, \bullet)$ is the Hamming distance between two binary vectors, and the innermost summation in Equation (4.2) is performed over the nearest neighbors of the point i.

In one embodiment, for the first few values of b, computing the average fraction of erroneous bits $\omega(b)$ can be performed manually. In an alternate embodiment, computing the average fraction of erroneous bits $\omega(b)$ is performed by a processor. Table 1, below, shows some values for constellations used in the G.992.2 standard. Results obtained using Equation (4.2) are compared with the results of direct numerical simulations of data transmission in a single QAM channel.

TABLE 1

Values of $\omega(b)$ at $b \leq 6$.

| b | $\omega(b)$ (Equation (4.2)) | $\omega(b)$ (simulations) | Error between Equation (4.2) and simulations (%) |
|---|---|---|---|
| 1 | 1 | 1.0000 | 0 |
| 2 | 0.5 | 0.5000 | 0 |
| 3 | 0.528 | 0.5157 | 2.3 |
| 4 | 0.323 | 0.3394 | 5.0 |
| 5 | 0.358 | 0.3601 | 0.8 |
| 6 | 0.256 | 0.2538 | 0.9 |

Figure 3:
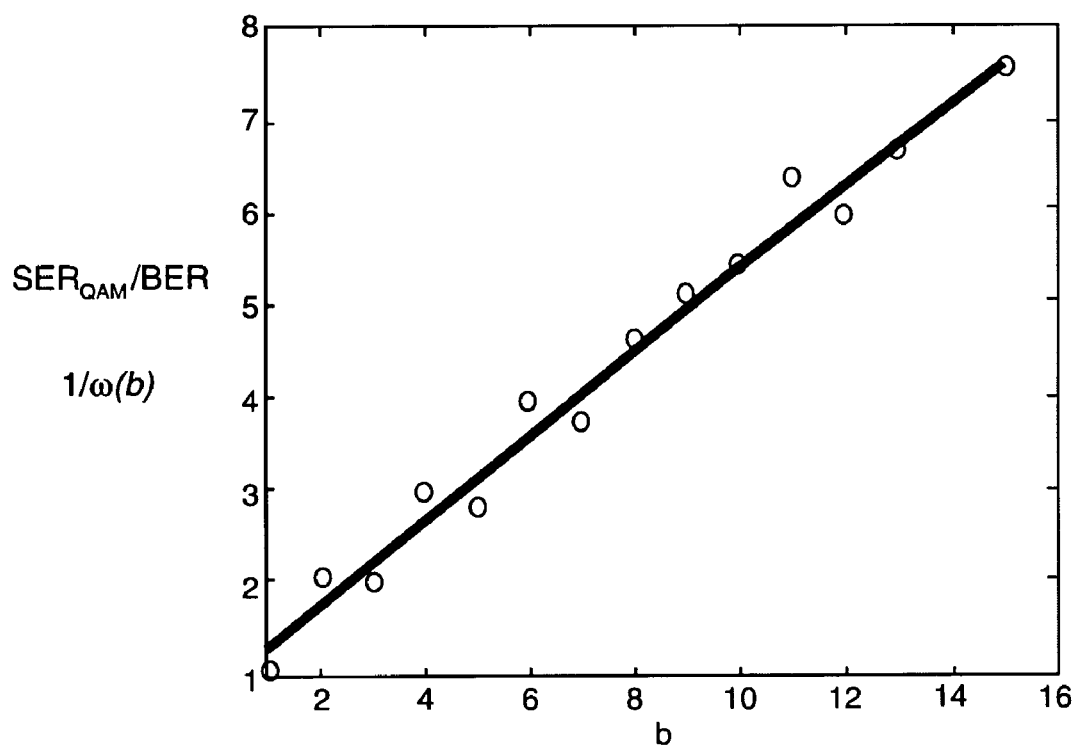
FIG. 3 depicts the $1/\omega(b)$ dependence determined from numerical simulations.

Referring to FIG. 3, numerical simulations show that for G.992.2 constellations, $1/\omega(b)$ is well approximated by a linear function. Linear regression analysis of the $1/\omega(b)$ data yielded the following relationship:

$$1/\omega(b) = 0.46b + 0.83 \quad (4.3)$$

Figure 4:
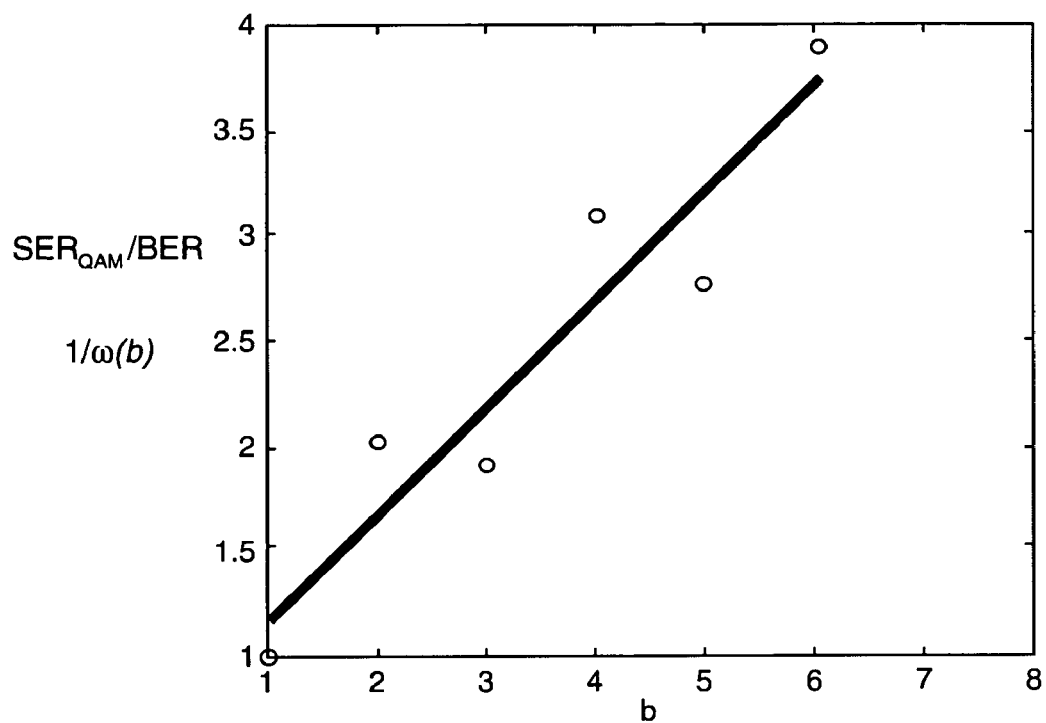
FIG. 4 depicts the $1/\omega(b)$ dependence determined from a method in accordance with an embodiment of a method of the present invention.

FIG. 4 shows a graph of $1/\omega(b)$ computed using Equation (4.2) for G992.2 constellations. Linear regression analysis of $1/\omega b$ computed with Equation (4.2) yielded the following relationship:

$$1/\omega(b) = 0.52b + 0.64 \quad (4.4)$$

In both cases the average fraction of erroneous bits $\omega(b)$ is approximately equal to 2/b at large b. The small difference between the two cases is attributable to the effect of non-nearest neighbors.

Based on the above consideration, in another embodiment, the following correlation is used to approximate $1/\omega(b)$:

$$1/\omega(b) = (2b+3)/4 \quad (4.5)$$

Equation (4.5) provides the asymptotic behavior observed above (i.e., the average fraction of erroneous bits $\omega(b) \sim 2/b$ at large values of b). The choice of the free term in the numerator on the right hand side of Equation (4.5) yields, among all $1/\omega(b)$ correlations of the kind of Equations (4.3) or (4.4), the best representation of $1/\omega(b)$ simultaneously at $b=1$ and $b=2$.

4. The Bit Load Equation

A relationship for determining the bit load of a subchannel as a function of at least a subset of forward error correction parameters will now be described. Considering the DMT symbol as the superposition of n QAM waveforms, the size of a DMT symbol in bits $B_{DMT}$ is determined in accordance with the following relationship:

$$B_{DMT} = \sum_{i=1}^{n} b_i \tag{5.1}$$

The expression for the QAM symbol error rate, $p_{QAM}$, is determined as follows:

$$p_{QAM}(b_i,\gamma_i)=1-[1-(1-2^{-b_i/2})\mathrm{erfc}(\sqrt{3 \cdot 10^{\gamma_i/10}/(2^{b_i+1}-2)})]^2 \tag{5.2}$$

where $\gamma_i$ is the signal-to-noise ratio of the QAM waveform in the $i^{th}$ subchannel. The uncoded bit error rate $p_b$ is determined in accordance with the following relationship:

$$p_b = p_{QAM}(b_i,\gamma_i)\omega(b_i) = \omega(b_i)(1-2^{-b_i/2})\mathrm{erfc}$$
$$(\sqrt{3 \cdot 10^{\gamma_i/10}/(2^{b_i+1}-2)})[2-(1-2^{-b_i/2})\mathrm{erfc}$$
$$(\sqrt{3 \cdot 10^{\gamma_i/10}/(2^{b_i+1}-2)})] \tag{5.3}$$

Equating the uncoded bit error rate $p_b$, as defined in Equation (5.3), and the bit error rate found from Equation (3.14) yields the following equation for determining the optimum bit load per subchannel in a system with FEC:

$$1-\left(1-W(t,K)\varepsilon_S^{\frac{1}{t+1}}\right)^{1/\alpha} = \tag{5.4}$$
$$\omega(b_i(t,K))(1-2^{-b_i(t,K)/2})\mathrm{erfc}\left(\sqrt{3 \cdot 10^{\gamma_i/10}/(2^{b_i(t,K)+1}-2)}\right) \times$$
$$\left[2-(1-2^{-b_i(t,K)/2})\mathrm{erfc}\left(\sqrt{3 \cdot 10^{\gamma_i/10}/(2^{b_i(t,K)+1}-2)}\right)\right]$$

To determine the optimum bit load, Equation (5.4) is solved numerically for values of t and K. Likewise, in a system with ARQ as well as EEC, the optimum bit load per subchannel is determined in accordance with the following equation:

$$1-\left(1-W(t,K,k)\varepsilon_S^{\frac{1}{(t+1)k}}\right)^{1/\alpha} = \tag{5.5}$$
$$\omega(b_i(t,K,k))(1-2^{-b_i(t,K,k)/2})\mathrm{erfc}\left(\sqrt{3 \cdot 10^{\gamma_i/10}/(2^{b_i(t,K,k)+1}-2)}\right) \times$$
$$\left[2-(1-2^{-b_i(t,K,k)/2})\mathrm{erfc}\left(\sqrt{3 \cdot 10^{\gamma_i/10}/(2^{b_i(t,K,k)+1}-2)}\right)\right]$$

The net coding gain $G_n$ in bits/DMT symbol (the excess information transferred in one DMT symbol due to FEC) is determined in accordance with the following relationship:

$$G_n(t,K) \equiv \frac{K}{K+C+R}B_{DMT}(t,K) - \frac{K}{K+C}B_{DMT}(0,K) \tag{5.6}$$

Equation (5.6) takes the FEC redundancy into account. The G.992.2 standard calls for the channel data rate to be transferred. Therefore the line coding gain $G_l$, that is, the total increase in the number of bits to be sent, is determined in accordance with the following relationship:

$$G_l(t,K) \equiv B_{DMT}(t,K) - B_{DMT}(0,K) \tag{5.7}$$

Equations (5.6) and (5.7) are modified when ARQ is applied. When ARQ is applied, $B_{DMT}(t,K,k)$ is used rather than $B_{DMT}(t,K)$; and $B_{DMT}(t,K,k)$ is divided by the average number of transmissions v defined in Equations (2.7) and (3.17). The role of ARQ will be discussed below in section II, together with the quantitative analysis of the performance of an embodiment of a DMT system with ARQ. In one embodiment, since the procedure described yields fractional values for $b_i$, an additional adjustment is applied. Such adjustment replaces the obtained $b_i$ values by their integer parts $\lfloor b_i \rfloor$. Then a re-distribution of excess in $b_i$ over all subchannels is performed.

5. 'Mean-Field Approximation' for Performance Evaluation of Multicarrier Channels In another embodiment, a "mean-field approximation" for the number of bits of a DMT symbol in a channel is applied. The mean-field approximation is in accordance with Equation (6.1) as follows:

$$B_{DMT} = \sum_{i=1}^{n} b(\gamma_i) \approx n_{eff} b(\gamma_{eff}). \tag{6.1}$$

The effective number of subchannels is represented by $n_{eff}$, the effective signal-to-noise ratio for the channel is represented by $\gamma_{eff}$, and the effective number of bits per subchannel is represented by $b(\gamma_{eff})$. The mean-field approximation reduces the complexity of the channel performance evaluation. In Equation (6.1), the effective number of subchannels $n_{eff}$ and the effective signal-to-noise ratio $\gamma_{eff}$ are respectively determined in accordance with the following relationships:

$$n_{eff} = \sum_{\gamma_i > \gamma^*} 1, \text{ and} \tag{6.2}$$

$$\gamma_{eff} = \frac{1}{n_{eff}} \sum_{\gamma_i > \gamma^*} \gamma_i, \tag{6.3}$$

where $\gamma^*$ is the threshold signal-to-noise ratio below which no information is passed through the channel. Therefore, if the signal-to-noise ratio of a subchannel does not exceed a predetermined threshold value $\gamma^*$ for the channel, that subchannel is not used.

Figure 5:
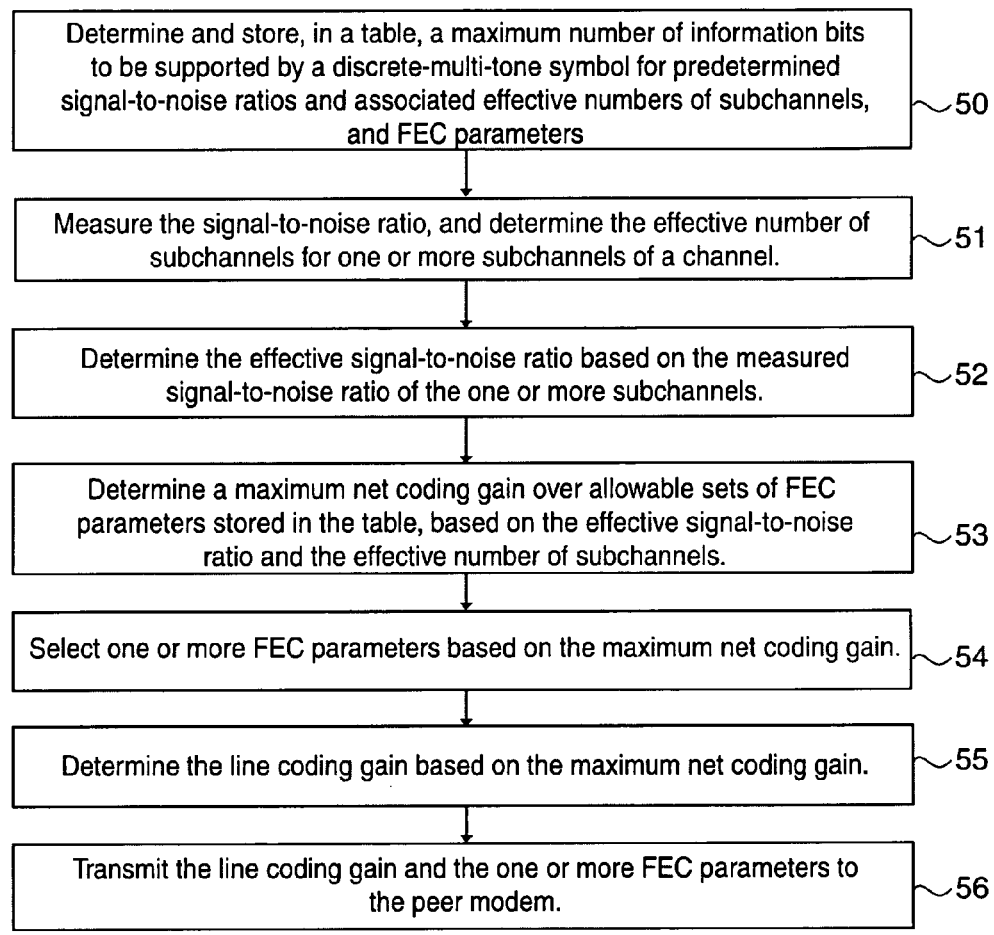
FIG. 5 is a flowchart of an initialization procedure in accordance with an embodiment of the present invention.

Referring to FIG. 5, a flowchart of a method of evaluating channel performance uses approximations (6.1)–(6.3). In one embodiment, the flowchart of FIG. 5 is implemented in the initialization module 48 of the modem driver 40 (FIG. 1). In step 50, a number of information bits to be supported by a subchannel for allowable sets of FEC parameters, predetermined effective signal-to-noise ratios $\gamma_{eff}$ and associated effective numbers of subchannels $n_{eff}$ is determined. For these values of $\gamma_{eff}$ and $n_{eff}$, Equation (5.4) is solved at different allowable values of the maximum number of correctable errors t and the size of the information field K; this solution, combined with Equation (6.1), yields the maximum number of information bits able to be supported by a DMT symbol within the system's constraints. In one embodiment, this information is stored in a table. In an exemplary table shown in Table 2, below, multiple columns compare different embodiments of determining a number of information bits to be supported by a DMT symbol. In step 51, measurements of the channel signal-to-noise ratio are made at different carrier frequencies associated with each subchannel; and at the same time, a total number of "working" subchannels, that is, the effective number of subchannels $n_{eff}$, (Equation (6.2)) is determined. To measure the signal-to-noise ratio, the modem sends a predetermined signal pattern to its peer modem. In one embodiment, the predetermined signal pattern is a pseudorandom signal having a predefined spectrum. In step 52, an effective signal-to-noise ratio for the channel is determined based on the measured signal-to-noise ratio and the effective number of subchannels $n_{eff}$ using Equation (6.3). In step 53, a maximum net coding gain over allowable sets of FEC parameters is determined. In one embodiment, the table generated in step 50 is iteratively accessed for each allowable set of FEC parameters based on the value of the effective number of subchannels and the effective signal-to-noise ratio to retrieve the associated number of bits per subchannel. The net coding gain per subchannel for each allowable set of FEC parameters is determined in accordance with Equation 6.4 below:

$$g_n(t, K) \equiv \frac{G_n(t, K)}{n_{eff}} = \frac{K}{K + C + R} b(\gamma_{eff}, t, K) - \frac{K}{K + C} b(\gamma_{eff}, 0, K). \quad (6.4)$$

In step 54, one or more FEC parameters are selected based on the maximum net coding gain per subchannel $g_n$. The selected FEC parameters yield the largest, i.e., the maximum, value of the net coding gain as determined in accordance with Equation (6.4).

In step 55, the corresponding line coding gain $g_l$ is determined based on the forward error correction parameters that provide the maximum net coding gain $g_n$. The line coding gain per subchannel $g_l$ is determined in accordance with the following relationship:

$$g_l(t, K) \equiv \frac{G_l(t, K)}{n_{eff}} = b(\gamma_{eff}, t, K) - b(\gamma_{eff}, 0, K) \quad (6.5)$$

In step 56, the line coding gain, and the one or more FEC selected parameters are transmitted to the peer modem.

Alternately, the signal-to-noise ratio could be an estimate, directly or indirectly from the measured channel noise characteristics, or other information that can be correlated to signal-to-noise information. In another alternate embodiment, rather than using the signal-to-noise ratio, another characteristic that is proportional, either directly or indirectly, to the signal-to-noise ratio is measured and converted to a signal-to-noise ratio. Alternately, the other characteristic is used rather than the signal-to-noise ratio.

The validity of the mean-field approximation for multi-carrier channels with FEC and ARQ is not obvious because the bit load Equation (5.4) (or, more generally, Equation (5.5)) provides a nonlinear relationship between the number of bits per subchannel and the signal-to-noise ratio. As will be shown in the next section, for a typical, not a poor quality, channel the mean-field approximation is valid.

6. An Approximate Solution of the Bit Load Equation

An approximate solution of the bit load Equation (5.5) for small values of the target symbol error rate $\epsilon_s$ will now be described. Bit load Equation (5.5) can be rewritten in the following form:

$$1 - \sqrt{1 - \frac{1 - \left(1 - W(t, K, k)\epsilon_S^{\frac{1}{(t+1)k}}\right)^{1/\alpha}}{1 - 2^{-b/2}}} = \quad (7.1)$$
$$erfc\left(\sqrt{1.5 \cdot 10^{\gamma/10}/(2^b - 1)}\right)$$

At small values of the target symbol error rate $\epsilon_s$, Equation (7.1) can be rewritten as follows:

$$erfc\left(\sqrt{1.5 \cdot 10^{\gamma/10}/(2^b - 1)}\right) = \frac{1 - \left(1 - W(t, K, k)\epsilon_S^{\frac{1}{(t+1)k}}\right)^{1/\alpha}}{2\omega(b)(1 - 2^{-b/2})} \quad (7.2)$$

Also, at small values of $\epsilon_s$ (which is equivalent to small values of the right hand side of Equation (7.2)), the following asymptotic can be applied:

$$erfc(x) = \frac{1}{\sqrt{\pi}} \frac{\exp(-x^2)}{x}[1 + O(x^{-2})], \text{ as } x \to \infty$$

which yields:

$$x \exp x = \frac{8\omega^2(b)(1 - 2^{-b/2})^2}{\pi\left[1 - \left(1 - W(t, K, k)\epsilon_S^{\frac{1}{(t+1)k}}\right)^{1/\alpha}\right]^2}, x = 3 \cdot 10^{\gamma/10}/(2^b - 1) \quad (7.3)$$

When the value of the right hand side of Equation (7.3) is large (or small $\epsilon_s$), the asymptotic solution of Equation (7.3) yields:

$$x = \ln\left\{\frac{8\omega^2(b)(1 - 2^{-b/2})^2}{\pi\left[1 - \left(1 - W(t, K, k)\epsilon_S^{\frac{1}{(t+1)k}}\right)^{1/\alpha}\right]^2}\right\} - \quad (7.4)$$
$$\ln \ln\left\{\frac{8\omega^2(b)(1 - 2^{-b/2})^2}{\pi\left[1 - \left(1 - W(t, K, k)\epsilon_S^{\frac{1}{(t+1)k}}\right)^{1/\alpha}\right]^2}\right\}$$

At small values of $\epsilon_s$ and at $1 < b < b_{max}$, where $b_{max}$ is the maximum bit load per subchannel allowed, replacing the $\omega(b)(1-2^{-b/2})$ term in Equation (7.4) by its mean value, $$\langle \omega(b) \rangle = \frac{1}{b_{max}} \int_1^{b_{max}} \omega(b)(1 - 2^{-b/2}) db, \quad (7.5)$$

yields:

$$\frac{3 \cdot 10^{\gamma/10}}{2^b - 1} = 2\ln\left\{\frac{\langle\omega(b)\rangle\sqrt{8/\pi}}{1 - \left(1 - W(t, K, k)\varepsilon_S^{\frac{1}{(t+1)k}}\right)^{1/\alpha}}\right\} - \ln\ln\left\{\frac{\langle\omega(b)\rangle\sqrt{8/\pi}}{1 - \left(1 - W(t, K, k)\varepsilon_S^{\frac{1}{(t+1)k}}\right)^{1/\alpha}}\right\} - \ln 2 \quad (7.6)$$

or $$1 + \frac{3 \cdot 10^{\gamma/10}}{2\ln\left\{\frac{\alpha \cdot \langle\omega(b)\rangle\sqrt{8/\pi}}{W(t, K, k)\varepsilon_S^{\frac{1}{(t+1)k}}}\right\} - \ln\ln\left\{\frac{\alpha \cdot \langle\omega(b)\rangle\sqrt{8/\pi}}{W(t, K, k)\varepsilon_S^{\frac{1}{(t+1)k}}}\right\} - \ln 2} = 10^{b\log 2} \quad (7.7)$$

Applying Equation (3.1) to Equation (7.7) yields an approximate solution of Equation (5.5)

$$b = [\gamma + \Phi(\gamma, t, K, k, \epsilon)]/10 \log 2, \quad (7.8)$$

where $$\Phi(\gamma, t, K, k, \varepsilon) = \quad (7.9)$$

$$10\log\left\{10^{-\gamma/10} + \frac{3\log e}{2\log\left[\frac{\alpha\langle\omega(b)\rangle\sqrt{8/\pi}}{W(t, K, k)(\alpha\varepsilon/\beta)^{\frac{1}{(t+1)k}}}\right] - \log\log\left[\frac{\alpha\langle\omega(b)\rangle\sqrt{8/\pi}}{W(t, K, k)(\alpha\varepsilon/\beta)^{\frac{1}{(t+1)k}}}\right] + \log\left(\frac{\log e}{2}\right)}\right\}$$

To assess the accuracy of this approximation, the values for the number of bits per subchannel b found from Equation (7.8) when information frames are transmitted once (k=1) were compared to the results of numerically solving Equation (5.4). The length of the information field K was varied between 8 and 256; the number of correctable symbol errors t was varied between 0 and 8, and the signal-to-noise ratio γ was varied between 10 and 50 dB; the number of erasures $e_r$ was set equal to 0 and the maximum number of bits per subchannel $b_{max}$ was set equal to 15. The results for information field lengths of K=16, 64, and 256 are presented below; in Tables 2, 3 and 4, respectively.

TABLE 2

Results of computing the number of bits per subchannel by SNR γ in decibels, and the number of correctable symbol errors t when $\epsilon=10^{-7}$, β=3, α=8, C=0, k=1, K=16, $e_r$=0

| γ, dB | b (Equation (5.4)) | b (Equation (7.9)) | b (Equation (7.11)) |
|---|---|---|---|
| t=0 | | | |
| 10 | 1.023323e+000 | 1.033354e+000 | 6.595484e−002 |
| 15 | 2.078584e+000 | 2.107755e+000 | 1.726919e+000 |

TABLE 2-continued

Results of computing the number of bits per subchannel by SNR γ in decibels, and the number of correctable symbol errors t when $\epsilon=10^{-7}$, β=3, α=8, C=0, k=1, K=16, $e_r$=0

| γ, dB | b (Equation (5.4)) | b (Equation (7.9)) | b (Equation (7.11)) |
|---|---|---|---|
| 20 | 3.486503e+000 | 3.519514e+000 | 3.387883e+000 |
| 25 | 5.066853e+000 | 5.091785e+000 | 5.048847e+000 |
| 30 | 6.711104e+000 | 6.723528e+000 | 6.709811e+000 |
| 35 | 8.376005e+000 | 8.375127e+000 | 8.370775e+000 |
| 40 | 1.004683e+001 | 1.003312e+001 | 1.003174e+001 |
| 45 | 1.171884e+001 | 1.169314e+001 | 1.169270e+001 |
| 50 | 1.339061e+001 | 1.335381e+001 | 1.335367e+001 |
| t=1 | | | |
| 10 | 1.442432e+000 | 1.475946e+000 | 8.332226e−001 |
| 15 | 2.674824e+000 | 2.729902e+000 | 2.494187e+000 |
| 20 | 4.183037e+000 | 4.233935e+000 | 4.155151e+000 |
| 25 | 5.808428e+000 | 5.841497e+000 | 5.816115e+000 |
| 30 | 7.473964e+000 | 7.485154e+000 | 7.477079e+000 |
| 35 | 9.151482e+000 | 9.140601e+000 | 9.138043e+000 |
| 40 | 1.083170e+001 | 1.079982e+001 | 1.079901e+001 |
| 45 | 1.251171e+001 | 1.246023e+001 | 1.245997e+001 |
| 50 | 1.419067e+001 | 1.412102e+001 | 1.412094e+001 |
| t=2 | | | |
| 10 | 1.700372e+000 | 1.754104e+000 | 1.246814e+000 |
| 15 | 3.014947e+000 | 3.088246e+000 | 2.907778e+000 |
| 20 | 4.566292e+000 | 4.628288e+000 | 4.568742e+000 |
| 25 | 6.212193e+000 | 6.248803e+000 | 6.229706e+000 |
| 30 | 7.889203e+000 | 7.896737e+000 | 7.890670e+000 |
| 35 | 9.574868e+000 | 9.553555e+000 | 9.551634e+000 |
| 40 | 1.126188e+001 | 1.121321e+001 | 1.121260e+001 |
| 45 | 1.294799e+001 | 1.287375e+001 | 1.287356e+001 |
| 50 | 1.463259e+001 | 1.453459e+001 | 1.453453e+001 |
| t=3 | | | |
| 10 | 1.882021e+000 | 1.952292e+000 | 1.520995e+000 |
| 15 | 3.246027e+000 | 3.332763e+000 | 3.181959e+000 |
| 20 | 4.822975e+000 | 4.892337e+000 | 4.842923e+000 |
| 25 | 6.481902e+000 | 6.519697e+000 | 6.503887e+000 |
| 30 | 8.167044e+000 | 8.169870e+000 | 8.164851e+000 |
| 35 | 9.859003e+000 | 9.827404e+000 | 9.825815e+000 |
| 40 | 1.155151e+001 | 1.148728e+001 | 1.148678e+001 |
| 45 | 1.324266e+001 | 1.314790e+001 | 1.314774e+001 |
| 50 | 1.493198e+001 | 1.480876e+001 | 1.480871e+001 |
| t=4 | | | |
| 10 | 2.019598e+000 | 2.103366e+000 | 1.721201e+000 |
| 15 | 3.417397e+000 | 3.514295e+000 | 3.382165e+000 |

TABLE 2-continued

Results of computing the number of bits per subchannel by SNR γ in decibels, and the number of correctable symbol errors t when $\epsilon=10^{-7}$, $\beta=3$, $\alpha=8$, C=0, k=1, K=16, $e_r=0$

| γ, dB | b (Equation (5.4)) | b (Equation (7.9)) | b (Equation (7.11)) |
|---|---|---|---|
| 20 | 5.011948e+000 | 5.086235e+000 | 5.043129e+000 |
| 25 | 6.680380e+000 | 6.717864e+000 | 6.704093e+000 |
| 30 | 8.371915e+000 | 8.369426e+000 | 8.365057e+000 |
| 35 | 1.006908e+001 | 1.002740e+001 | 1.002602e+001 |
| 40 | 1.176625e+001 | 1.168742e+001 | 1.168699e+001 |
| 45 | 1.346173e+001 | 1.334809e+001 | 1.334795e+001 |
| 50 | 1.515514e+001 | 1.500896e+001 | 1.500891e+001 |
| t=5 | | | |
| 10 | 2.128722e+000 | 2.223564e+000 | 1.875960e+000 |
| 15 | 3.551468e+000 | 3.656154e+000 | 3.536924e+000 |
| 20 | 5.159179e+000 | 5.236668e+000 | 5.197888e+000 |
| 25 | 6.835082e+000 | 6.871229e+000 | 6.858852e+000 |
| 30 | 8.531920e+000 | 8.523742e+000 | 8.519816e+000 |
| 35 | 1.023355e+001 | 1.018202e+001 | 1.018078e+001 |
| 40 | 1.193478e+001 | 1.184214e+001 | 1.184174e+001 |
| 45 | 1.363408e+001 | 1.350283e+001 | 1.350271e+001 |
| 50 | 1.533110e+001 | 1.516371e+001 | 1.516367e+001 |
| t=6 | | | |
| 10 | 2.218107e+000 | 2.322096e+000 | 2.000210e+000 |
| 15 | 3.660232e+000 | 3.770930e+000 | 3.661174e+000 |
| 20 | 5.278323e+000 | 5.357757e+000 | 5.322138e+000 |
| 25 | 6.960372e+000 | 6.994461e+000 | 6.983102e+000 |
| 30 | 8.661754e+000 | 8.647668e+000 | 8.644066e+000 |
| 35 | 1.036729e+001 | 1.030617e+001 | 1.030503e+001 |
| 40 | 1.207214e+001 | 1.196635e+001 | 1.196599e+001 |
| 45 | 1.377485e+001 | 1.362707e+001 | 1.362696e+001 |
| 50 | 1.547513e+001 | 1.528796e+001 | 1.528792e+001 |
| t=7 | | | |
| 10 | 2.293082e+000 | 2.404677e+000 | 2.102716e+000 |
| 15 | 3.750818e+000 | 3.866169e+000 | 3.763680e+000 |
| 20 | 5.377404e+000 | 5.457848e+000 | 5.424644e+000 |
| 25 | 7.064667e+000 | 7.096191e+000 | 7.085608e+000 |
| 30 | 8.770026e+000 | 8.749927e+000 | 8.746572e+000 |
| 35 | 1.047906e+001 | 1.040860e+001 | 1.040754e+001 |
| 40 | 1.218715e+001 | 1.206884e+001 | 1.206850e+001 |
| 45 | 1.389295e+001 | 1.372957e+001 | 1.372946e+001 |
| 50 | 1.559619e+001 | 1.539046e+001 | 1.539043e+001 |
| t=8 | | | |
| 10 | 2.357129e+000 | 2.475092e+000 | 2.189042e+000 |
| 15 | 3.827787e+000 | 3.946737e+000 | 3.850006e+000 |
| 20 | 5.461514e+000 | 5.542266e+000 | 5.510970e+000 |
| 25 | 7.153296e+000 | 7.181904e+000 | 7.171934e+000 |
| 30 | 8.862192e+000 | 8.836059e+000 | 8.832898e+000 |
| 35 | 1.057437e+001 | 1.049486e+001 | 1.049386e+001 |
| 40 | 1.228542e+001 | 1.215514e+001 | 1.215483e+001 |
| 45 | 1.399404e+001 | 1.381589e+001 | 1.381579e+001 |
| 50 | 1.570000e+001 | 1.547679e+001 | 1.547675e+001 |

TABLE 3

Results of computing the number of bits per subchannel by SNR γ and number of correctable symbol errors t; $\epsilon=10^{-7}$, $\beta=3$, $\alpha=8$, C=0, k=1, K=64, $e_r=0$

| γ, dB | b (Equation (5.4)) | b (Equation (7.9)) | b (Equation (7.11)) |
|---|---|---|---|
| t=0 | | | |
| 10 | 1.023323e+000 | 1.033354e+000 | 6.595483e−002 |
| 15 | 2.078584e+000 | 2.107755e+000 | 1.726919e+000 |
| 20 | 3.486503e+000 | 3.519514e+000 | 3.387883e+000 |
| 25 | 5.066853e+000 | 5.091785e+000 | 5.048847e+000 |
| 30 | 6.711104e+000 | 6.723528e+000 | 6.709811e+000 |
| 35 | 8.376005e+000 | 8.375127e+000 | 8.370775e+000 |
| 40 | 1.004683e+001 | 1.003312e+001 | 1.003174e+001 |
| 45 | 1.171884e+001 | 1.169314e+001 | 1.169270e+001 |
| 50 | 1.339061e+001 | 1.335381e+001 | 1.335367e+001 |
| t=1 | | | |
| 10 | 1.380088e+000 | 1.409355e+000 | 7.278630e−001 |
| 15 | 2.590019e+000 | 2.640925e+000 | 2.388827e+000 |
| 20 | 4.086176e+000 | 4.134372e+000 | 4.049791e+000 |
| 25 | 5.706040e+000 | 5.738042e+000 | 5.710755e+000 |
| 30 | 7.368719e+000 | 7.380404e+000 | 7.371719e+000 |
| 35 | 9.044357e+000 | 9.035435e+000 | 9.032683e+000 |
| 40 | 1.072307e+001 | 1.069452e+001 | 1.069365e+001 |
| 45 | 1.240176e+001 | 1.235489e+001 | 1.235461e+001 |
| 50 | 1.407951e+001 | 1.401566e+001 | 1.401558e+001 |
| t=2 | | | |
| 10 | 1.590612e+000 | 1.635235e+000 | 1.074767e+000 |
| 15 | 2.872149e+000 | 2.937526e+000 | 2.735731e+000 |
| 20 | 4.406298e+000 | 4.463611e+000 | 4.396695e+000 |
| 25 | 6.043853e+000 | 6.079157e+000 | 6.057660e+000 |
| 30 | 7.716011e+000 | 7.725457e+000 | 7.718624e+000 |
| 35 | 9.398120e+000 | 9.381752e+000 | 9.379588e+000 |
| 40 | 1.108211e+001 | 1.104124e+001 | 1.104055e+001 |
| 45 | 1.276549e+001 | 1.270173e+001 | 1.270152e+001 |
| 50 | 1.444756e+001 | 1.436255e+001 | 1.436248e+001 |
| t=3 | | | |
| 10 | 1.736960e+000 | 1.793885e+000 | 1.303034e+000 |
| 15 | 3.061986e+000 | 3.137968e+000 | 2.963998e+000 |
| 20 | 4.618748e+000 | 4.682277e+000 | 4.624962e+000 |
| 25 | 6.267338e+000 | 6.304298e+000 | 6.285926e+000 |
| 30 | 7.945969e+000 | 7.952726e+000 | 7.946891e+000 |
| 35 | 9.632857e+000 | 9.609702e+000 | 9.607855e+000 |
| 40 | 1.132092e+001 | 1.126940e+001 | 1.126882e+001 |
| 45 | 1.300799e+001 | 1.292997e+001 | 1.292978e+001 |
| 50 | 1.469349e+001 | 1.459081e+001 | 1.459075e+001 |
| t=4 | | | |
| 10 | 1.847831e+000 | 1.914864e+000 | 1.470293e+000 |
| 15 | 3.202981e+000 | 3.287174e+000 | 3.131257e+000 |
| 20 | 4.775339e+000 | 4.843372e+000 | 4.792221e+000 |
| 25 | 6.431868e+000 | 6.469558e+000 | 6.453185e+000 |
| 30 | 8.115460e+000 | 8.119347e+000 | 8.114150e+000 |
| 35 | 9.806189e+000 | 9.776759e+000 | 9.775114e+000 |
| 40 | 1.149761e+001 | 1.143660e+001 | 1.143608e+001 |
| 45 | 1.318776e+001 | 1.309721e+001 | 1.309704e+001 |
| 50 | 1.487613e+001 | 1.475806e+001 | 1.475801e+001 |
| t=5 | | | |
| 10 | 1.936416e+000 | 2.011941e+000 | 1.600862e+000 |
| 15 | 3.314121e+000 | 3.404898e+000 | 3.261826e+000 |
| 20 | 4.898184e+000 | 4.969586e+000 | 4.922790e+000 |
| 25 | 6.560892e+000 | 6.598717e+000 | 6.583754e+000 |
| 30 | 8.248529e+000 | 8.249467e+000 | 8.244718e+000 |
| 35 | 9.942496e+000 | 9.907186e+000 | 9.905682e+000 |
| 40 | 1.163679e+001 | 1.156712e+001 | 1.156665e+001 |
| 45 | 1.332960e+001 | 1.322776e+001 | 1.322761e+001 |
| 50 | 1.502047e+001 | 1.488862e+001 | 1.488857e+001 |
| t=6 | | | |
| 10 | 2.009799e+000 | 2.092586e+000 | 1.707135e+000 |
| 15 | 3.405282e+000 | 3.501466e+000 | 3.368099e+000 |
| 20 | 4.998621e+000 | 5.072585e+000 | 5.029063e+000 |
| 25 | 6.666381e+000 | 6.703933e+000 | 6.690027e+000 |
| 30 | 8.357451e+000 | 8.355403e+000 | 8.350991e+000 |
| 35 | 1.005423e+001 | 1.001335e+001 | 1.001196e+001 |
| 40 | 1.175105e+001 | 1.167336e+001 | 1.167292e+001 |
| 45 | 1.344621e+001 | 1.333402e+001 | 1.333388e+001 |
| 50 | 1.513931e+001 | 1.499489e+001 | 1.499485e+001 |
| t=7 | | | |
| 10 | 2.072198e+000 | 2.161278e+000 | 1.796228e+000 |
| 15 | 3.482210e+000 | 3.582909e+000 | 3.457192e+000 |
| 20 | 5.083181e+000 | 5.159108e+000 | 5.118156e+000 |

TABLE 3-continued

Results of computing the number of bits per subchannel by SNR γ and number of correctable symbol errors t; $\epsilon=10^{-7}$, $\beta=3$, $\alpha=8$, $C=0$, $k=1$, $K=64$, $e_r=0$

| γ, dB | b (Equation (5.4)) | b (Equation (7.9)) | b (Equation (7.11)) |
|---|---|---|---|
| 25 | 6.755215e+000 | 6.792196e+000 | 6.779120e+000 |
| 30 | 8.449276e+000 | 8.444232e+000 | 8.440084e+000 |
| 35 | 1.014855e+001 | 1.010236e+001 | 1.010105e+001 |
| 40 | 1.184763e+001 | 1.176243e+001 | 1.176201e+001 |
| 45 | 1.354491e+001 | 1.342311e+001 | 1.342298e+001 |
| 50 | 1.524002e+001 | 1.508398e+001 | 1.508394e+001 |
| t=8 | | | |
| 10 | 2.126311e+000 | 2.220906e+000 | 1.872578e+000 |
| 15 | 3.548521e+000 | 3.653040e+000 | 3.533542e+000 |
| 20 | 5.155948e+000 | 5.233375e+000 | 5.194506e+000 |
| 25 | 6.831685e+000 | 6.867875e+000 | 6.855470e+000 |
| 30 | 8.528404e+000 | 8.520368e+000 | 8.516434e+000 |
| 35 | 1.022993e+001 | 1.017864e+001 | 1.017740e+001 |
| 40 | 1.193107e+001 | 1.183876e+001 | 1.183836e+001 |
| 45 | 1.363028e+001 | 1.349945e+001 | 1.349933e+001 |
| 50 | 1.532722e+001 | 1.516033e+001 | 1.516029e+001 |

TABLE 4

Results of computing the number of bits per subchannel by SNR γ and number of correctable symbol errors t; $\epsilon=10^{-7}$, $\beta=3$, $\alpha=8$, $C=0$, $k=1$, $K=256$, $e_r=0$

| γ, dB | b (Equation (5.4)) | b (Equation (7.9)) | b (Equation (7.11)) |
|---|---|---|---|
| t=0 | | | |
| 10 | 1.023323e+000 | 1.033354e+000 | 6.595483e−002 |
| 15 | 2.078584e+000 | 2.107755e+000 | 1.726919e+000 |
| 20 | 3.486503e+000 | 3.519514e+000 | 3.387883e+000 |
| 25 | 5.066853e+000 | 5.091785e+000 | 5.048847e+000 |
| 30 | 6.711104e+000 | 6.723528e+000 | 6.709811e+000 |
| 35 | 8.376005e+000 | 8.375127e+000 | 8.370775e+000 |
| 40 | 1.004683e+001 | 1.003312e+001 | 1.003174e+001 |
| 45 | 1.171884e+001 | 1.169314e+001 | 1.169270e+001 |
| 50 | 1.339061e+001 | 1.335381e+001 | 1.335367e+001 |
| t=1 | | | |
| 10 | 1.321766e+000 | 1.347296e+000 | 6.269971e−001 |
| 15 | 2.509617e+000 | 2.556713e+000 | 2.287961e+000 |
| 20 | 3.993768e+000 | 4.039443e+000 | 3.948925e+000 |
| 25 | 5.608182e+000 | 5.639132e+000 | 5.609889e+000 |
| 30 | 7.268129e+000 | 7.280165e+000 | 7.270853e+000 |
| 35 | 8.942023e+000 | 8.934768e+000 | 8.931817e+000 |
| 40 | 1.061938e+001 | 1.059372e+001 | 1.059278e+001 |
| 45 | 1.229688e+001 | 1.225404e+001 | 1.225375e+001 |
| 50 | 1.397355e+001 | 1.391480e+001 | 1.391471e+001 |
| t=2 | | | |
| 10 | 1.489501e+000 | 1.526392e+000 | 9.112276e−001 |
| 15 | 2.738121e+000 | 2.796415e+000 | 2.572192e+000 |
| 20 | 4.254959e+000 | 4.307899e+000 | 4.233156e+000 |
| 25 | 5.884349e+000 | 5.918177e+000 | 5.894120e+000 |
| 30 | 7.552008e+000 | 7.562735e+000 | 7.555084e+000 |
| 35 | 9.230963e+000 | 9.218472e+000 | 9.216048e+000 |
| 40 | 1.091235e+001 | 1.087778e+001 | 1.087701e+001 |
| 45 | 1.259339e+001 | 1.253822e+001 | 1.253798e+001 |
| 50 | 1.427330e+001 | 1.419902e+001 | 1.419894e+001 |
| t=3 | | | |
| 10 | 1.603410e+000 | 1.649059e+000 | 1.095108e+000 |
| 15 | 2.888938e+000 | 2.955228e+000 | 2.756072e+000 |
| 20 | 4.425172e+000 | 4.483036e+000 | 4.417036e+000 |
| 25 | 6.063724e+000 | 6.099199e+000 | 6.078000e+000 |
| 30 | 7.736449e+000 | 7.745701e+000 | 7.738964e+000 |
| 35 | 9.418964e+000 | 9.402062e+000 | 9.399928e+000 |
| 40 | 1.110330e+001 | 1.106157e+001 | 1.106089e+001 |
| 45 | 1.278698e+001 | 1.272207e+001 | 1.272186e+001 |
| 50 | 1.446933e+001 | 1.438289e+001 | 1.438282e+001 |

TABLE 4-continued

Results of computing the number of bits per subchannel by SNR γ and number of correctable symbol errors t; $\epsilon=10^{-7}$, $\beta=3$, $\alpha=8$, $C=0$, $k=1$, $K=256$, $e_r=0$

| γ, dB | b (Equation (5.4)) | b (Equation (7.9)) | b (Equation (7.11)) |
|---|---|---|---|
| t=4 | | | |
| 10 | 1.688664e+000 | 1.741390e+000 | 1.228709e+000 |
| 15 | 2.999838e+000 | 3.072282e+000 | 2.889674e+000 |
| 20 | 4.549418e+000 | 4.610920e+000 | 4.550638e+000 |
| 25 | 6.194450e+000 | 6.230938e+000 | 6.211602e+000 |
| 30 | 7.870942e+000 | 7.878709e+000 | 7.872566e+000 |
| 35 | 9.556219e+000 | 9.535475e+000 | 9.533530e+000 |
| 40 | 1.124290e+001 | 1.119511e+001 | 1.119449e+001 |
| 45 | 1.292871e+001 | 1.285565e+001 | 1.285546e+001 |
| 50 | 1.461303e+001 | 1.451648e+001 | 1.451642e+001 |
| t=5 | | | |
| 10 | 1.756376e+000 | 1.815025e+000 | 1.332655e+000 |
| 15 | 3.086842e+000 | 3.164254e+000 | 2.993619e+000 |
| 20 | 4.646420e+000 | 4.710755e+000 | 4.654583e+000 |
| 25 | 6.296422e+000 | 6.333548e+000 | 6.315547e+000 |
| 30 | 7.975916e+000 | 7.982228e+000 | 7.976511e+000 |
| 35 | 9.663461e+000 | 9.639285e+000 | 9.637475e+000 |
| 40 | 1.135210e+001 | 1.129901e+001 | 1.129844e+001 |
| 45 | 1.303969e+001 | 1.295958e+001 | 1.295940e+001 |
| 50 | 1.472567e+001 | 1.462042e+001 | 1.462037e+001 |
| t=6 | | | |
| 10 | 1.812352e+000 | 1.876083e+000 | 1.417256e+000 |
| 15 | 3.158104e+000 | 3.239660e+000 | 3.078220e+000 |
| 20 | 4.725595e+000 | 4.792215e+000 | 4.739184e+000 |
| 25 | 6.379614e+000 | 6.417129e+000 | 6.400148e+000 |
| 30 | 8.061607e+000 | 8.066503e+000 | 8.061112e+000 |
| 35 | 9.751084e+000 | 9.723783e+000 | 9.722076e+000 |
| 40 | 1.144140e+001 | 1.138358e+001 | 1.138304e+001 |
| 45 | 1.313054e+001 | 1.304417e+001 | 1.304400e+001 |
| 50 | 1.481796e+001 | 1.470502e+001 | 1.470497e+001 |
| t=7 | | | |
| 10 | 1.859971e+000 | 1.928148e+000 | 1.488342e+000 |
| 15 | 3.218288e+000 | 3.303384e+000 | 3.149306e+000 |
| 20 | 4.792287e+000 | 4.860795e+000 | 4.810270e+000 |
| 25 | 6.449669e+000 | 6.487403e+000 | 6.471234e+000 |
| 30 | 8.133810e+000 | 8.137331e+000 | 8.132198e+000 |
| 35 | 9.824973e+000 | 9.794787e+000 | 9.793162e+000 |
| 40 | 1.151678e+001 | 1.145464e+001 | 1.145413e+001 |
| 45 | 1.320728e+001 | 1.311525e+001 | 1.311509e+001 |
| 50 | 1.489599e+001 | 1.477611e+001 | 1.477605e+001 |
| t=8 | | | |
| 10 | 1.901361e+000 | 1.973486e+000 | 1.549501e+000 |
| 15 | 3.270290e+000 | 3.358465e+000 | 3.210465e+000 |
| 20 | 4.849793e+000 | 4.919893e+000 | 4.871429e+000 |
| 25 | 6.510069e+000 | 6.547895e+000 | 6.532393e+000 |
| 30 | 8.196094e+000 | 8.198278e+000 | 8.193357e+000 |
| 35 | 9.888760e+000 | 9.855879e+000 | 9.854321e+000 |
| 40 | 1.158190e+001 | 1.151578e+001 | 1.151529e+001 |
| 45 | 1.327363e+001 | 1.317641e+001 | 1.317625e+001 |
| 50 | 1.496349e+001 | 1.483726e+001 | 1.483721e+001 |

From the results, it was found that the highest approximation error of about 5% (a relative error between estimates for the number of bits per subchannel b obtained from Equation (5.4) and Equation (7.8)) is attained at a lowest information field length of K~8, lowest signal-to-noise ratio γ~10 dB, and highest number of correctable errors t~8. For the same number of correctable errors t, larger signal-to-noise ratio γ values yield smaller error values (for K~8 and t~8 the error was 1.5% at 20 dB, and 0.3% at 30 dB; and the error decreased, as the length of the information field K increased). The absolute error is even more indicative in showing the reliability of Equation (7.8). For instance, for an information field of length K=8 and a number of correctable errors t=8, the absolute error is 0.12 bits/subchannel at 10 dB, 0.08 bits/subchannel at 20 dB, and 0.03 bits/subchannel at 30 dB. Therefore, even at a lowest signal-to-noise ratio γ, an absolute error from using Equations (7.8) and (7.9) is ~0.1 bits/subchannel, and the absolute error decreases with increasing signal-to-noise ratio γ. Equations (7.8) and (7.9) provide a means for estimating b, separating different factors affecting its value (SNR, FEC and ARQ).

In another alternate embodiment, when b≧3 the following approximate solution can be used:

$$b=[\gamma+\phi(t,K,k,\epsilon)]/10 \log 2, \quad (7.10)$$

$$\phi(t,K,k,\epsilon)=\Phi(-\infty,t,K,k,\epsilon) \quad (7.11)$$

It was found that when the number of bits per subchannel b was greater than or equal to three (b≧3), the relative error in using Equations (7.10) and (7.11), rather than using Equation (5.4), did not exceed 5% when the maximum number of transmissions k was equal to 1. Results using these equations for information field lengths K=16, 64, and 256 are presented in Tables 2, 3 and 4, respectively. The largest error was attained at a lowest value of K which was approximately equal to eight (K~8) and a lowest value of t which was approximately equal to 0 (t~0). For the same value of t, larger signal-to-noise γ values yielded smaller error values (for K~8 and t~0, the error was 3% at 20 dB, and 0.1% at 30 dB), and the error decreased as K increased. At b~3 the absolute error of using Equations (7.10) and (7.11) was found to be no larger than 0.12 bits/subchannel, and the absolute error decreased as the signal-to-noise ratio γ increased. This means that for a not very poor quality multicarrier channel, where most of the subchannels may bear at least 3 bits, the use of Equations (7.10) and (7.11) is justified. In addition, for such a channel, the "mean-field approximation" of Equation (6.1) is valid, since the relationship of Equation (7.10) between the number of bits per subchannel b and the signal-to-noise ratio γ is essentially linear while all effects of FEC and ARQ are incorporated in the free term of that linear relationship:

$$B_{DMT} = \sum_{i=1}^{n_{eff}} b(\gamma_i) \approx \sum_{i=1}^{n_{eff}} \frac{\gamma_i + \phi(t, K, k, \varepsilon)}{10\log 2} = \quad (7.12)$$

$$n_{eff} \frac{\left(\frac{1}{n_{eff}}\sum_{i=1}^{n_{eff}}\gamma_i\right) + \phi(t, K, k, \varepsilon)}{10\log 2} = n_{eff}b(\gamma_{eff})$$

The reason why Equation (7.10) is only accurate when b≧3 becomes especially clear considering that the approximations of Equations (7.10) and (7.11) are obtained as a result of replacing $(2^b-1)$ in the denominator of the left hand side of Equation (7.6) by $2^b$. This replacement yields a substantial error for subchannels with a number of bits per subchannel less than or equal to two (b≦2), but when the number of bits per subchannel b is greater than or equal to three (b≧3), the error becomes small. Also, as the results show, the error decreases as the number of bits per subchannel b increases.

In another embodiment, the mean field approximation may be corrected at low signal-to-noise ratio. For a QAM channel, using Equation (7.11) and expanding $\Phi(\gamma,t,K,k,\epsilon)$ in the Taylor series as follows:

$$\Phi(\gamma,t,K,k,\epsilon)=\phi(t,K,k,\epsilon)+\log e \cdot 10^{1-[\phi(t,K,k,\epsilon)+\gamma]/10} + O(10^{-2\gamma/10})$$

yields the following low-signal-to-noise ratio correction to the mean field approximation for multicarrier channels:

$$B_{DMT} = \sum_{i=1}^{n_{eff}} \frac{\gamma_i + \phi(t, K, k, \varepsilon) + 10^{1-[\phi(t,K,k,\varepsilon)+\gamma_i]/10}\log e}{10\log 2} = \quad (7.13)$$

$$n_{eff}b(\gamma_{eff}) + \frac{10^{-\phi(t,K,k,\varepsilon)/10}}{\ln 2}\sum_{i=1}^{n_{eff}}\left(10^{-\gamma_i/10} - 10^{-\gamma_{eff}/10}\right)$$

Equations (7.10) and (7.11) provide an explanation of why, at sufficiently low BER and for a not very poor quality of DMT channel, the relationship between the signal-to-noise ratio and the number of bits per subchannel is approximately linear. In addition, the same value of the line coding gain per subchannel $g_l$ determined for an effective signal-to-noise ratio of a multicarrier channel can be applied to all subchannels. Alternately, the same value of the line coding gain per subchannel $g_l$ determined for an effective signal-to-noise ratio of a multicarrier channel can be applied to all subchannels that have a signal-to-noise ratio exceeding a threshold signal-to-noise ratio.

7. Optimization of FEC Parameters for G.Lite-compliant Modems

In another embodiment, described in this section, the general approach described above is applied to digital subscriber line (DSL) modems compliant with the G.992.2 standard. In this embodiment for the G.992.2 standard, there are restrictions on the size of a DMT symbol, the size of a FEC frame, and the number of control symbols in one FEC frame. Basically, $$\frac{sB_{DMT}}{\alpha} = K + C + R \quad (8.1)$$

$$R = zs \quad (8.2)$$

$$C = s \quad (8.3)$$

where s is the number of DMT symbols in a FEC frame, and z is the number of FEC control symbols in a DMT symbol. There are 13 possible pairs of (z, s) in G.992.2 as shown in Table 5, below.

TABLE 5

The (s, z) pairs in G.lite.

| s | 1 | 1 | 1 | 1 | 2 | 2 | 2 | 4 | 4 | 4 | 8 | 8 | 16 |
|---|---|---|---|---|---|---|---|---|---|---|---|---|----|
| z | 0 | 4 | 8 | 16 | 2 | 4 | 8 | 1 | 2 | 4 | 1 | 2 | 1 |

Introducing Equations (6.1), (8.2), and (8.3) into Equation (8.1) yields:

$$b(\gamma_{eff}) = \frac{\alpha}{sn_{eff}}(K + s + zs) \quad (8.4)$$

Combining Equations (2.2), (4.5), (5.4), and (8.4) yields the following equation to determine the length of the information field K:

$$\left[\frac{\alpha(K+s+zs)}{sn_{eff}}+1.5\right]\left[1-(1-W(t,K)\varepsilon_S^{1/(t+1)})^{1/\alpha}\right]= \quad (8.5)$$

$$2\left(1-2^{-\frac{\alpha(K+s+zs)}{2sn_{eff}}}\right)erfc\left(\sqrt{1.5\cdot 10^{\gamma_{eff}/10}\Big/\left(2^{\frac{\alpha(K+s+zs)}{sn_{eff}}}-1\right)}\right)\times$$

$$\left[2-\left(1-2^{-\frac{\alpha(K+s+zs)}{2sn_{eff}}}\right)erfc\left(\sqrt{1.5\cdot 10^{\gamma_{eff}/10}\Big/\left(2^{\frac{\alpha(K+s+zs)}{sn_{eff}}}-1\right)}\right)\right]$$

where $t=\left\lfloor\frac{sz+1+e_r}{2}\right\rfloor$ and $e_r \leq sz$.

When numerically solving Equation (8.5), the length of the information field K, a function of $\gamma_{eff}$, z, s, and $n_{eff}$, is treated as a continuous variable. For that reason, the factorials in the W( . . . ) definition were presented in the gamma-log form. The value of the length of the information field K that is obtained is then used in Equation (8.4) to compute $b(\gamma_{eff},z,s,n_{eff})$.

Equation (8.5) was programmed in MatLab and solved numerically using dichotomy, for different values of $\gamma_{eff}$, $n_{eff}$ and (z, s). The initial K interval, for the dichotomy procedure, was (0,256−s−zs). For each $\gamma_{eff}$ and $n_{eff}$ pair, the values of the net coding gain $g_n$ were then determined from Equations (6.4) and (8.4). These values were compared for all possible (z, s) pairs, and the (z, s) pair providing the maximal net coding gain $g_n$ was found.

In one embodiment, for G.992.2, the only parameter that is stored is the line coding gain per subchannel $g_l$, with the corresponding (z, s) and ($\gamma_{eff}$, $n_{eff}$) pairs. The value of the line coding gain per subchannel $g_i$ is determined in accordance with Equation (6.5) using the parameters that maximize the net coding gain $g_n$. The line coding gain per subchannel gi together with the corresponding (z, s) and ($\gamma_{eff}$, $n_{eff}$) pairs, yields the information needed for the FEC-related margin adjustment. Specifically, since the "uncoded" number of bits $b(\gamma_{eff},0,1,n_{eff})$ is known (measured) for a DSL channel, adding the line coding gain go to the "uncoded" number of bits $b(\gamma_{eff},0,1,n_{eff})$ yields $b(\gamma_{eff},s,z,n_{eff})$. The integer value of the length of the information field K can then be determined from Equation (8.4). Since it was shown in the previous subsection that the number of bits per subchannel can usually be found from Equation (7.10), then $$g_l=[\phi(t,K,k,\epsilon)-\phi(0,K,1,\epsilon)]/10\log 2 \quad (8.6)$$

It follows from Equation (8.6) that the line coding gain per subchannel $g_l$ is essentially independent of the signal-to-noise ratio γ, and its value can be determined once for the effective signal-to-noise ratio $\gamma_{eff}$ and then applied to all subchannels used, regardless of their signal-to-noise ratio values.

Table 6, below, shows a set of optimum (s, z, $g_l$) triplets calculated for a G.992.2-compliant modem at different effective numbers of subchannels $n_{eff}$ and effective signal-to-noise ratio $\gamma_{eff}$ values.

TABLE 6

Optimum FEC parameters (s/z/g_l) calculated for G.lite modem at different $n_{eff}$ and $\gamma_{eff}$ values (number of effective subchannels $n_{eff}$ ranges from 1 to 96, the effective SNR $\gamma_{eff}$ ranges from 10 to 50, the number of erasures $e_r = 0$).

| $n_{eff}\backslash\gamma_{eff}$ | 10 | 20 | 30 | 40 | 50 |
|---|---|---|---|---|---|
| 1 | 1/0/0.00 | 1/0/0.00 | 1/0/0.00 | 1/0/0.00 | 1/0/0.00 |
| 6 | 1/0/0.00 | 16/1/1.74 | 16/1/1.75 | 16/1/1.71 | 16/1/1.68 |
| 11 | 16/1/1.22 | 16/1/1.58 | 16/1/1.58 | 16/1/1.55 | 8/1/1.32 |
| 16 | 16/1/1.14 | 16/1/1.49 | 8/1/1.29 | 8/1/1.27 | 8/1/1.24 |
| 21 | 16/1/1.08 | 16/1/1.43 | 8/1/1.24 | 8/1/1.22 | 4/1/0.95 |
| 26 | 16/1/1.04 | 16/1/1.38 | 8/2/1.54 | 4/2/1.30 | 4/2/1.28 |
| 31 | 16/1/1.01 | 8/2/1.50 | 8/2/1.50 | 4/2/1.27 | 4/2/1.25 |
| 36 | 16/1/0.99 | 8/2/1.46 | 4/2/1.27 | 4/2/1.24 | 2/2/0.97 |
| 41 | 16/1/0.96 | 8/2/1.43 | 4/2/1.25 | 4/2/1.22 | 2/2/0.95 |
| 46 | 16/1/0.95 | 8/2/1.41 | 4/4/1.57 | 4/1/0.87 | 2/4/1.31 |
| 51 | 16/1/0.93 | 8/2/1.38 | 4/4/1.55 | 2/4/1.31 | 2/4/1.29 |
| 56 | 16/1/0.91 | 4/4/1.52 | 4/4/1.53 | 2/4/1.29 | 2/4/1.27 |
| 61 | 16/1/0.90 | 4/4/1.50 | 4/4/1.50 | 2/4/1.27 | 2/4/1.25 |
| 66 | 16/1/0.89 | 4/4/1.48 | 2/4/1.28 | 2/4/1.26 | 2/4/1.24 |
| 71 | 8/2/0.99 | 4/4/1.46 | 2/4/1.27 | 2/4/1.25 | 2/2/0.89 |
| 76 | 8/2/0.98 | 4/4/1.45 | 2/4/1.26 | 2/4/1.23 | 1/4/0.96 |
| 81 | 8/2/0.97 | 4/4/1.43 | 2/4/1.25 | 2/4/1.22 | 1/4/0.96 |
| 86 | 8/2/0.96 | 4/4/1.42 | 2/4/1.24 | 2/4/1.21 | 1/4/0.95 |
| 91 | 8/2/0.95 | 4/4/1.41 | 2/4/1.23 | 2/4/1.20 | 1/8/1.31 |
| 96 | 8/2/0.94 | 4/4/1.40 | 2/8/1.56 | 1/8/1.32 | 1/8/1.30 |

The line coding gain as a function of the effective number of subchannels and the effective signal-to-noise ratio ($g_l(n_{eff}, \gamma_{eff})$) dependence has discontinuities where the value of the (s, z) pair changes. This behavior can be explained by the procedure of determining the line coding gain per subchannel $g_l$. Since, by definition, the optimal net coding gain per subchannel $g_n$ is a continuous function of the effective number of subchannels $n_{eff}$ and the effective signal-to-noise ratio $\gamma_{eff}$, the line coding gain per subchannel $g_l$ has discontinuities where the net coding gain $g_n$ maximum is attained by two different (s, z) pairs at once.

The results presented in Table 6 are obtained when there are no erasures, that is, when $e_r=0$. In another embodiment, when the parameters that are optimized include a number of erasures $e_r$, the optimization procedure is performed over the range $0\leq e_r\leq sz$, for each (s, z) pair.

8. Uncoded SER at Large k

In another embodiment, when the maximum number of transmissions k is large, Equation (3.11) can be presented as follows:

$$p_e = \frac{1}{\binom{K+C+R}{t+1}^{\frac{1}{t+1}}}\left[\frac{\varepsilon_S\binom{K+C+R}{t+1}}{\binom{K+C+R-1}{t}}\right]^{\frac{1}{(t+1)k}} = \quad (9.1)$$

$$\frac{\left[\frac{(K+C+R)\varepsilon_S}{t+1}\right]^{\frac{1}{(t+1)k}}}{\binom{K+C+R}{t+1}^{\frac{1}{t+1}}}$$

Figure 6:
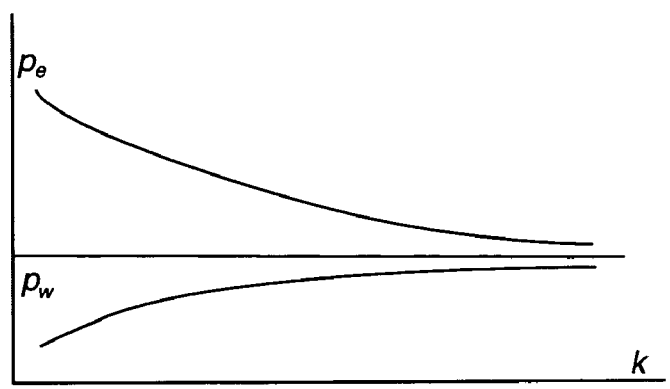
FIG. 6 depicts two possible types of the $p_e(k)$ behavior when the maximum number of transmissions k is large.

From Equation (9.1), when the maximum number of transmissions k is large, the channel symbol error rate $p_e$ can be determined as follows:

$$p_e \to p_* = 1\Big/\binom{K+C+R}{t+1}^{\frac{1}{t+1}}, \quad (9.2)$$

and is asymptotically independent of $\epsilon_s$. As shown in FIG. 6, the channel symbol error rate $p_e(k)$ exhibits two kinds of behavior depending on whether the symbol error rate $\epsilon_s$ is larger or smaller than a threshold value $\epsilon^*$ which is determined in accordance with the following relationship:

$$\epsilon^* = (t+1)/(K+C+R). \tag{9.3}$$

In the first case, the channel symbol error rate $p_e$ is a decreasing function of the maximum number of transmissions k; and, in the second case, the channel symbol error rate $p_e$ is an increasing function of the maximum number of transmissions k. When no FEC and only CRC is applied at R=t=0, the channel symbol error rate $p_e$ can be determined in accordance with the following relationship:

$$p_e = \frac{\varepsilon_s^{1/k}}{(K+C)^{(k-1)/k}} + O(\varepsilon_S^{2/k}) = \frac{[(K+C)\varepsilon_S]^{1/k}}{K+C} + O(\varepsilon_S^{2/k}), \tag{9.4}$$

and $p_e \to p_* = 1/(K+C)$ at large k. At t=0 and k=1, the channel symbol error rate $p_e$ is equal to $\epsilon_s$ ($p_e = \epsilon_s$).

II. Role of ARQ

In this section, the method of evaluating the performance of multicarrier systems is further described with respect to ARQ.

Figure 7A:
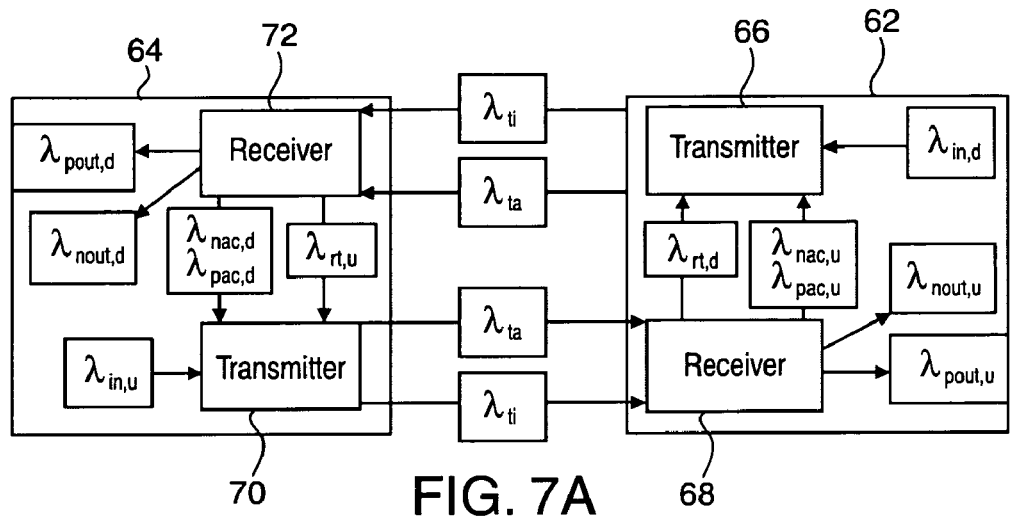
FIG. 7A illustrates data flows of a communications circuit in accordance with an embodiment of the present invention.

In FIG. 7A, a general model of a communication channel with ARQ is considered. In one embodiment, with some non-restrictive assumptions, an exact solution to evaluating the channel performance can be found. A simplified "no data upstream—no acknowledgement downstream" protocol is described and then applied to a general case. In another embodiment, a representation of this exact solution allows a system designer to evaluate different scenarios of channel performance in the upstream and downstream directions.

In one embodiment, for a not very poor quality DMT channel with FEC and ARQ, performance evaluation is reduced to evaluating the performance of a single QAM modem with characteristics averaged over all, or in an alternate embodiment at least a subset, of the sub-channels of the system. In one embodiment of the method, the approach is applied to a hypothetical DSL system compliant with the G.992.2 standard. The optimal parameters of the Reed-Solomon code and the optimum value of the maximum number of transmissions are evaluated depending on the signal-to-noise ratio distribution over the channel's frequency band and on the number of sub-channels used. This and subsequent sections also use the symbols defined in section I.

1. A Channel Model with FEC and ARQ

Referring to FIG. 7A, consider a general case of data transmission between two stations where both upstream and downstream stations, 62 and 64, respectively, send information and acknowledgement frames. The upstream and downstream stations, 62 and 64, have a transmitter and receiver, 66 and 68, 70 and 72, respectively. The error-controlling algorithm may be a combination of forward error correction and a cyclic redundancy check (CRC). In one embodiment, a multilevel Reed-Solomon type of code is used for FEC. Each information frame of the length $N_{u/d}$ code symbols has an information field of the length $K_{u/d}$ code symbols, a CRC field of the length $C_{u/d}$ code symbols, and a control field of the length $R_{u/d}$ code symbols. The length of the control field $R_{u/d}$ depends on the number of errors $t_{u/d}$ that FEC can correct. The length of the control field $R_{u/d}$ increases as the number of errors that can be corrected $t_{u/d}$ increases. The channel introduces an error with a "raw" symbol error rate of $p_{e,u}$ in the upstream direction and $p_{e,d}$ in the downstream direction. Each acknowledgement frame has the length of $M_{u/d}$ code; and $M_{u/d} \ll N_{u/d}$. The channel data rates, in bits per second, are $V_u$ in the upstream direction and $V_d$ in the downstream direction.

Forward error correction allows the stations to correct and accept an information frame with a number of errors less than or equal to the maximum number of correctable errors $t_{u/d}$. When an information frame has more than the maximum number of correctable errors $t_{u/d}$, the CRC field allows the stations to detect the errors that remain after applying forward error correction, and a negative acknowledgement frame is sent to the peer station. In addition, a positive acknowledgement frame is sent by the upstream/downstream station after $m_{u/d}$ information frames were received with no or correctable errors. The probability $p_{u/d}$ of an information frame being accepted in this scheme is:

$$p_u = \sum_{i=0}^{t_u} p_{e,u}^i (1-p_{e,u})^{N_u-i} \binom{N_u}{i} \tag{12.1}$$

$$p_d = \sum_{i=0}^{t_d} p_{e,d}^i (1-p_{e,d})^{N_d-i} \binom{N_d}{i} \tag{12.2}$$

The above description can be generalized to introduce erasures in the decoding procedure. If $e_{r,u/d}$ positions of supposedly unreliable code symbols (erasures) are made known to the decoder then the number of errors to be corrected by FEC $t_{u/d}$ with redundancy $R_{u/d}$ is:

$$t_{u/d} = \left\lfloor \frac{R_{u/d} + 1 + e_{r,u/d}}{2} \right\rfloor, \tag{12.3}$$

and the maximum number of errors corrected by introducing erasures (reached at $e_{r,u/d} = R_{u/d}$) is $R_{u/d}$.

In FIG. 7A, the information flows between the transmitters 66, 70 and receivers 68, 72 are shown. An application executing on the upstream or downstream station, 62 or 64, respectively, communicates with another application executing on its peer station. The input intensities (in frames/sec) of information frame generation are application-dependent and denoted by $\lambda_{in,u/d}$ (a "u" or "d" in the subscript indicates an information frame sent upstream or downstream, respectively). Before the FEC frame is sent upstream or downstream, control (redundancy) symbols are added to each information portion. The transmitter intensities in the upstream/downstream direction are $\lambda_{t,u/d} = \lambda_{ti,u/d} + \lambda_{ta,d/u}$, where $\lambda_{ti,u/d}$ and $\lambda_{ta,u/d}$ are portions of the transmitter intensities related to sending information and acknowledgement frames, respectively. In this description, the terms "ti,u" or "ti,d" denote an information frame sent to the upstream or downstream station, respectively; while the terms "ta,u" or "ta,d" denote an acknowledgement frame sent by the upstream or downstream station, respectively. Each transmitter intensity $\lambda_{ti,u/d} = \lambda_{in,u/d} + \lambda_{rt,u/d}$, where $\lambda_{rt,u/d}$ is the intensity of frames to be retransmitted. The frames to be retransmitted are stored in buffers at the respective downstream or upstream stations. The upstream or downstream station receives an information frame and determines whether the information frame is error-free or correctable ($\lambda_{pout,u/d}$). For each non-correctable information frame, the respective upstream or downstream station sends a negative acknowledgment ($\lambda_{nac,u/d}$) An information frame with errors that has not reached the transmission limit of $k_{u/d}$ is rejected; otherwise the information frame is accepted by the respective upstream or downstream station ($\lambda_{nout,u/d}$). Also, for flow control a positive acknowledgment frame is sent from the upstream/downstream station for every $m_{u/d}$ good/correctable information frames ($\lambda_{pac,u/d}$) that are received. The intensity of transmitting acknowledgment frames $\lambda_{ta,u/d}$ is determined as follows: $\lambda_{ta,u/d}=\lambda_{nac,u/d}+\lambda_{pac,u/d}$. When a negative acknowledgement is received by the downstream or upstream station's receiver, the downstream or upstream station retransmits, with an intensity of $\lambda_{rt,u/d}$, the corresponding information frame stored in the downstream or upstream, respectively, station's buffer if the total number of transmissions for that information frame has not reached the maximum number of transmissions $k_{u/d}$. Otherwise, the storage buffer associated with that information frame is cleared. This section assumes that no frames can be lost between stations. Since an acknowledgement frame is much shorter than an information frame, this section also assumes that acknowledgement frames are not corrupted and are not retransmitted.

Figure 7B:
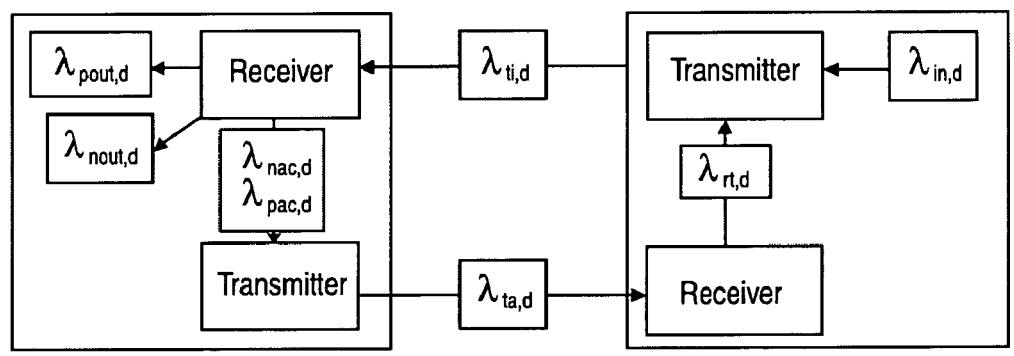
FIG. 7B illustrates data flows of a "no data upstream-no acknowledgement downstream" circuit model of the communications circuit of FIG. 7A.
Figure 7C:
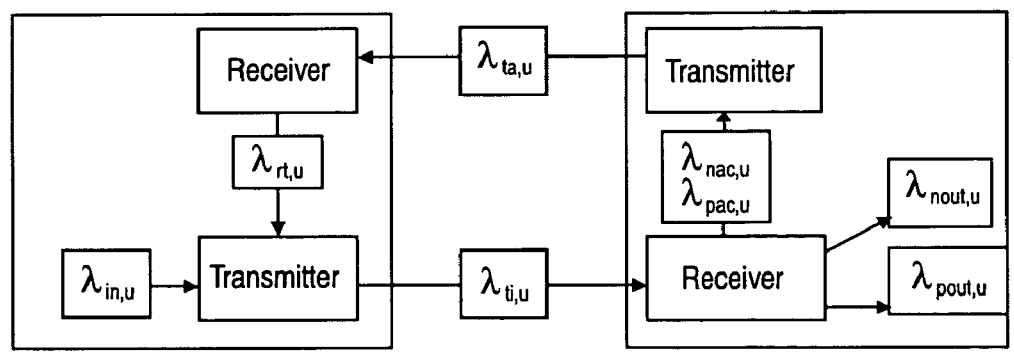
FIG. 7C illustrates data flows of a "no data downstream-no acknowledgment upstream" circuit model of the communications circuit of FIG. 7A.

This general model can be exactly solved because the communication circuit of FIG. 7A is equivalent to two separate communication circuits that are superimposed as shown in FIGS. 7B and 7C. In FIG. 7B, a "no data upstream-no acknowledgement downstream" circuit transmits, acknowledges and re-transmits information frames in the downstream channel. In FIG. 7C, a "no data downstream-no acknowledgement upstream" circuit transmits, acknowledges and re-transmits information frames in the upstream channel.

Referring to FIG. 7B, consider the flow of acknowledgements in the channel. The downstream station's receiver generates a retransmission request for non-correctable frames (a negative acknowledgment) with intensity of $\lambda_{rt,d}$ and the downstream station accepts non-correctable, after $k_d$ transmissions, information frames at an intensity of $\lambda_{nout,d}$, respectively, in accordance with the following relationships:

$$\lambda_{rt,d} = \lambda_{nac,d} \frac{(1-p_d)+(1-p_d)^2+\ldots+(1-p_d)^{k_d-1}}{(1-p_d)+(1-p_d)^2+\ldots+(1-p_d)^{k_d-1}+(1-p_d)^{k_d}} = \lambda_{nac,d}\frac{1-(1-p_d)^{k_d-1}}{1-(1-p_d)^{k_d}} \quad (12.4)$$

$$\lambda_{nout,d} = \lambda_{nac,d}\frac{(1-p_d)^{k_d}}{(1-p_d)+(1-p_d)^2+\ldots+(1-p_d)^{k_d-1}+(1-p_d)^{k_d}} = \lambda_{nac,d}\frac{p_d(1-p_d)^{k_d-1}}{1-(1-p_d)^{k_d}} \quad (12.5)$$

and $\lambda_{nac,d}=\lambda_{rt,d}+\lambda_{nout,d}$. Equations (12.4) and (12.5) follow from the fact that the probability for an erroneous (after correction) information frame being transmitted less than the maximum number of transmissions $k_d$ is in accordance with the following relationship:

$$\frac{1-(1-p_d)^{k_d-1}}{1-(1-p_d)^{k_d}},$$

and upon receiving an erroneous information frame, the downstream station sends a negative acknowledgement.

Next, at the upstream transmitter, the information flow in the downstream direction $\lambda_{ti,d}$ comprises new frames ($\lambda_{in,d}$) and retransmissions ($\lambda_{rt,d}$) as follows:

$\lambda_{ti,d}=\lambda_{in,d}+\lambda_{rt,d}$, or $$\lambda_{ti,d} = \lambda_{in,d} + \lambda_{nac,d}\frac{1-(1-p_d)^{k_d-1}}{1-(1-p_d)^{k_d}}. \quad (12.6)$$

Next, at the downstream receiver, the input is divided into error-free or correctable frames with probability $p_d$, and non-correctable frames with probability $1-p_d$. Therefore, the transmission intensity of error-free and correctable frames $\lambda_{pout,d}$ is in accordance with the following relationship:

$$\lambda_{pout,d} = p_d\lambda_{ti,d} = p_d\lambda_{in,d} + \lambda_{nac,d}p_d\frac{1-(1-p_d)^{k_d-1}}{1-(1-p_d)^{k_d}}. \quad (12.7)$$

Since each non-correctable information frame with a number of transmissions less than the maximum number of transmissions $k_d$ generates one negative acknowledgement frame, the transmission intensity of negative acknowledgment frames $\lambda_{nac,d}$ is in accordance with the following relationship:

$$\lambda_{nac,d}=(1-p_d)\lambda_{ti,d}. \quad (12.8)$$

Combining Equations (12.8) and (12.6) yields the following relationship for determining the transmission intensity of negative acknowledgment frames $\lambda_{nac,d}$:

$$\lambda_{nac,d} = (1-p_d)\lambda_{in,d} + \lambda_{nac,d}(1-p_d)\frac{1-(1-p_d)^{k_d-1}}{1-(1-p_d)^{k_d}} \quad (12.9)$$

which yields:

$$\lambda_{nac,d} = \lambda_{in,d}[1-(1-p_d)^{k_d}]\frac{(1-p_d)}{p_d} \quad (12.10)$$

The other intensities, defined above, can be expressed in terms of the intensity of information frames $\lambda_{in,d}$ in accordance with the following relationships:

$$\lambda_{ti,d} = \lambda_{in,d}\frac{1-(1-p_d)^{k_d}}{p_d}, \quad (12.11)$$

$$\lambda_{pout,d}=\lambda_{in,d}[1-(1-p_d)^{k_d}], \quad (12.12)$$

$$\lambda_{rt,d} = \lambda_{in,d} \frac{(1-p_d)\lfloor 1-(1-p_d)^{k_d-1}\rfloor}{p_d}, \qquad (12.13)$$

$$\lambda_{nout,d} = \lambda_{in,d}(1-p_d)^{k_d}. \qquad (12.14)$$

Since every $m_d$-th error-free or correctable information frame yields a positive acknowledgement frame, the transmission intensity of positive acknowledgement frames $\lambda_{pac,d}$ and acknowledgement frames $\lambda_{ta,d}$ is in accordance with the following relationships, respectively:

$$\lambda_{pac,d} = \frac{p_d \lambda_{ti,d}}{m_d} = \frac{\lambda_{in,d}}{m_d}[1-(1-p_d)^{k_d}] \qquad (12.15)$$

and $$\lambda_{ta,d} = \lambda_{in,d}\left[\frac{1}{m_d} + \frac{1-p_d}{p_d}\right][1-(1-p_d)^{k_d}]. \qquad (12.16)$$

From Equations (12.12) and (12.14), the number of information bits sent by the upstream application per unit time, $\Lambda_d$, equals the information input intensity (in bits/sec), as expected:

$$\Lambda_d = \alpha K_d (\lambda_{pout,d} + \lambda_{nout,d}) = \alpha K_d \lambda_{in,d}. \qquad (12.17)$$

In Equation (12.17), $\alpha$ is the number of bits per Reed-Solomon code symbol. When the value of the maximum number of transmissions $k_d$ is large, the information input intensity $\Lambda_d$ can be represented as follows:

$$\Lambda_d = \alpha K_d \lambda_{in,d}, \; \lambda_{pac,d} = \frac{\lambda_{in,d}}{m_d},$$

$$\lambda_{rt,d} = \lambda_{in,d} \frac{1-p_d}{p_d}, \; \lambda_{ti,d} = \lambda_{in,d} \frac{1}{p_d}, \; \lambda_{nout,d} = 0$$

When the value of the maximum number of transmissions $k_d$ is equal to one ($k_d=1$) and information frames are not retransmitted, the information input intensity $\Lambda_d$ can be represented as follows:

$$\Lambda_d = \alpha K_d \lambda_{in,d}, \; \lambda_{pac,d} = \frac{\lambda_{in,d} p_d}{m_d}, \; \lambda_{rt,d} = 0,$$

$$\lambda_{ti,d} = \lambda_{in,d}, \; \lambda_{nout,d} = \lambda_{in,d}(1-p_d).$$

The derivation for the circuit shown in FIG. 7C is the same as for the circuit of FIG. 7B except that the subscript 'd' is replaced by a 'u' in Equations (12.4) to (12.17). Therefore, all intensities in the communication circuit shown in FIG. 7A are determined.

In the above derivation, arbitrary values of the input intensities of information frame generation $\lambda_{in,u/d}$ are assumed. Alternately, in practice, there are two upper bounds of the input intensity of information frame generation $\lambda_{in,u/d}$ related to the data rates, $V_u$ and $V_d$, in the upstream and downstream directions, respectively. The bounds are derived from the following inequalities:

$$\alpha N_u \lambda_{ti,u} + \alpha M_d \lambda_{ta,d} \leq V_u, \text{ and} \qquad (12.18)$$

$$\alpha N_d \lambda_{ti,d} + \alpha M_u \lambda_{ta,u} \leq V_d. \qquad (12.19)$$

Applying Equations (12.11), (12.16), and (12.17) to inequalities (12.18) and (12.19) yields:

$$\frac{M_d}{K_d}\left[\frac{1}{m_d} + \frac{1-p_d}{p_d}\right][1-(1-p_d)^{k_d}]\Lambda_d + \frac{N_u}{K_u}\frac{1-(1-p_u)^{k_u}}{p_u}\Lambda_u \leq V_u \qquad (12.20)$$

$$\frac{N_d}{K_d}\frac{1-(1-p_d)^{k_d}}{p_d}\Lambda_d + \frac{M_u}{K_u}\left[\frac{1}{m_u} + \frac{1-p_u}{p_u}\right][1-(1-p_u)^{k_u}]\Lambda_u \leq V_d \qquad (12.21)$$

Figure 8A:
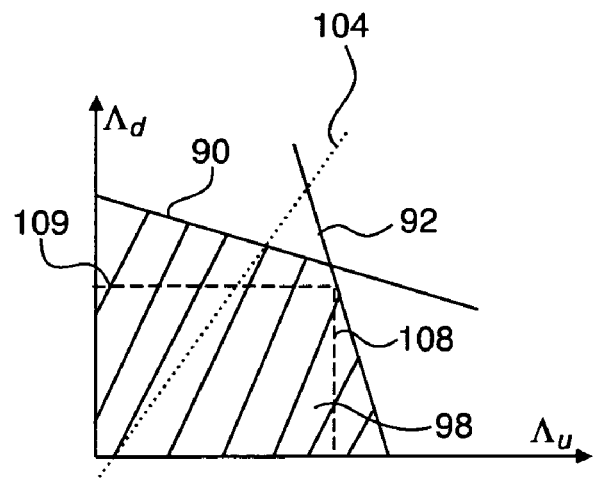
FIGS. 8A and 8B depict a relationship between the channel throughput values in the upstream and downstream directions.

In one embodiment, one goal in designing a communication system is to maximize the throughput H in the upstream and downstream directions, i.e., to find $H_u$=max $\Lambda_u$, $H_d$=max $\Lambda_d$. The parameters $\Lambda_{u/d}$ are not maximized independently of each other. Instead, the data rate in the downstream direction $\Lambda_d$ is chosen and the data rate in the upstream direction $\Lambda_u$ is maximized within the constraints of Equations (12.20) and (12.21). This procedure relates the throughput values of the upstream and downstream channels, as shown in FIG. 8A by dashed lines 108 and 109 and in FIG. 8B by dashed lines 110 and 111.

In one exemplary embodiment, the solution of Equations (12.20) and (12.21) is constructed to determine a "summary" throughput of the upstream and downstream channels. The condition imposed equates $\Lambda_d/\Lambda_u$ and $V_d/V_u$, as would be the case if the circuit shown in FIG. 7A were error free, i.e.:

$$H=\max(\Lambda_u+\Lambda_d)=H_u+H_d, \text{ where}$$

$$\frac{\Lambda_u}{V_u} = \frac{\Lambda_d}{V_d} \qquad (12.22)$$

Figure 8B:
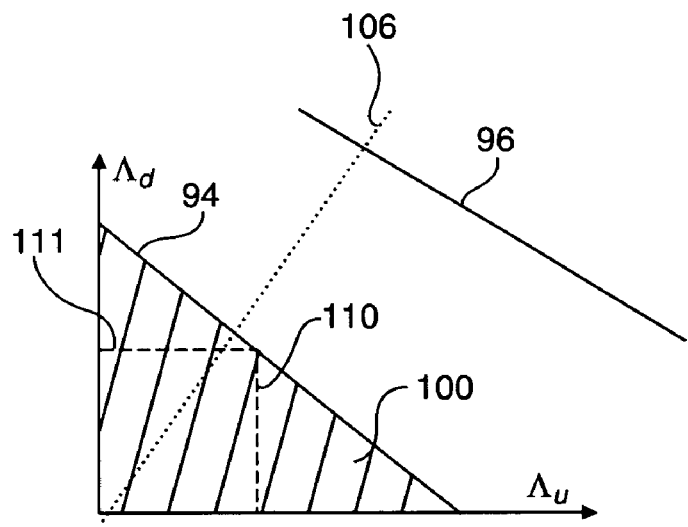

FIGS. 8A and 8B illustrate possible graphical solutions of Equations (12.20)–(12.22) in the ($\Lambda_u$, $\Lambda_d$) plane. Depending on whether the two straight lines, 90 and 92, 94 and 96, bounding the solution regions 98, 100 in Equations (12.20) and (12.21) have a common point inside or outside of the first quadrant of the ($\Lambda_u$, $\Lambda_d$) plane, the situations shown in FIGS. 8A and 8B result, respectively. In FIG. 8A, when the restrictions of Equations (12.20) and (12.21)) are concurrent, the solution of Equations (12.20)–(12.22) corresponds to the intersection of a straight line 104 given by Equation (12.22) and one of the solution boundaries in Equation (12.20) or (12.21), depending on the ratio $V_d/V_u$. In FIG. 8B, when one of the restrictions of Equations (12.20)–(12.22) is always stronger than the other, the solution of Equations (12.20)–(12.21) corresponds to the intersection of a straight line 106 given by Equation (12.22) and one of the solution boundaries in Equations (12.20) or (12.21), depending on which restriction is stronger.

The throughput H in the upstream and downstream directions, respectively, that is generated by the graphical solution of Equations (12.20)–(12.22), may be presented in the following analytical form:

$$H_u = \max\Lambda_u = \qquad (12.23)$$

$$\min\left\{\begin{array}{l}V_u \Big/ \left[\dfrac{N_d}{K_d}1 - \dfrac{(1-p_d)^{k_d}}{p_d} + \dfrac{M_u}{K_u}\dfrac{V_u}{V_d}\left(\dfrac{1}{m_u} + \dfrac{1-p_u}{p_u}\right)(1-(1-p_u)^{k_u})\right],\\ V_u \Big/ \left[\dfrac{M_d}{K_d}\dfrac{V_d}{V_u}\left(\dfrac{1}{m_d} + \dfrac{1-p_d}{p_d}\right)(1-(1-p_d)^{k_d}) + \dfrac{N_u}{K_u}\dfrac{1-(1-p_u)^{k_u}}{p_u}\right]\end{array}\right\}$$

$$H_d = \max\Lambda_d = \qquad (12.24)$$

$$\min\left\{\begin{array}{l}V_d \Big/ \left[\dfrac{N_d}{K_d}1 - \dfrac{(1-p_d)^{k_d}}{p_d} + \dfrac{M_u}{K_u}\dfrac{V_u}{V_d}\left(\dfrac{1}{m_u} + \dfrac{1-p_u}{p_u}\right)(1-(1-p_u)^{k_u})\right],\\ V_d \Big/ \left[\dfrac{M_d}{K_d}\dfrac{V_d}{V_u}\left(\dfrac{1}{m_d} + \dfrac{1-p_d}{p_d}\right)(1-(1-p_d)^{k_d}) + \dfrac{N_u}{K_u}\dfrac{1-(1-p_u)^{k_u}}{p_u}\right]\end{array}\right\}$$

There was an implicit, albeit trivial, assumption made when the above equations were derived. Specifically, that the service intensity of each element of the communication circuit is larger than the corresponding intensity of the data entering that element. If this assumption is not true, there will be a growing queue of frames in front of this element, and the steady-state solution that was derived will not be realized. In addition, these data intensities allow a channel designer to estimate the minimum service intensity of each element of the circuit needed for the system to function reliably without flow congestion.

The code symbol error rate SER values in the respective upstream and downstream directions can also be estimated in accordance with the following relationships:

$$SER_u = \dfrac{1}{N_u}\left[\sum_{i=t_u+1}^{N_u} ip_{e,u}^i(1-p_{e,u})^{N_u-i}\binom{N_u}{i}\right]\left[\sum_{i=t_u+1}^{N_u} p_{e,u}^i(1-p_{e,u})^{N_u-i}\binom{N_u}{i}\right]^{k_u-1} \quad (12.25)$$

$$SER_d = \dfrac{1}{N_d}\left[\sum_{i=t_d+1}^{N_d} ip_{e,d}^i(1-p_{e,d})^{N_d-i}\binom{N_d}{i}\right]\left[\sum_{i=t_d+1}^{N_d} p_{e,d}^i(1-p_{e,d})^{N_d-i}\binom{N_d}{i}\right]^{k_d-1} \quad (12.26)$$

When the maximum number of transmissions $k_{u/d}$ is large, the respective code symbol error rate $SER_{u/d}$ values tend to zero.

The average number of transmissions v for a frame to get to the output stream are:

$$v_u = \dfrac{1-(1-p_u)^{k_u}}{p_u}, \qquad (12.27)$$

$$v_d = \dfrac{1-(1-p_d)^{k_d}}{p_d}. \qquad (12.28)$$

In another embodiment, the present invention can be used when many $n_{app}$ pairs of applications are communicating across the channel. For example, this situation occurs when Internet users run several applications at once on the same machine, such as concurrently browsing the Web, listening to an Internet radio station, and downloading a file at the same time. When many pairs of applications are communicating across the channel, all variables in Equations (12.1) to (12.17) and (12.25) to (12.28) (except for the data rates, $V_d$ and $V_u$) would be indexed by j, the order number of a given application pair, since the FEC and ARQ parameters can generally be application-dependent. The inequalities of Equations (12.18) and (12.19) can be rewritten as follows:

$$\sum_{j=1}^{n_{app}} \alpha(j)N_u(j)\lambda_{ti,u}(j) + \sum_{j=1}^{n_{app}} \alpha(j)M_d(j)\lambda_{ta,d}(j) \le V_u, \quad (12.29)$$

$$\sum_{j=1}^{n_{app}} \alpha(j)N_d(j)\lambda_{ti,d}(j) + \sum_{j=1}^{n_{app}} \alpha(j)M_u(j)\lambda_{ta,u}(j) \le V_d, \quad (12.30)$$

with the subsequent modification of Equations (12.20) to (12.24).

2. FEC/ARQ-Related Performance Gain for DMT Systems

Referring back to FIG. 7B, in another embodiment, without loss of generality, the "no data upstream-no acknowledgement downstream" system will be discussed. Since only this embodiment will discussed in this subsection, the subscripts denoting the direction of data flow are used. In this case, Equations (12.20) and (12.21) are reduced to the following form:

$$\dfrac{M}{K}\left[\dfrac{1}{m} + \dfrac{1-p}{p}\right][1-(1-p)^k]\Lambda \le V_u, \; \dfrac{N}{K}\cdot\dfrac{1-(1-p)^k}{p}\Lambda \le V_d. \quad (13.1)$$

From Equation (13.1) that the channel throughput H can be expressed as follows:

$$H = \qquad (13.2)$$

$$\max\Lambda = \min\left[\dfrac{pK}{1-(1-p)^k}\dfrac{V_d}{N}, \dfrac{mpK}{[1-(1-p)^k]\cdot[p+m(1-p)]}\dfrac{V_u}{M}\right].$$

In system design, the data rates, $V_u$ and $V_d$, can be chosen so that the minimum in Equation (13.2) would be equal to the first term on the right hand side of Equation (13.2):

$$H = \frac{pK}{1-(1-p)^k} \frac{V_d}{N} \le \frac{mpK}{[1-(1-p)^k] \cdot [p+m(1-p)]} \frac{V_u}{M}. \quad (13.3)$$

The inequality of Equation (13.3) holds in practical systems because the transport of information determines the actual rate at which the acknowledgement messages are sent. From Equations (13.3) and (12.27), the channel throughput H can be determined as follows:

$$H = \frac{K}{N} \frac{V_d}{v}. \quad (13.4)$$

Defining the total number of bits to be sent as H'=HN/K, yields:

$$H' = \frac{V_d}{v}. \quad (13.5)$$

The data rate in an ARQ system is divided by the average number of transmissions v to obtain the actual channel throughput. This result will be applied below to estimate the FEC/ARQ-related performance gain of a multicarrier channel with a DMT modulation scheme.

A DMT system, for example, a DSL system, can be thought of as several QAM modems, and in the simplest case, just one QAM modem. Each QAM waveform corresponds to a binary array of $b_i$ bits, i=1, ... n, and is carried in one of the sub-channels. A DMT symbol is the superposition of these n waveforms. For example, the to superimposed waveforms making up a DMT symbol is the basic waveform used in DSL communications. The size of a DMT symbol $B_{DMT}$ in bits is determined in accordance with the following relationship:

$$B_{DMT} = \sum_{i=1}^{n} b_i, \text{ where} \quad (13.6)$$

$b_i$ is the number of bits per subchannel.

The bit load equation for a single QAM sub-channel with FEC/ARQ derived above is:

$$1 - \left(1 - W(t,K,k)\varepsilon_S^{\frac{1}{(t+1)k}}\right)^{1/\alpha} = \quad (13.7)$$

$$\frac{\omega(b_i)(1 - 2^{-b_i/2})\mathrm{erfc}\left(\sqrt{3 \cdot 10^{\gamma_i/10}/(2^{b_i+1}-2)}\right)}{\left[2 - (1-2^{-b_i/2})\mathrm{erfc}\left(\sqrt{3 \cdot 10^{\gamma_i/10}/(2^{b_i+1}-2)}\right)\right]}.$$

$\omega(b_i)$ is an average fraction of erroneous bits in a $b_i$-sized erroneous QAM symbol having the following form:

$$\omega(b_i) = \frac{4}{3+2b_i}, \quad (13.8)$$

$\gamma_i$ is the signal-to-noise ratio at the i-th subchannel; $\epsilon_s$ is the SER in the system:

$$\varepsilon_S = 1 - \left(1 - \frac{\varepsilon}{\beta}\right)^\alpha, \quad (13.9)$$

where $\epsilon$ is the BER level required for the data, the coefficient $\beta$ accounts for the effect of a descrambler; and $$W(t,K,k) = \left[\binom{K+C+R-1}{t}\right]^{\frac{1}{(t+1)k}} \left[\binom{K+C+R}{t+1}\right]^{\frac{k-1}{(t+1)k}} \quad (13.10)$$

Equation (13.7) is solved numerically.

The net coding gain of a DMT symbol $G_n(t,K,k)$, that is, the excess information throughput per DMT symbol due to FEC and ARQ, is determined in accordance with the following relationship:

$$G_n(t,K,k) \equiv \frac{K}{K+C+R} \frac{B_{DMT}(t,K,k)}{v} - \frac{K}{K+C} B_{DMT}(0,K,1) \quad (13.11)$$

The factor K/(K+C+R) in Equation (13.11) takes the FEC redundancy into account. One difference between Equation (13.11) and its counterpart, Equation (5.6) of Section I, is the presence of the average number of transmissions v to account for ARQ in the communication scheme. Including the average number of transmissions v in the definition of the net coding gain for a DMT symbol in a channel with ARQ follows from Equation (13.4).

The G.992.2 standard calls for the channel data rate to be transferred. Therefore the line coding gain, i.e., the total increase in the number of bits to be sent with one DMT symbol, $G_l(t,K,k)$ due to FEC and ARQ is the difference between the number of bits in a DMT symbol without FEC and ARQ ($B_{DMT}(0,K,1)$ in which t=0 and k=1) and the number of bits in a DMT symbol with FEC and ARQ ($B_{DMT}(t,K,k)$). The total increase in the number of bits to be sent with one DMT symbol, the line coding gain, $G_l(t,K,k)$ is determined in accordance with the following relationship:

$$G_l(t,K,k) \equiv B_{DMT}(t,K,k) - B_{DMT}(0,K,1). \quad (13.12)$$

3. Mean-field Approximation for a Multicarrier Channel with ARQ

The following mean-field approximation was introduced and shown to be valid above in section I:

$$B_{DMT} = \sum_{i=1}^{n_{eff}} b(\gamma_i) \approx n_{eff} b(\gamma_{eff}). \quad (14.1)$$

The effective number of subchannels $n_{eff}$ and the effective signal-to-noise ratio $\gamma_{eff}$ are respectively determined as follows:

$$n_{eff} = \sum_{\gamma_i > \gamma^*} 1, \text{ and} \qquad (14.2)$$

$$\gamma_{eff} = \frac{1}{n_{eff}} \sum_{\gamma_i > \gamma^*} \gamma_i, \qquad (14.3)$$

where $\gamma^*$ is the threshold signal-to-noise ratio below which no information can be passed through the subchannel.

Figure 9:
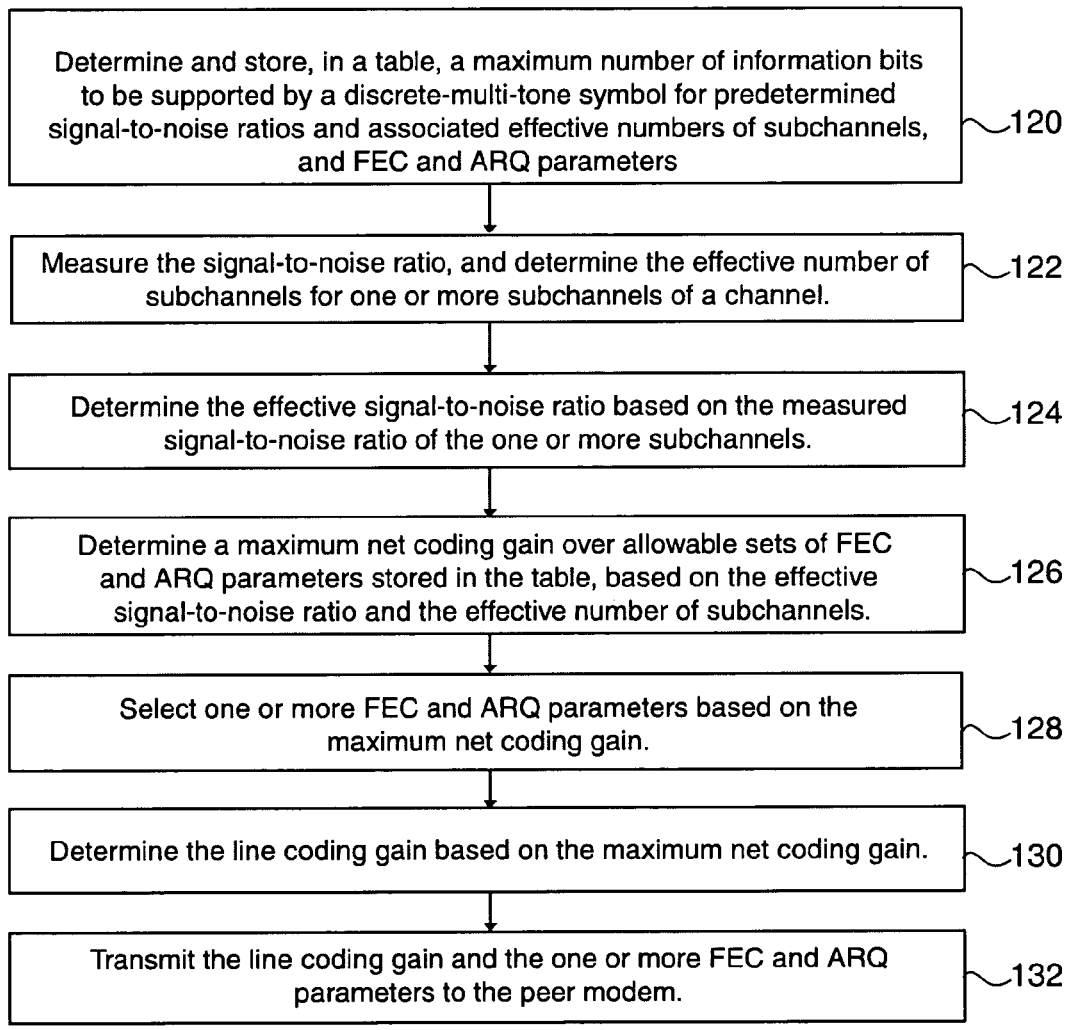
FIG. 9 is a flowchart of an initialization procedure in accordance with an embodiment of the present invention that specifies a maximum number of transmissions.

Referring to FIG. 9, a flowchart uses approximations (14.1)–(14.3) to determine the channel performance based on FEC and ARQ parameters. In one embodiment, the flowchart of FIG. 9 is implemented in the initialization module 48 of the modem driver 40 (FIG. 1). In step 120, a number of information bits to be supported by a subchannel for allowable sets of FEC and ARQ parameters, predetermined effective signal-to-noise ratios $\gamma_{eff}$ and associated effective numbers of subchannels $n_{eff}$ is determined. For these values of $\gamma_{eff}$ and $n_{eff}$, Equation (13.7) is solved at different allowable values of the maximum number of correctable errors t, the size of the information field K, and the maximum number of transmissions k; this solution, combined with Equation (14.1), yields the maximum number of information bits able to be supported by a DMT symbol within the system's constraints. In one embodiment, this information is stored in a table. In an exemplary table shown in Table 7, below, multiple columns compare different embodiments of determining a number of information bits to be supported by a DMT symbol. Steps 122 and 124 are the same as steps 51 and 52 of FIG. 5 and will not be further described. In step 126, a maximum net coding gain over allowable sets of FEC and ARQ parameters is determined. In one embodiment, the table generated in step 120 is iteratively accessed for each allowable set of FEC and ARQ parameters based on the value of the effective number of subchannels and the effective signal-to-noise ratio to retrieve the associated number of bits per subchannel. The net coding gain per subchannel for each allowable set of FEC parameters is determined in accordance with Equation (14.4) below:

$$g_n(t, K, k) \equiv \frac{G_n(t, K, k)}{n_{eff}} = \frac{K}{K+C+R} \frac{b(\gamma_{eff}, t, K, k)}{v} - \frac{K}{K+C} b(\gamma_{eff}, 0, K, 1) \qquad (14.4)$$

In step 128, one or more FEC parameters and at least one ARQ parameter is selected based on the maximum net coding gain per subchannel $g_n$. The selected FEC and ARQ parameters yield the largest, that is, the maximum value of the net coding gain as determined in accordance with Equation (14.4).

In step 130, the corresponding line coding gain $g_l$ is determined based on the FEC and ARQ parameters that provide the maximum net coding gain $g_n$. The line coding gain per subchannel $g_l$ is determined in accordance with the following relationship:

$$g_l(t, K, k) \equiv \frac{G_l(t, K, k)}{n_{eff}} = b(\gamma_{eff}, t, K, k) - b(\gamma_{eff}, 0, K, 1) \qquad (14.5)$$

In step 132, the line coding gain, the selected FEC parameters and the selected maximum number of transmissions k are transmitted to the peer modem.

In one embodiment, the corresponding net coding gain $g_n(t,K,k)$ and the total increase in the number of bits per subchannel, the line coding gain, $g_l(t,K,k)$ are the same for all working subchannels in the approximation. The number of bits per subchannel is adjusted such that all subchannels receive the same increase in bit load. Alternately, number of bits per subchannel is adjusted such that a subset of the subchannels receive the same increase in bit load Since Equation (13.7) is a nonlinear relation between the signal-to-noise ratio and the number of bits per subchannel, the validity of the mean-field approximation is not obvious for multicarrier channels with FEC and ARQ. To demonstrate the validity of the mean-field approximation, the following approximate solution of Equation (13.7) was derived:

$$b = [\gamma + \Phi((\gamma, t, K, k, \epsilon)] / 10 \log 2, \qquad (14.6)$$

$$\Phi(\gamma, t, K, k, \varepsilon) = \qquad (14.7)$$

$$10\log\left\{10^{-\gamma/10} + \frac{3\log e}{2\log\left[\frac{\alpha\langle\omega(b)\rangle\sqrt{8/\pi}}{W(t, K, k)(\alpha\varepsilon/\beta)^{\frac{1}{(t+1)k}}}\right] - \log\log\left[\frac{\alpha\langle\omega(b)\rangle\sqrt{8/\pi}}{W(t, K, k)(\alpha\varepsilon/\beta)^{\frac{1}{(t+1)k}}}\right] + \log\left(\frac{\log e}{2}\right)}\right\}$$

and $$\langle\omega(b)\rangle = \frac{1}{b_{\max}} \int_1^{b_{\max}} \omega(b)(1 - 2^{-b/2}) db,$$

where $b_{max}$ is the maximum bit load per subchannel allowed in the communication protocol.

The accuracy of Equation (14.6) was tested and described when no retransmissions were used (k=1) in section I by comparing the values of the number of bits per subchannel b given by Equation (14.6) to the values found from numerically solving Equation (13.7). Below the results of a similar study in case with at least one retransmission (k≧2) is presented. In the study below, the length of the information field K was varied between 16 and 256, the maximum number of correctable errors t was varied between 0 and 8, the signal-to-noise ratio γ was varied between 10 and 50 dB, the maximum number of bits per subchannel $b_{max}$, was equal to 15, and the maximum number of transmissions k was equal to 2. Tables 7, 8 and 9, below, show the results for information field lengths K equal to 16, 64, and 256, respectively.

TABLE 7

Results of computing the number of bits per subchannel by SNR $\gamma$ and t
$\epsilon=10^{-7}$, $\beta=3$, $\alpha=8$, C=0, k=2, K=16, $e_r$=0.

| $\gamma$, dB | b (Equation (13.7)) | b (Equation (14.6)) | b (Equation (14.8)) |
|---|---|---|---|
| t=0 | | | |
| 10 | 1.442432e+000 | 1.475946e+000 | 8.332226e−001 |
| 15 | 2.674824e+000 | 2.729902e+000 | 2.494187e+000 |
| 20 | 4.183037e+000 | 4.233935e+000 | 4.155151e+000 |
| 25 | 5.808428e+000 | 5.841497e+000 | 5.816115e+000 |
| 30 | 7.473964e+000 | 7.485154e+000 | 7.477079e+000 |
| 35 | 9.151482e+000 | 9.140601e+000 | 9.138043e+000 |
| 40 | 1.083170e+001 | 1.079982e+001 | 1.079901e+001 |
| 45 | 1.251171e+001 | 1.246023e+001 | 1.245997e+001 |
| 50 | 1.419067e+001 | 1.412102e+001 | 1.412094e+001 |
| t=1 | | | |
| 10 | 1.846585e+000 | 1.913501e+000 | 1.468438e+000 |
| 15 | 3.201409e+000 | 3.285509e+000 | 3.129402e+000 |
| 20 | 4.773598e+000 | 4.841582e+000 | 4.790367e+000 |
| 25 | 6.430039e+000 | 6.467724e+000 | 6.451331e+000 |
| 30 | 8.113574e+000 | 8.117499e+000 | 8.112295e+000 |
| 35 | 9.804259e+000 | 9.774906e+000 | 9.773259e+000 |
| 40 | 1.149564e+001 | 1.143474e+001 | 1.143422e+001 |
| 45 | 1.318575e+001 | 1.309535e+001 | 1.309519e+001 |
| 50 | 1.487409e+001 | 1.475620e+001 | 1.475615e+001 |
| t=2 | | | |
| 10 | 2.071352e+000 | 2.160346e+000 | 1.795027e+000 |
| 15 | 3.481171e+000 | 3.581809e+000 | 3.455991e+000 |
| 20 | 5.082039e+000 | 5.157941e+000 | 5.116955e+000 |
| 25 | 6.754015e+000 | 6.791006e+000 | 6.777919e+000 |
| 30 | 8.448035e+000 | 8.443035e+000 | 8.438883e+000 |
| 35 | 1.014727e+001 | 1.010116e+001 | 1.009985e+001 |
| 40 | 1.184633e+001 | 1.176123e+001 | 1.176081e+001 |
| 45 | 1.354358e+001 | 1.342191e+001 | 1.342178e+001 |
| 50 | 1.523865e+001 | 1.508278e+001 | 1.508274e+001 |
| t=3 | | | |
| 10 | 2.222256e+000 | 2.326668e+000 | 2.005923e+000 |
| 15 | 3.665259e+000 | 3.776225e+000 | 3.666887e+000 |
| 20 | 5.283825e+000 | 5.363331e+000 | 5.327851e+000 |
| 25 | 6.966161e+000 | 7.000129e+000 | 6.988815e+000 |
| 30 | 8.667758e+000 | 8.653367e+000 | 8.649779e+000 |
| 35 | 1.037349e+001 | 1.031188e+001 | 1.031074e+001 |
| 40 | 1.207850e+001 | 1.197207e+001 | 1.197171e+001 |
| 45 | 1.378138e+001 | 1.363278e+001 | 1.363267e+001 |
| 50 | 1.548182e+001 | 1.529367e+001 | 1.529364e+001 |
| t=4 | | | |
| 10 | 2.333510e+000 | 2.449144e+000 | 2.157341e+000 |
| 15 | 3.799445e+000 | 3.917114e+000 | 3.818305e+000 |
| 20 | 5.430549e+000 | 5.511253e+000 | 5.479269e+000 |
| 25 | 7.120656e+000 | 7.150424e+000 | 7.140233e+000 |
| 30 | 8.828232e+000 | 8.804428e+000 | 8.801197e+000 |
| 35 | 1.053923e+001 | 1.046318e+001 | 1.046216e+001 |
| 40 | 1.224917e+001 | 1.212345e+001 | 1.212313e+001 |
| 45 | 1.395673e+001 | 1.378419e+001 | 1.378409e+001 |
| 50 | 1.566166e+001 | 1.544509e+001 | 1.544505e+001 |
| t=5 | | | |
| 10 | 2.420272e+000 | 2.544315e+000 | 2.273012e+000 |
| 15 | 3.903332e+000 | 4.025408e+000 | 3.933976e+000 |
| 20 | 5.544023e+000 | 5.624485e+000 | 5.594940e+000 |
| 25 | 7.240339e+000 | 7.265313e+000 | 7.255904e+000 |
| 30 | 8.952863e+000 | 8.919850e+000 | 8.916868e+000 |
| 35 | 1.066831e+001 | 1.057878e+001 | 1.057783e+001 |
| 40 | 1.238245e+001 | 1.223910e+001 | 1.223880e+001 |
| 45 | 1.409404e+001 | 1.389985e+001 | 1.389976e+001 |
| 50 | 1.580287e+001 | 1.556075e+001 | 1.556072e+001 |
| t=6 | | | |
| 10 | 2.490517e+000 | 2.621002e+000 | 2.365069e+000 |
| 15 | 3.987025e+000 | 4.111977e+000 | 4.026033e+000 |
| 20 | 5.635407e+000 | 5.714732e+000 | 5.686997e+000 |
| 25 | 7.336881e+000 | 7.356789e+000 | 7.347961e+000 |
| 30 | 9.053625e+000 | 9.011723e+000 | 9.008925e+000 |
| 35 | 1.077293e+001 | 1.067077e+001 | 1.066989e+001 |
| 40 | 1.249072e+001 | 1.233113e+001 | 1.233085e+001 |
| 45 | 1.420585e+001 | 1.399191e+001 | 1.399182e+001 |
| 50 | 1.591812e+001 | 1.565281e+001 | 1.565278e+001 |
| t=7 | | | |
| 10 | 2.548939e+000 | 2.684439e+000 | 2.440502e+000 |
| 15 | 4.056380e+000 | 4.183154e+000 | 4.101466e+000 |
| 20 | 5.711138e+000 | 5.788766e+000 | 5.762430e+000 |
| 25 | 7.417011e+000 | 7.431774e+000 | 7.423394e+000 |
| 30 | 9.137430e+000 | 9.087014e+000 | 9.084358e+000 |
| 35 | 1.086012e+001 | 1.074616e+001 | 1.074532e+001 |
| 40 | 1.258117e+001 | 1.240655e+001 | 1.240629e+001 |
| 45 | 1.429946e+001 | 1.406733e+001 | 1.406725e+001 |
| 50 | 1.601480e+001 | 1.572824e+001 | 1.572821e+001 |
| t=8 | | | |
| 10 | 2.598519e+000 | 2.737974e+000 | 2.503686e+000 |
| 15 | 4.115083e+000 | 4.242931e+000 | 4.164650e+000 |
| 20 | 5.775253e+000 | 5.850831e+000 | 5.825614e+000 |
| 25 | 7.484948e+000 | 7.494601e+000 | 7.486579e+000 |
| 30 | 9.208614e+000 | 9.150084e+000 | 9.147543e+000 |
| 35 | 1.093433e+001 | 1.080931e+001 | 1.080851e+001 |
| 40 | 1.265830e+001 | 1.246973e+001 | 1.246947e+001 |
| 45 | 1.437943e+001 | 1.413052e+001 | 1.413043e+001 |
| 50 | 1.609756e+001 | 1.579142e+001 | 1.579140e+001 |

TABLE 8

Results of computing the number of bits per subchannel by SNR and t
$\epsilon=10^{-7}$, $\beta=3$, $\alpha=8$, C=0, k=2, K=64, $e_r$=0.

| | b (Equation (13.7)) | b (Equation (14.6)) | b (Equation (14.8)) |
|---|---|---|---|
| t=0 | | | |
| 10 | 1.380088e+000 | 1.409355e+000 | 7.278630e+001 |
| 15 | 2.590019e+000 | 2.640925e+000 | 2.388827e+000 |
| 20 | 4.086176e+000 | 4.134372e+000 | 4.049791e+000 |
| 25 | 5.706040e+000 | 5.738042e+000 | 5.710755e+000 |
| 30 | 7.368719e+000 | 7.380404e+000 | 7.371719e+000 |
| 35 | 9.044357e+000 | 9.035435e+000 | 9.032683e+000 |
| 40 | 1.072307e+001 | 1.069452e+001 | 1.069365e+001 |
| 45 | 1.240176e+001 | 1.235489e+001 | 1.235461e+001 |
| 50 | 1.407951e+001 | 1.401566e+001 | 1.401558e+001 |
| t=1 | | | |
| 10 | 1.700733e+000 | 1.754496e+000 | 1.247372e+000 |
| 15 | 3.015413e+000 | 3.088738e+000 | 2.908336e+000 |
| 20 | 4.566812e+000 | 4.628823e+000 | 4.569300e+000 |
| 25 | 6.212740e+000 | 6.249354e+000 | 6.230264e+000 |
| 30 | 7.889766e+000 | 7.897292e+000 | 7.891228e+000 |
| 35 | 9.575442e+000 | 9.554112e+000 | 9.552192e+000 |
| 40 | 1.126254e+001 | 1.121376e+001 | 1.121316e+001 |
| 45 | 1.294858e+001 | 1.287431e+001 | 1.287412e+001 |
| 50 | 1.463319e+001 | 1.453514e+001 | 1.453508e+001 |
| t=2 | | | |
| 10 | 1.875161e+000 | 1.944778e+000 | 1.510854e+000 |
| 15 | 3.237406e+000 | 3.323632e+000 | 3.171818e+000 |
| 20 | 4.813440e+000 | 4.882539e+000 | 4.832782e+000 |
| 25 | 6.471888e+000 | 6.509667e+000 | 6.493746e+000 |
| 30 | 8.156718e+000 | 8.159764e+000 | 8.154710e+000 |
| 35 | 9.848428e+000 | 9.817274e+000 | 9.815674e+000 |
| 40 | 1.154072e+001 | 1.147714e+001 | 1.147664e+001 |
| 45 | 1.323166e+001 | 1.313776e+001 | 1.313760e+001 |
| 50 | 1.492079e+001 | 1.479862e+001 | 1.479857e+001 |

TABLE 8-continued

Results of computing the number of bits per subchannel by SNR and t
$\epsilon=10^{-7}$, $\beta=3$, $\alpha=8$, C=0, k=2, K=64, $e_r$=0.

| | b (Equation (13.7)) | b (Equation (14.6)) | b (Equation (14.8)) |
|---|---|---|---|
| t=3 | | | |
| 10 | 1.992918e+000 | 2.074019e+000 | 1.682834e+000 |
| 15 | 3.384380e+000 | 3.479327e+000 | 3.343798e+000 |
| 20 | 4.975615e+000 | 5.049012e+000 | 5.004762e+000 |
| 25 | 6.642216e+000 | 6.679867e+000 | 6.665726e+000 |
| 30 | 8.332490e+000 | 8.331177e+000 | 8.326690e+000 |
| 35 | 1.002861e+001 | 9.989075e+000 | 9.987654e+000 |
| 40 | 1.172484e+001 | 1.164907e+001 | 1.164862e+001 |
| 45 | 1.341944e+001 | 1.330972e+001 | 1.330958e+001 |
| 50 | 1.511202e+001 | 1.497059e+001 | 1.497055e+001 |
| t=4 | | | |
| 10 | 2.081159e+000 | 2.171149e+000 | 1.808929e+000 |
| 15 | 3.493216e+000 | 3.594555e+000 | 3.469893e+000 |
| 20 | 5.095266e+000 | 5.171455e+000 | 5.130857e+000 |
| 25 | 6.767913e+000 | 6.804783e+000 | 6.791821e+000 |
| 30 | 8.462410e+000 | 8.456897e+000 | 8.452785e+000 |
| 35 | 1.016205e+001 | 1.011505e+001 | 1.011375e+001 |
| 40 | 1.186147e+001 | 1.177512e+001 | 1.177471e+001 |
| 45 | 1.355906e+001 | 1.343581e+001 | 1.343568e+001 |
| 50 | 1.525446e+001 | 1.509668e+001 | 1.509664e+001 |
| t=5 | | | |
| 10 | 2.151452e+000 | 2.248620e+000 | 1.907767e+000 |
| 15 | 3.579210e+000 | 3.685464e+000 | 3.568731e+000 |
| 20 | 5.189591e+000 | 5.267641e+000 | 5.229695e+000 |
| 25 | 6.867052e+000 | 6.902767e+000 | 6.890660e+000 |
| 30 | 8.565027e+000 | 8.555463e+000 | 8.551624e+000 |
| 35 | 1.026762e+001 | 1.021380e+001 | 1.021259e+001 |
| 40 | 1.196975e+001 | 1.187394e+001 | 1.187355e+001 |
| 45 | 1.366989e+001 | 1.353464e+001 | 1.353452e+001 |
| 50 | 1.536772e+001 | 1.519552e+001 | 1.519548e+001 |
| t=6 | | | |
| 10 | 2.209727e+000 | 2.312859e+000 | 1.988655e+000 |
| 15 | 3.650071e+000 | 3.760224e+000 | 3.649619e+000 |
| 20 | 5.267202e+000 | 5.346485e+000 | 5.310583e+000 |
| 25 | 6.948672e+000 | 6.982997e+000 | 6.971547e+000 |
| 30 | 8.649619e+000 | 8.636142e+000 | 8.632511e+000 |
| 35 | 1.035478e+001 | 1.029462e+001 | 1.029348e+001 |
| 40 | 1.205927e+001 | 1.195480e+001 | 1.195444e+001 |
| 45 | 1.376165e+001 | 1.361552e+001 | 1.361540e+001 |
| 50 | 1.546162e+001 | 1.527640e+001 | 1.527637e+001 |
| t=7 | | | |
| 10 | 2.259406e+000 | 2.367600e+000 | 2.056867e+000 |
| 15 | 3.710199e+000 | 3.823511e+000 | 3.717831e+000 |
| 20 | 5.332989e+000 | 5.413059e+000 | 5.378795e+000 |
| 25 | 7.017902e+000 | 7.050683e+000 | 7.039759e+000 |
| 30 | 8.721454e+000 | 8.704187e+000 | 8.700723e+000 |
| 35 | 1.042889e+001 | 1.036278e+001 | 1.036169e+001 |
| 40 | 1.213550e+001 | 1.202300e+001 | 1.202265e+001 |
| 45 | 1.383988e+001 | 1.368373e+001 | 1.368362e+001 |
| 50 | 1.554177e+001 | 1.534461e+001 | 1.534458e+001 |
| t=8 | | | |
| 10 | 2.302638e+000 | 2.415193e+000 | 2.115669e+000 |
| 15 | 3.762326e+000 | 3.878237e+000 | 3.776633e+000 |
| 20 | 5.389983e+000 | 5.470507e+000 | 5.437597e+000 |
| 25 | 7.077916e+000 | 7.109050e+000 | 7.098561e+000 |
| 30 | 8.783794e+000 | 8.762850e+000 | 8.759525e+000 |
| 35 | 1.049328e+001 | 1.042154e+001 | 1.042049e+001 |
| 40 | 1.220181e+001 | 1.208179e+001 | 1.208145e+001 |
| 45 | 1.390802e+001 | 1.374252e+001 | 1.374242e+001 |
| 50 | 1.561165e+001 | 1.540341e+001 | 1.540338e+001 |

TABLE 9

Results of computing the number of bits per subchannel by SNR and t
$\epsilon=10^{-7}$, $\beta=3$, $\alpha=8$, C=0, k=2, K=256, $e_r$=0.

| | b (Equation (13.7)) | b (Equation (14.6)) | b (Equation (14.8)) |
|---|---|---|---|
| t=0 | | | |
| 10 | 1.321766e+000 | 1.347296e+000 | 6.269971e−001 |
| 15 | 2.509617e+000 | 2.556713e+000 | 2.287961e+000 |
| 20 | 3.993768e+000 | 4.039443e+000 | 3.948925e+000 |
| 25 | 5.608182e+000 | 5.639132e+000 | 5.609889e+000 |
| 30 | 7.268129e+000 | 7.280165e+000 | 7.270853e+000 |
| 35 | 8.942023e+000 | 8.934768e+000 | 8.931817e+000 |
| 40 | 1.061938e+001 | 1.059372e+001 | 1.059278e+001 |
| 45 | 1.229688e+001 | 1.225404e+001 | 1.225375e+001 |
| 50 | 1.397355e+001 | 1.391480e+001 | 1.391471e+001 |
| t=1 | | | |
| 10 | 1.571234e+000 | 1.614326e+000 | 1.043824e+000 |
| 15 | 2.846657e+000 | 2.910660e+000 | 2.704788e+000 |
| 20 | 4.377607e+000 | 4.434084e+000 | 4.365752e+000 |
| 25 | 6.013636e+000 | 6.048676e+000 | 6.026716e+000 |
| 30 | 7.684937e+000 | 7.694661e+000 | 7.687680e+000 |
| 35 | 9.366433e+000 | 9.350855e+000 | 9.348644e+000 |
| 40 | 1.104992e+001 | 1.101031e+001 | 1.100961e+001 |
| 45 | 1.273283e+001 | 1.267079e+001 | 1.267057e+001 |
| 50 | 1.441447e+001 | 1.433161e+001 | 1.433154e+001 |
| t=2 | | | |
| 10 | 1.702817e+000 | 1.756760e+000 | 1.250587e+000 |
| 15 | 3.018099e+000 | 3.091576e+000 | 2.911551e+000 |
| 20 | 4.569810e+000 | 4.631909e+000 | 4.572515e+000 |
| 25 | 6.215892e+000 | 6.252527e+000 | 6.233479e+000 |
| 30 | 7.893010e+000 | 7.900494e+000 | 7.894444e+000 |
| 35 | 9.578756e+000 | 9.557324e+000 | 9.555408e+000 |
| 40 | 1.126584e+001 | 1.121698e+001 | 1.121637e+001 |
| 45 | 1.295201e+001 | 1.287753e+001 | 1.287734e+001 |
| 50 | 1.463667e+001 | 1.453836e+001 | 1.453830e+001 |
| t=3 | | | |
| 10 | 1.790840e+000 | 1.852598e+000 | 1.384878e+000 |
| 15 | 3.130784e+000 | 3.210745e+000 | 3.045842e+000 |
| 20 | 4.695270e+000 | 4.761019e+000 | 4.706807e+000 |
| 25 | 6.347754e+000 | 6.385135e+000 | 6.367715e+000 |
| 30 | 8.028784e+000 | 8.034248e+000 | 8.028735e+000 |
| 35 | 9.717512e+000 | 9.691445e+000 | 9.689699e+000 |
| 40 | 1.140718e+001 | 1.135122e+001 | 1.135066e+001 |
| 45 | 1.309571e+001 | 1.301180e+001 | 1.301163e+001 |
| 50 | 1.478257e+001 | 1.467265e+001 | 1.467259e+001 |
| t=4 | | | |
| 10 | 1.856735e+000 | 1.924606e+000 | 1.483535e+000 |
| 15 | 3.214210e+000 | 3.299065e+000 | 3.144499e+000 |
| 20 | 4.787773e+000 | 4.856155e+000 | 4.805464e+000 |
| 25 | 6.444928e+000 | 6.482651e+000 | 6.466428e+000 |
| 30 | 8.128922e+000 | 8.132542e+000 | 8.127392e+000 |
| 35 | 9.819969e+000 | 9.789986e+000 | 9.788356e+000 |
| 40 | 1.151167e+001 | 1.144984e+001 | 1.144932e+001 |
| 45 | 1.320208e+001 | 1.311045e+001 | 1.311028e+001 |
| 50 | 1.489070e+001 | 1.477130e+001 | 1.477125e+001 |
| t=5 | | | |
| 10 | 1.909387e+000 | 1.982287e+000 | 1.561296e+000 |
| 15 | 3.280343e+000 | 3.369115e+000 | 3.222260e+000 |
| 20 | 4.860898e+000 | 4.931300e+000 | 4.883224e+000 |
| 25 | 6.521732e+000 | 6.559565e+000 | 6.544189e+000 |
| 30 | 8.208125e+000 | 8.210033e+000 | 8.205153e+000 |
| 35 | 9.901086e+000 | 9.867662e+000 | 9.866117e+000 |
| 40 | 1.159448e+001 | 1.152757e+001 | 1.152708e+001 |
| 45 | 1.328646e+001 | 1.318820e+001 | 1.318804e+001 |
| 50 | 1.497655e+001 | 1.484906e+001 | 1.484901e+001 |
| t=6 | | | |
| 10 | 1.953271e+000 | 2.030448e+000 | 1.625419e+000 |
| 15 | 3.335130e+000 | 3.427155e+000 | 3.286383e+000 |
| 20 | 4.921354e+000 | 4.993365e+000 | 4.947347e+000 |
| 25 | 6.585226e+000 | 6.623023e+000 | 6.608311e+000 |
| 30 | 8.273645e+000 | 8.273944e+000 | 8.269275e+000 |

TABLE 9-continued

Results of computing the number of bits per subchannel by SNR and t
$\epsilon=10^{-7}$, $\beta=3$, $\alpha=8$, C=0, k=2, K=256, $e_r=0$.

| | b (Equation (13.7)) | b (Equation (14.6)) | b (Equation (14.8)) |
|---|---|---|---|
| 35 | 9.968246e+000 | 9.931717e+000 | 9.930239e+000 |
| 40 | 1.166311e+001 | 1.159167e+001 | 1.159120e+001 |
| 45 | 1.335644e+001 | 1.325232e+001 | 1.325217e+001 |
| 50 | 1.504782e+001 | 1.491318e+001 | 1.491313e+001 |
| t=7 | | | |
| 10 | 1.990936e+000 | 2.071839e+000 | 1.679975e+000 |
| 15 | 3.381923e+000 | 3.476724e+000 | 3.340939e+000 |
| 20 | 4.972910e+000 | 5.046239e+000 | 5.001903e+000 |
| 25 | 6.639375e+000 | 6.677035e+000 | 6.662867e+000 |
| 30 | 8.329555e+000 | 8.328326e+000 | 8.323831e+000 |
| 35 | 1.002560e+001 | 9.986218e+000 | 9.984795e+000 |
| 40 | 1.172176e+001 | 1.164621e+001 | 1.164576e+001 |
| 45 | 1.341630e+001 | 1.330687e+001 | 1.330672e+001 |
| 50 | 1.510881e+001 | 1.496773e+001 | 1.496769e+001 |
| t=8 | | | |
| 10 | 2.023965e+000 | 2.108172e+000 | 1.727461e+000 |
| 15 | 3.422792e+000 | 3.520009e+000 | 3.388425e+000 |
| 20 | 5.017882e+000 | 5.092311e+000 | 5.049389e+000 |
| 25 | 6.686613e+000 | 6.724065e+000 | 6.710353e+000 |
| 30 | 8.378357e+000 | 8.375668e+000 | 8.371318e+000 |
| 35 | 1.007569e+001 | 1.003366e+001 | 1.003228e+001 |
| 40 | 1.177302e+001 | 1.169368e+001 | 1.169325e+001 |
| 45 | 1.346865e+001 | 1.335435e+001 | 1.335421e+001 |
| 50 | 1.516219e+001 | 1.501522e+001 | 1.501517e+001 |

The largest approximation error of approximately 5% (a relative error between b estimates obtained from Equation (13.7) and Equation (14.6)) is attained at lowest value of K~16, lowest value of γ~10, and highest value of t~8. For the same value of the number of correctable errors t, larger signal-to-noise ratio γ values yield lower errors; and the error decreases as the length of the information field K increases. In another embodiment, a simpler solution than that of Equations (14.6) and (14.7) is presented. When the number of bits per subchannel b is greater than or equal to three (b≧3), the following approximate solution can be used:

$$b=[\gamma+\phi(t,K,k,\epsilon)]/10\log 2 \qquad (14.8)$$

$$\phi(t,K,k,\epsilon)=\Phi(-\infty,t,K,k,\epsilon). \qquad (14.9)$$

Results obtained from this approximation for values of K equal to 16, 64, and 256 are also presented in Tables 7, 8 and 9, respectively. In this embodiment, the highest relative error was attained at a lowest value of K~16 and a lowest value of t~0. When b≧3 the relative error was always less than 5%. For the same value of the maximum number of correctable errors t, larger values of the signal-to-noise ratio γ yield smaller errors; and the error decreases as the length of the information field K increases. When b~3, the absolute error of using Equations (14.8) and (14.9) did not exceed 0.12, and the absolute error decreased as the signal-to-noise ratio γ increased. Therefore, for a not very poor quality channel, in which most of the subchannels bear at least 3 bits (b≧3), the use of Equations (14.8) and (14.9) of this section is justified. For such a channel, the mean-field approximation of Equation (14.1) is valid because the relationship of Equation (14.8) is linear, including the relationship between b and the signal-to-noise ratio γ, while all effects of FEC and ARQ are incorporated in the free term (Φ(t,K,k,ε)) of that linear relationship. The representation of Equation (14.8) for QAM channels allows the same value of the line coding gain $g_l$ (Equation (14.5) of this section) to be applied to all subchannels, and alternately at least a subset of the subchannels that exceed a threshold value of the signal-to-noise ratio.

4. Optimization of FEC and ARQ Parameters for G.lite-compliant DSL Channels

In another embodiment, the channel optimization problem is applied to the G.992.2 standard (1999) for DSL modems. That G.992.2 standard does not support ARQ. The effect of using ARQ in a G.992.2-compliant system is considered below.

In G.992.2, the size of the DMT symbol, size of the FEC frame, and the number of control symbols in one FEC frame is restricted as follows:

$$\frac{sB_{DMT}}{\alpha} = K + C + R \qquad (15.1)$$

$$R=zs \qquad (15.2)$$

$$C=s \qquad (15.3)$$

where z is the number of FEC control symbols in a DMT symbol and s is the number of DMT symbols in a FEC frame. The G.992.2 standard has 13 possible pairs of (z, s). Introducing Equations (14.1), (15.2), and (15.3) into Equation (15.1) yields the following relationship to determine the number of bits for a subchannel:

$$b(\gamma_{\mathit{eff}}) = \frac{\alpha}{sn_{\mathit{eff}}}(K+s+zs) \qquad (15.4)$$

Combining Equations (14.1), (15.4) and (13.7)–(13.10) yields:

$$\left[\frac{\alpha(K+s+zs)}{sn_{\mathit{eff}}} + 1.5\right]\left[1-\left(1-W(t,K,k)\varepsilon_S^{1/(1+zs/2)k}\right)^{1/\alpha}\right] = \qquad (15.5)$$

$$2\left(1-2^{-\frac{\alpha(K+s+zs)}{2sn_{\mathit{eff}}}}\right)\mathrm{erfc}\left(\sqrt{1.5\cdot 10^{\gamma_{\mathit{eff}}/10}\Big/\left(2^{\frac{\alpha(K+s+zs)}{sn_{\mathit{eff}}}}-1\right)}\right)\times$$

$$\left[2-\left(1-2^{-\frac{\alpha(K+s+zs)}{2sn_{\mathit{eff}}}}\right)\mathrm{erfc}\left(\sqrt{1.5\cdot 10^{\gamma_{\mathit{eff}}/10}\Big/\left(2^{\frac{\alpha(K+s+zs)}{sn_{\mathit{eff}}}}-1\right)}\right)\right]$$

where t is defined by Equation (12.3).

As described above, when numerically solving Equation (15.5), the length of the information field K a function of the effective signal-to-noise ratio $\gamma_{\mathit{eff}}$, the number of FEC control symbols in a DMT symbol z, the number of DMT symbols in a FEC frame s, the maximum number of transmissions k, and the effective number of subchannels $n_{\mathit{eff}}$, should be treated as a continuous variable, and the factorials in the W( . . . ) definition are presented in the gamma-log form.

In one implementation, Equation (15.5) was programmed in MatLab and solved numerically for the length of the information field K at different (z, s) pairs, and values of $\gamma_{\mathit{eff}}$, $n_{\mathit{eff}}$, and k. For each value of $\gamma_{\mathit{eff}}$ and $n_{\mathit{eff}}$, the values of the net coding gain $g_n$ were determined from Equations (15.4) and (14.4) and compared for predefined sets of allowable (k, z, s) triplets. The (k, z, s) triplet providing the maximal net coding gain $g_n$ (Equation (14.4)) was found, and the corresponding the line coding gain $g_l$, (Equation (14.5)) was calculated. The average number of transmissions v in Equations (14.4) and (14.5) was determined using Equation (13.17).

In another embodiment, the line coding gain gi and the maximum number of transmissions k are stored in a lookup table and that, together with the corresponding (z, s) pair, is used to determine the optimal channel performance. Specifically, since the "uncoded" number of bits per subchannel $b(\gamma_{eff})$, together with the effective signal-to-noise ratio $\gamma_{eff}$ and effective number of subchannels $n_{eff}$, are known for a channel, the length of the information field K, alternately the integer part of it, can be determined from Equation (15.4). Furthermore, in the margin adjustment, the same value of the line coding gain $g_l$ can be used for all subchannels.

Table 10, below, shows optimum sets of $(s,z,g_l,k)$ tuples calculated at different effective values of the number of subchannels and signal-to-noise ratios, $n_{eff}$ and $\gamma_{eff}$, respectively.

TABLE 10

Optimum FEC/ARQ parameters $(s/z/g_l/k)$ calculated for a hypothetical G.lite modem at different values of $n_{eff}$ and $\gamma_{eff}$ (the effective number of subchannels $n_{eff}$ ranges from 1 to 96, the effective signal-to-noise ratio $\gamma_{eff}$ ranges from 10 to 50, $e_r = 0$, and the maximum number of transmissions k varies between 1 and 10).

| $n_{eff} \backslash \gamma_{eff}$ | 10 | 20 | 30 | 40 | 50 |
|---|---|---|---|---|---|
| 1 | 1/0/0.0/1 | 1/0/0.0/1 | 1/0/2.7/7 | 1/0/2.3/5 | 1/0/2.0/4 |
| 6 | 1/0/1.7/8 | 1/0/1.7/5 | 1/0/1.6/4 | 1/0/1.3/3 | 1/0/1.3/3 |
| 11 | 1/0/1.4/7 | 1/0/1.4/4 | 1/0/1.5/4 | 1/0/1.2/3 | 1/0/1.2/3 |
| 16 | 1/0/1.2/6 | 1/0/1.4/4 | 8/1/1.6/2 | 8/1/1.6/2 | 8/1/1.5/2 |
| 21 | 1/0/1.2/6 | 16/1/1.6/2 | 8/1/1.5/2 | 8/1/1.5/2 | 4/1/1.4/2 |
| 26 | 1/0/1.1/6 | 8/1/1.6/3 | 8/1/1.5/2 | 4/1/1.3/2 | 4/1/1.3/2 |
| 31 | 16/1/1.2/3 | 8/1/1.5/3 | 8/1/1.4/2 | 4/2/1.6/2 | 4/2/1.5/2 |
| 36 | 16/1/1.2/3 | 8/2/1.6/2 | 4/2/1.6/2 | 4/2/1.5/2 | 2/2/1.4/2 |
| 41 | 16/1/1.1/3 | 8/2/1.6/2 | 4/2/1.5/2 | 4/2/1.5/2 | 2/2/1.4/2 |
| 46 | 16/1/1.1/3 | 8/2/1.6/2 | 4/2/1.5/2 | 2/2/1.4/2 | 2/2/1.3/2 |
| 51 | 8/2/1.2/3 | 4/2/1.6/3 | 4/2/1.5/2 | 2/2/1.3/2 | 2/2/1.3/2 |
| 56 | 8/2/1.2/3 | 4/2/1.5/3 | 4/2/1.5/2 | 2/2/1.3/2 | 2/2/1.3/2 |
| 61 | 8/2/1.2/3 | 4/2/1.5/3 | 4/2/1.4/2 | 2/4/1.6/2 | 2/4/1.5/2 |
| 66 | 8/2/1.2/3 | 4/4/1.7/2 | 2/4/1.6/2 | 2/4/1.5/2 | 2/4/1.5/2 |
| 71 | 8/2/1.2/3 | 4/4/1.6/2 | 2/4/1.6/2 | 2/4/1.5/2 | 1/4/1.4/2 |
| 76 | 8/2/1.2/3 | 4/4/1.6/2 | 2/4/1.5/2 | 2/4/1.4/2 | 1/4/1.4/2 |
| 81 | 8/2/1.1/3 | 4/4/1.6/2 | 2/4/1.5/2 | 2/4/1.5/2 | 1/4/1.4/2 |
| 86 | 8/2/1.1/3 | 4/4/1.6/2 | 2/4/1.5/2 | 2/4/1.5/2 | 1/4/1.3/2 |
| 91 | 8/2/1.1/3 | 4/4/1.6/2 | 2/4/1.5/2 | 1/4/1.4/2 | 1/4/1.3/2 |
| 96 | 8/2/1.1/3 | 4/4/1.6/2 | 2/4/1.5/2 | 1/4/1.3/2 | 1/4/1.3/2 |

As in the case described in section I without ARQ (k=1), the line coding gain $g_l(n_{eff}, \gamma_{eff})$ dependency has discontinuities where one of the integer values (s,z,k) changes. This behavior was explained above by the method of determining the line coding gain $g_l$. In one embodiment, the optimum ARQ strategy uses only one retransmission (k=2). Alternately, at a low signal-to-noise ratio (~10 dB), two (k=3) or more retransmissions may be used.

To implement ARQ in accordance with the present invention, the communications protocol is modified. In one embodiment, the feedback channel that provides the ARQ mechanism is guaranteed to be reliable. Typically, during data transmission, a positive acknowledgement signal is transmitted after a predetermined number of frames have been received for flow control. A negative acknowledgement signal is transmitted if a frame has an error. Each time a negative acknowledgement signal is received, the frame is transmitted unless the specified maximum number of transmissions k (MNT of FIG. 1) has been reached.

In addition, the protocol is modified to allow the maximum number of transmissions to be specified in accordance with the present invention. In one embodiment, the maximum number of transmissions is the same for each direction of transmission. In an alternate embodiment, the maximum number of transmissions is different for each direction of transmission.

In yet another embodiment, different FEC parameters are used for each direction of transmission. In addition the number of subchannels can differ in each direction of transmission.

III. FEC Parameters for G.dmt-compliant ADSL Systems

An optimizing strategy for remote terminal (RT) or central office (CO) modems provides a maximum throughput of the downstream or upstream channel, for a given, possibly non-optimal, behavior of the CO or RT modem, respectively. In this section, lookup tables for optimizing the performance of G.dmt-compliant modems are presented. The lookup tables are obtained using an extension of the general method, described above. When this extension of the general method is used, the optimum FEC parameters for G.dmt are adjusted in the high signal-to-noise ratio range.

1. A Channel Model

The DMT symbol rate is fixed for a multicarrier channel, and maximizing the number of bits per DMT symbol is equivalent to maximizing the channel throughput. An equation for determining the maximum bit size of the DMT symbol in a multicarrier DMT system with FEC at the BER of $\epsilon$ has the following form:

$$1 - \left(1 - W(s, z, K)\varepsilon_S^{\frac{1}{0.5 \cdot sz + 1}}\right)^{1/\alpha} = \omega(b(\gamma_{eff}, s, z)) \quad (16.1)$$

$$\left(1 - 2^{-b(\gamma_{eff}, s, z)/2}\right) erfc\left(\sqrt{3 \cdot 10^{\gamma_{eff}/10} / \left(2^{b(\gamma_{eff}, s, z)+1} - 2\right)}\right) \times$$

$$\left[2 - \left(1 - 2^{-b(\gamma_{eff}, s, z)/2}\right) erfc\left(\sqrt{3 \cdot 10^{\gamma_{eff}/10} / \left(2^{b(\gamma_{eff}, s, z)+1} - 2\right)}\right)\right]$$

where $$\omega(b) = \frac{4}{2b+3} \quad (16.2)$$

$$W = \left[\frac{\Gamma(K + \rho s + sz)}{\Gamma(K + \rho s + 0.5 \cdot sz)\Gamma(0.5 \cdot sz + 1)}\right]^{-1/(0.5 \cdot sz + 1)} \quad (16.3)$$

$$\varepsilon_S = 1 - \left(1 - \frac{\varepsilon}{\beta}\right)^\alpha \quad (16.4)$$

$\Gamma$ is the gamma-function which is has the form $\Gamma(x)=(x-1)!$, when x is a positive integer. As described above, $\omega$ is the fraction of erroneous bits per erroneous QAM symbol; $\alpha$ is the size of a code symbol; $\beta$ is the descrambler constant (the number of nonzero coefficients in the descrambler polynomial); $\gamma$ is the signal-to-noise ratio in dB; b is the bit load of a subchannel; s is the number of DMT symbols per FEC frame; z is the number of FEC control code symbols per DMT symbol; K is the number of information code symbols in a FEC frame, that is, the size of the information field; $\epsilon_s$ is the code symbol error rate (SER); and $\rho$ represents a framing mode index, that is, the number of symbols used for framing mode overhead per DMT symbol; and $$n_{\mathit{eff}} = \sum_{\gamma_i > \gamma*} 1 \qquad (16.5)$$

$$\gamma_{\mathit{eff}} = \frac{1}{n_{\mathit{eff}}} \sum_{\gamma_i > \gamma*} \gamma_i \qquad (16.6)$$

where $\gamma_{\mathit{eff}}$ is the effective signal-to-noise ratio, as described above, $n_{\mathit{eff}}$ is the effective number of subchannels, and $\gamma^*$ is the threshold value of the signal-to-noise ratio below which no information is passed. When default framing mode 3 is used, which has 1 sync byte per DMT symbol, the framing mode index $\rho$ is equal to one. When 2 sync bytes per DMT symbol are used, the framing mode index $\rho$ is equal to two.

There is an additional relation between the bit size of a DMT symbol and the size of a FEC frame inherent to ADSL standards (assuming that the default framing mode 3, the reduced overhead framing mode with merged fast and sync bytes, is used):

$$b(\gamma_{\mathit{eff}}, s, z) = \frac{\alpha}{sn_{\mathit{eff}}}(K + \rho s + zs). \qquad (16.7)$$

Introducing Equation (16.7) into Equation (16.1) yields the following equation for determining the size of the information field K in an ADSL system:

$$1 - \left(1 - W(s,z,K)\varepsilon_S^{\frac{1}{0.5 \cdot sz+1}}\right)^{1/\alpha} = \qquad (16.8)$$

$$\omega\left(\frac{\alpha}{sn_{\mathit{eff}}}(K+\rho s+zs)\right)\left(1 - 2^{\frac{\alpha}{2sn_{\mathit{eff}}}(K+\rho s+zs)}\right)$$

$$\mathit{erfc}\left(\sqrt{3 \cdot 10^{\gamma_{\mathit{eff}}/10} / \left(2^{\frac{\alpha}{sn_{\mathit{eff}}}(K+\rho s+zs)+1} - 2\right)}\right) \times$$

$$\left[2 - \left(1 - 2^{\frac{\alpha}{2sn_{\mathit{eff}}}(K+\rho s+zs)}\right)\right.$$

$$\left.\mathit{erfc}\left(\sqrt{3 \cdot 10^{\gamma_{\mathit{eff}}/10} / \left(2^{\frac{\alpha}{sn_{\mathit{eff}}}(K+\rho s+zs)+1} - 2\right)}\right)\right]$$

To determine the optimum bit load, Equation (16.8) is solved numerically for the size of the information field K.

Referring back to FIG. 5, a method of evaluating channel performance that uses approximations (16.2)–(16.8) will be described. This embodiment is similar to the method described in section I with respect to FIG. 5 except that the FEC parameters include the number of DMT symbols per FEC frame s and the number of FEC control code symbols per DMT symbol z, rather than the maximum number of correctable errors t. In step 50, a number of information bits to be supported by a subchannel for allowable sets of FEC parameters, predetermined effective signal-to-noise ratios $\gamma_{\mathit{eff}}$ and associated effective numbers of subchannels $n_{\mathit{eff}}$ is determined. The maximum number of bits able to be supported by a DMT symbol within the system's constraints is in accordance with Equation (16.9) below:

$$B_{DMT} = \sum_{i=1}^{n} b(\gamma_i, s, z) \approx n_{\mathit{eff}} b(\gamma_{\mathit{eff}}, s, z) \qquad (16.9)$$

For the values of the effective signal-to-noise ratio $\gamma_{\mathit{eff}}$ and the effective number of subchannels $n_{\mathit{eff}}$, Equation (16.8) is solved for the size of the information field K at different allowable values of the number of DMT symbols per FEC frame s, and the number of FEC control code symbols per DMT symbol z; this solution, combined with Equation (16.9), yields the maximum number of information bits able to be supported by a DMT symbol within the system's constraints. In one embodiment, this information is stored in a table, such as the exemplary table shown in Table 12, below.

In this embodiment, steps 51 and 52 are not changed and will not be further described. In step 53, a maximum net coding gain over allowable sets of FEC parameters is determined. In one embodiment, the table generated in step 50 is iteratively accessed for each allowable set of FEC parameters based on the value of the effective number of subchannels and the effective signal-to-noise ratio to retrieve the associated number of bits per subchannel. The net coding gain per subchannel, in decibels, $g_{n,db}$ for each allowable set of FEC parameters is determined in accordance with Equation (16.10) below:

$$g_{n,dB}(s,z) = 3.01\left[\frac{K}{K+\rho s+sz}b(\gamma_{\mathit{eff}},s,z) - \frac{K}{K+\rho s}b(\gamma_{\mathit{eff}},1,0)\right] \qquad (16.10)$$

In step 54, one or more FEC parameters are selected based on the maximum net coding gain per subchannel $g_{n,db}$. The selected FEC parameters yield the largest, i.e., the maximum, value of the net coding gain as determined in accordance with Equation (16.10).

In step 55, the corresponding line coding gain, in decibels, $g_{l,db}$ is determined based on the forward error correction parameters that provide the maximum net coding gain $g_{n,db}$. The line coding gain per subchannel $g_{l,db}$ is determined in accordance with the following relationship:

$$g_{l,dB}(s,z) = 3.01\lfloor b(\gamma_{\mathit{eff}},s,z) - b(\gamma_{\mathit{eff}},1,0)\rfloor \qquad (16.11)$$

In step 56, the line coding gain $g_{l,db}$, and the one or more selected FEC parameters are transmitted to the peer modem.

2. Generalized Method: Multicarrier Channel with FEC

The method described in the previous subsection provides an exact solution when no restriction on the FEC frame size is applied. Alternately, in practice, the FEC frame size is bounded to limit the complexity of the decoder. As a result, Equation (16.8) is solved for the length of the information field K from the interval $(0, N_{max} - \rho s - sz)$, where $N_{max} = 256$. So far it was assumed that such a solution does exist. The case when Equation (16.8) has no solution in the interval $(0, N_{max} - \rho s - sz)$ will be described below.

Define the excess of the "raw" (i.e., prior to decoding) bit error rate $\Theta(K)$ as follows:

$$\Theta(K) = \omega\left(\frac{\alpha}{sn_{\mathit{eff}}}(K+\rho s+zs)\right)\left(1-2^{\frac{\alpha}{2sn_{\mathit{eff}}}(K+\rho s+zs)}\right) \quad (17.1)$$

$$\mathit{erfc}\left(\sqrt{3\cdot 10^{\gamma_{\mathit{eff}}/10}\Big/\left(2^{\frac{\alpha}{sn_{\mathit{eff}}}(K+\rho s+zs)+1}-2\right)}\right)\times$$

$$\left[2-\left(1-2^{\frac{\alpha}{2sn_{\mathit{eff}}}(K+\rho s+zs)}\right)\right.$$

$$\left.\mathit{erfc}\left(\sqrt{3\cdot 10^{\gamma_{\mathit{eff}}/10}\Big/\left(2^{\frac{\alpha}{sn_{\mathit{eff}}}(K+\rho s+zs)+1}-2\right)}\right)\right]-$$

$$\left[1-\left(1-W(s,z,K)\varepsilon_S^{\frac{1}{0.5\cdot sz+1}}\right)^{1/\alpha}\right]$$

and $$\omega(b(\gamma_{\mathit{eff}},s,z))p_{\mathit{QAM}} = \omega\left(\frac{\alpha}{sn_{\mathit{eff}}}(K+\rho s+zs)\right)\left(1-2^{\frac{\alpha}{2sn_{\mathit{eff}}}(K+\rho s+zs)}\right) \quad (17.2)$$

$$\mathit{erfc}\left(\sqrt{3\cdot 10^{\gamma_{\mathit{eff}}/10}\Big/\left(2^{\frac{\alpha}{sn_{\mathit{eff}}}(K+\rho s+zs)+1}-2\right)}\right)\times$$

$$\left[2-\left(1-2^{\frac{\alpha}{2sn_{\mathit{eff}}}(K+\rho s+zs)}\right)\right.$$

$$\left.\mathit{erfc}\left(\sqrt{3\cdot 10^{\gamma_{\mathit{eff}}/10}\Big/\left(2^{\frac{\alpha}{sn_{\mathit{eff}}}(K+\rho s+zs)+1}-2\right)}\right)\right]$$

where $p_{QAM}(b,\gamma)$ is the probability of error in transmitting a QAM waveform representing a $2^b$-point constellation at the signal-to-noise ratio of $\gamma$, over the required BER level in a system with FEC given by the following formula, $$p_e = \left[1-\left(1-W(s,z,K)\varepsilon_S^{\frac{1}{0.5\cdot sz+1}}\right)^{1/\alpha}\right], \quad (17.3)$$

i.e., $$\Theta = \omega(b(\gamma_{\mathit{eff}},s,z))p_{\mathit{QAM}}-p_e \quad (17.4)$$

At $$\Theta(0)\leq 0 \quad (17.5)$$

and $$\Theta(N_{max}-\rho s-sz)\geq 0 \quad (17.6)$$

there is a solution K* (and accordingly, N*=K*+ρs+sz) such that at 0≦K≦K* the FEC frame has a code rate K/N sufficiently large to provide a BER<ε for the data after decoding; and at K>K*≧$N_{max}$-ρs-sz the code rate is insufficient to provide the desired BER level, i.e., a BER>ε for the data after decoding. Therefore, K* is an optimal solution providing the maximum FEC frame size within the acceptable BER range.

At $$\Theta(0)<0 \quad (17.7)$$

and $$\Theta(N_{max}-\rho s-sz)<0 \quad (17.8)$$

all 0≦K≦$V_{max}$-ρs-sz yield BER≦ε. In this case all values of K yield an appropriate BER level. Therefore, K=$N_{max}$-ρs-sz is an optimal solution providing the maximum FEC frame size and throughput within the acceptable BER range. It follows from Equation (16.7) that in this case, the number of bits per subchannel b does not depend on the signal-to-noise ratio, i.e.:

$$b(\gamma_{\mathit{eff}},s,z) = \frac{\alpha N_{\max}}{sn_{\mathit{eff}}} \quad (17.9)$$

Finally, at $$\Theta(0)>0 \quad (17.10)$$

and $$\Theta(N_{max}-\rho s-sz)>0 \quad (17.11)$$

all 0≦K≦$N_{max}$-ρs-sz yield BER≧ε. In other words, no appropriate value for K, where 0≦K≦$N_{max}$-ρs-sz, exists at these conditions.

3. Numerical Procedure and Coding Gain Matrices

In another embodiment, a complete set of net coding gain $g_{n,dB}$ matrices for G.dmt-compliant modems for permissible (s,z) pairs are presented. Each (s,z)-associated matrix is a discrete representation of the function $g_{n,dB}(n_{\mathit{eff}},\gamma_{\mathit{eff}})$. The net coding gain matrices may be stored as one or more tables in memory. There are 23 matrices (excluding the uncoded (1,0) case) associated with the possible (s,z) pairs in G.dmt as shown below in Table 11.

TABLE 11

Possible (s, z) pairs in G.dmt.

| s | 1 | 1 | 1 | 1 | 1 | 1 | 1 | 1 | 2 | 2 | 2 | 2 | 2 | 2 | 2 | 4 | 4 | 4 | 4 | 8 | 8 | 16 |
|---|---|---|---|---|---|---|---|---|---|---|---|---|---|---|---|---|---|---|---|---|---|----|
| z | 2 | 4 | 6 | 8 | 10 | 12 | 14 | 16 | 1 | 2 | 3 | 4 | 5 | 6 | 7 | 8 | 1 | 2 | 3 | 4 | 1 | 2 | 1 |

To generate the net coding gain matrices, Equation (16.8) was programmed in MatLab and solved numerically using dichotomy, for different values of $\gamma_{\mathit{eff}}$, $n_{\mathit{eff}}$, and (z, s). The initial K interval, for the dichotomy procedure, was (0,256-ρs-zs); α=8; ε$10^{-7}$; β=3; and ρ=1. The implementation of the generalized method can be described as follows.

Prior to solving Equation (16.8), the conditions (17.4) and (17.5) are checked. If conditions (17.4) and (17.5) both hold, the dichotomy yields a value for the length of the information field K within the interval of search. The value of the net coding gain $g_{n,dB}$ is determined from Equation (16.10).

If conditions (17.6) and (17.7) both hold, a value equal to $N_{max}$-ρs-sz is used for the length of the information field K, the corresponding value of the number of bits per subchannel b is determined in accordance with Equation (17.8). The values of the net coding gain $g_{n,dB}$ are determined in accordance with Equation (16.10).

If the conditions (17.9) and (17.10) both hold, the uncoded case (b=b($\gamma_{eff}$, 1,0)) is preferable and the value of K=N$_{max}$-$\rho$. The value of the net coding gain $g_{n,dB}$ is set equal to 0.

Furthermore, the values of the net coding gain $g_{n,dB}$(n$_{eff}$, $\gamma_{eff}$) can be compared for all possible (z, s) pairs, and the (z, s) pair providing the maximal value of the net coding gain $g_{n,dB}$ can be found from Table 12, below.

TABLE 12

Optimum FEC parameters (s/z/g$_{n,dB}$) calculated for G.dmt modem at different n$_{eff}$ and $\gamma_{eff}$ values (number of effective subchannels n$_{eff}$ ranges from 1 to 226, effective SNR $\gamma_{eff}$ ranges from 15 to 50).

| n$_{eff}$\\$\gamma_{eff}$ | 15 | 20 | 25 | 30 | 35 | 40 | 45 | 50 |
|---|---|---|---|---|---|---|---|---|
| 1 | 1/0/0.0 | 1/0/0.0 | 1/0/0.0 | 1/0/0.0 | 1/0/0.0 | 1/0/0.0 | 1/0/0.0 | 1/0/0.0 |
| 6 | 16/1/0.4 | 16/1/0.8 | 16/1/1.0 | 16/1/1.0 | 16/1/1.0 | 16/1/1.0 | 16/1/1.0 | 16/1/1.0 |
| 11 | 16/1/1.7 | 16/1/2.1 | 16/1/2.3 | 16/1/2.3 | 16/1/2.3 | 16/1/2.3 | 8/1/1.7 | 8/1/1.7 |
| 16 | 16/1/2.2 | 16/1/2.6 | 16/1/2.8 | 8/1/2.2 | 8/1/2.2 | 8/1/2.2 | 8/1/2.2 | 8/1/2.2 |
| 21 | 16/1/2.5 | 16/1/2.9 | 8/1/2.4 | 8/1/2.5 | 8/1/2.4 | 8/1/2.4 | 4/1/1.7 | 4/1/1.7 |
| 26 | 16/1/2.6 | 16/1/3.0 | 8/2/2.7 | 8/2/2.7 | 8/1/2.6 | 4/2/2.0 | 4/2/2.0 | 4/2/2.0 |
| 31 | 16/1/2.7 | 8/2/2.8 | 8/2/2.9 | 8/2/2.9 | 4/2/2.2 | 4/2/2.2 | 4/2/2.2 | 4/2/2.2 |
| 36 | 16/1/2.8 | 8/2/2.9 | 8/2/3.0 | 4/2/2.4 | 4/2/2.4 | 4/2/2.4 | 4/2/2.3 | 2/2/1.6 |
| 41 | 8/2/2.7 | 8/2/3.0 | 8/1/2.7 | 4/3/2.5 | 4/3/2.5 | 4/3/2.5 | 2/3/1.8 | 2/3/1.7 |
| 46 | 8/2/2.7 | 8/2/3.1 | 4/3/2.7 | 4/3/2.7 | 4/3/2.6 | 4/1/2.1 | 2/3/1.9 | 2/3/1.9 |
| 51 | 8/2/2.8 | 8/2/3.1 | 4/3/2.8 | 4/3/2.8 | 4/3/2.7 | 2/3/2.0 | 2/3/2.0 | 2/3/2.0 |
| 56 | 8/2/2.8 | 4/3/2.8 | 4/3/2.8 | 4/3/2.8 | 2/4/2.2 | 2/4/2.1 | 2/4/2.1 | 2/4/2.1 |
| 61 | 8/2/2.9 | 4/4/2.8 | 4/4/2.9 | 4/4/2.9 | 2/4/2.3 | 2/4/2.2 | 2/4/2.2 | 2/4/2.2 |
| 66 | 8/2/2.9 | 4/4/2.9 | 4/4/3.0 | 2/4/2.4 | 2/4/2.3 | 2/4/2.3 | 2/4/2.3 | 2/4/2.3 |
| 71 | 8/2/2.9 | 4/4/3.0 | 4/4/3.0 | 2/5/2.4 | 2/5/2.4 | 2/5/2.4 | 2/5/2.3 | 2/2/2.0 |
| 76 | 8/2/2.9 | 4/4/3.0 | 4/4/3.1 | 2/5/2.5 | 2/5/2.5 | 2/5/2.4 | 2/5/2.4 | 1/6/1.6 |
| 81 | 4/4/2.7 | 4/4/3.1 | 4/2/2.8 | 2/5/2.6 | 2/5/2.5 | 2/5/2.5 | 2/2/2.0 | 1/6/1.7 |
| 86 | 4/4/2.8 | 4/4/3.1 | 2/6/2.6 | 2/5/2.6 | 2/5/2.6 | 2/5/2.6 | 1/6/1.8 | 1/6/1.8 |
| 91 | 4/4/2.8 | 4/4/3.1 | 2/6/2.7 | 2/6/2.7 | 2/6/2.6 | 2/4/2.5 | 1/6/1.9 | 1/6/1.9 |
| 96 | 4/4/2.8 | 4/4/3.1 | 2/6/2.8 | 2/6/2.7 | 2/6/2.7 | 1/6/2.0 | 1/6/2.0 | 1/6/1.9 |
| 101 | 4/4/2.9 | 4/4/3.2 | 2/6/2.8 | 2/6/2.8 | 2/6/2.7 | 1/6/2.0 | 1/6/2.0 | 1/6/2.0 |
| 106 | 4/4/2.9 | 4/3/3.0 | 2/7/2.8 | 2/6/2.8 | 2/4/2.6 | 1/8/2.1 | 1/8/2.1 | 1/8/2.0 |
| 111 | 4/4/2.9 | 2/7/2.8 | 2/7/2.9 | 2/7/2.9 | 1/8/2.2 | 1/8/2.1 | 1/8/2.1 | 1/8/2.1 |
| 116 | 4/4/2.9 | 2/7/2.9 | 2/7/2.9 | 2/7/2.9 | 1/8/2.2 | 1/8/2.2 | 1/8/2.2 | 1/8/2.1 |
| 121 | 4/4/2.9 | 2/7/2.9 | 2/7/2.9 | 2/7/2.9 | 1/8/2.3 | 1/8/2.2 | 1/8/2.2 | 1/8/2.2 |
| 126 | 4/4/2.9 | 2/8/2.9 | 2/8/3.0 | 2/6/2.9 | 1/8/2.3 | 1/8/2.3 | 1/8/2.2 | 1/8/2.2 |
| 131 | 4/4/2.9 | 2/8/3.0 | 2/8/3.0 | 2/3/2.5 | 1/8/2.3 | 1/8/2.3 | 1/8/2.3 | 1/8/2.3 |
| 136 | 4/4/2.9 | 2/8/3.0 | 2/8/3.0 | 1/10/2.4 | 1/8/2.4 | 1/8/2.3 | 1/8/2.3 | 1/8/2.3 |
| 141 | 4/4/2.9 | 2/8/3.0 | 2/8/3.1 | 1/10/2.5 | 1/10/2.4 | 1/10/2.4 | 1/10/2.3 | 1/6/2.2 |
| 146 | 4/4/2.9 | 2/8/3.0 | 2/8/3.1 | 1/10/2.5 | 1/10/2.5 | 1/10/2.4 | 1/10/2.4 | 1/2/1.4 |
| 151 | 4/4/3.0 | 2/8/3.1 | 2/8/3.1 | 1/10/2.5 | 1/10/2.5 | 1/10/2.5 | 1/10/2.4 | 1/2/0.2 |
| 156 | 4/3/2.8 | 2/8/3.1 | 2/8/3.1 | 1/10/2.6 | 1/10/2.5 | 1/10/2.5 | 1/10/2.4 | 1/0/0.0 |
| 161 | 2/8/2.8 | 2/8/3.1 | 2/5/3.0 | 1/10/2.6 | 1/10/2.6 | 1/10/2.5 | 1/6/2.1 | 1/0/0.0 |
| 166 | 2/8/2.8 | 2/8/3.1 | 1/10/2.6 | 1/10/2.6 | 1/10/2.6 | 1/10/2.5 | 1/2/1.4 | 1/0/0.0 |
| 171 | 2/8/2.8 | 2/8/3.1 | 1/12/2.7 | 1/10/2.6 | 1/10/2.6 | 1/10/2.6 | 1/2/0.5 | 1/0/0.0 |
| 176 | 2/8/2.8 | 2/8/3.1 | 1/12/2.7 | 1/12/2.7 | 1/12/2.6 | 1/10/2.6 | 1/0/0.0 | 1/0/0.0 |
| 181 | 2/8/2.8 | 2/8/3.1 | 1/12/2.7 | 1/12/2.7 | 1/12/2.7 | 1/8/2.5 | 1/0/0.0 | 1/0/0.0 |
| 186 | 2/8/2.9 | 2/8/3.2 | 1/12/2.7 | 1/12/2.7 | 1/12/2.7 | 1/6/2.1 | 1/0/0.0 | 1/0/0.0 |
| 191 | 2/8/2.9 | 2/8/3.2 | 1/12/2.8 | 1/12/2.7 | 1/12/2.7 | 1/4/1.5 | 1/0/0.0 | 1/0/0.0 |
| 196 | 2/8/2.9 | 2/8/3.2 | 1/12/2.8 | 1/12/2.8 | 1/12/2.7 | 1/2/1.0 | 1/0/0.0 | 1/0/0.0 |
| 201 | 2/8/2.9 | 2/8/3.2 | 1/12/2.8 | 1/12/2.8 | 1/12/2.7 | 1/2/0.2 | 1/0/0.0 | 1/0/0.0 |
| 206 | 2/8/2.9 | 2/8/3.2 | 1/12/2.8 | 1/12/2.8 | 1/12/2.8 | 1/0/0.0 | 1/0/0.0 | 1/0/0.0 |
| 211 | 2/8/2.9 | 2/7/3.1 | 1/14/2.9 | 1/12/2.8 | 1/10/2.7 | 1/0/0.0 | 1/0/0.0 | 1/0/0.0 |
| 216 | 2/8/2.9 | 2/6/3.1 | 1/14/2.9 | 1/14/2.8 | 1/6/2.5 | 1/0/0.0 | 1/0/0.0 | 1/0/0.0 |
| 221 | 2/8/2.9 | 1/14/2.8 | 1/14/2.9 | 1/14/2.9 | 1/4/2.1 | 1/0/0.0 | 1/0/0.0 | 1/0/0.0 |
| 226 | 2/8/2.9 | 1/14/2.9 | 1/14/2.9 | 1/14/2.9 | 1/4/1.6 | 1/0/0.0 | 1/0/0.0 | 1/0/0.0 |

The corresponding table for the line coding gain $g_{l,dB}$ is shown in Table 13, below.

TABLE 13

Optimum FEC parameters (s/z/$g_{l,dB}$) calculated for G.dmt modem at different $n_{eff}$ and $\gamma_{eff}$ values (number of effective subchannels runs from 1 to 226, effective SNR runs from 15 to 50).

| $n_{eff}$\$\gamma_{eff}$ | 15 | 20 | 25 | 30 | 35 | 40 | 45 | 50 |
|---|---|---|---|---|---|---|---|---|
| 1 | 1/0/0.0 | 1/0/0.0 | 1/0/0.0 | 1/0/0.0 | 1/0/0.0 | 1/0/0.0 | 1/0/0.0 | 1/0/0.0 |
| 6 | 16/1/4.9 | 16/1/5.2 | 16/1/5.3 | 16/1/5.3 | 16/1/5.2 | 16/1/5.1 | 16/1/5.1 | 16/1/5.1 |
| 11 | 16/1/4.4 | 16/1/4.8 | 16/1/4.8 | 16/1/4.8 | 16/1/4.7 | 16/1/4.7 | 8/1/4.0 | 8/1/4.0 |
| 16 | 16/1/4.2 | 16/1/4.5 | 16/1/4.5 | 8/1/3.9 | 8/1/3.8 | 8/1/3.8 | 8/1/3.8 | 8/1/3.7 |
| 21 | 16/1/4.0 | 16/1/4.3 | 8/1/3.8 | 8/1/3.7 | 8/1/3.7 | 8/1/3.7 | 4/1/2.9 | 4/1/2.9 |
| 26 | 16/1/3.9 | 16/1/4.2 | 8/2/4.7 | 8/2/4.6 | 8/1/3.6 | 4/2/3.9 | 4/2/3.9 | 4/2/3.9 |
| 31 | 16/1/3.8 | 8/2/4.5 | 8/2/4.6 | 8/2/4.5 | 4/2/3.9 | 4/2/3.8 | 4/2/3.8 | 4/2/3.8 |
| 36 | 16/1/3.7 | 8/2/4.4 | 8/2/4.4 | 4/2/3.8 | 4/2/3.8 | 4/2/3.7 | 4/2/3.7 | 2/2/2.9 |
| 41 | 8/2/4.0 | 8/2/4.3 | 8/1/3.4 | 4/3/4.4 | 4/3/4.3 | 4/3/4.3 | 2/3/3.5 | 2/3/3.5 |
| 46 | 8/2/3.9 | 8/2/4.2 | 4/3/4.3 | 4/3/4.3 | 4/3/4.3 | 4/1/2.6 | 2/3/3.5 | 2/3/3.5 |
| 51 | 8/2/3.9 | 8/2/4.2 | 4/3/4.3 | 4/3/4.2 | 4/3/4.2 | 2/3/3.5 | 2/3/3.4 | 2/3/3.4 |
| 56 | 8/2/3.8 | 4/3/4.1 | 4/3/4.2 | 4/3/4.2 | 2/4/3.9 | 2/4/3.9 | 2/4/3.9 | 2/4/3.8 |
| 61 | 8/2/3.8 | 4/4/4.5 | 4/4/4.6 | 4/4/4.5 | 2/4/3.9 | 2/4/3.8 | 2/4/3.8 | 2/4/3.8 |
| 66 | 8/2/3.7 | 4/4/4.5 | 4/4/4.5 | 2/4/3.9 | 2/4/3.8 | 2/4/3.8 | 2/4/3.8 | 2/4/3.7 |
| 71 | 8/2/3.7 | 4/4/4.4 | 4/4/4.5 | 2/5/4.2 | 2/5/4.1 | 2/5/4.1 | 2/5/4.1 | 2/2/2.7 |
| 76 | 8/2/3.6 | 4/4/4.4 | 4/4/4.4 | 2/5/4.1 | 2/5/4.1 | 2/5/4.0 | 1/6/3.6 | 1/6/3.6 |
| 81 | 4/4/4.0 | 4/4/4.3 | 4/2/3.4 | 2/5/4.1 | 2/5/4.1 | 2/5/4.0 | 2/2/2.6 | 1/6/3.5 |
| 86 | 4/4/4.0 | 4/4/4.3 | 2/6/4.4 | 2/5/4.1 | 2/5/4.0 | 2/5/4.0 | 1/6/3.5 | 1/6/3.5 |
| 91 | 4/4/3.9 | 4/4/4.2 | 2/6/4.3 | 2/6/4.3 | 2/6/4.3 | 2/4/3.6 | 1/6/3.5 | 1/6/3.5 |
| 96 | 4/4/3.9 | 4/4/4.2 | 2/6/4.3 | 2/6/4.3 | 2/6/4.2 | 1/6/3.5 | 1/6/3.5 | 1/6/3.4 |
| 101 | 4/4/3.9 | 4/4/4.2 | 2/6/4.3 | 2/6/4.2 | 2/6/4.2 | 1/6/3.5 | 1/6/3.4 | 1/6/3.4 |
| 106 | 4/4/3.9 | 4/3/3.8 | 2/7/4.5 | 2/6/4.2 | 2/4/3.6 | 1/8/3.9 | 1/8/3.9 | 1/8/3.9 |
| 111 | 4/4/3.8 | 2/7/4.4 | 2/7/4.4 | 2/7/4.4 | 1/8/3.9 | 1/8/3.9 | 1/8/3.9 | 1/8/3.8 |
| 116 | 4/4/3.8 | 2/7/4.4 | 2/7/4.4 | 2/7/4.4 | 1/8/3.9 | 1/8/3.9 | 1/8/3.8 | 1/8/3.8 |
| 121 | 4/4/3.8 | 2/7/4.3 | 2/7/4.4 | 2/7/4.3 | 1/8/3.9 | 1/8/3.8 | 1/8/3.8 | 1/8/3.8 |
| 126 | 4/4/3.7 | 2/8/4.5 | 2/8/4.5 | 2/6/4.1 | 1/8/3.9 | 1/8/3.8 | 1/8/3.8 | 1/8/3.8 |
| 131 | 4/4/3.7 | 2/8/4.5 | 2/8/4.5 | 2/3/3.1 | 1/8/3.8 | 1/8/3.8 | 1/8/3.8 | 1/8/3.7 |
| 136 | 4/4/3.7 | 2/8/4.4 | 2/8/4.5 | 1/10/4.2 | 1/8/3.8 | 1/8/3.8 | 1/8/3.7 | 1/8/3.7 |
| 141 | 4/4/3.7 | 2/8/4.4 | 2/8/4.5 | 1/10/4.2 | 1/10/4.1 | 1/10/4.1 | 1/10/4.1 | 1/6/3.3 |
| 146 | 4/4/3.7 | 2/8/4.4 | 2/8/4.4 | 1/10/4.2 | 1/10/4.1 | 1/10/4.1 | 1/10/4.0 | 1/2/1.8 |
| 151 | 4/4/3.6 | 2/8/4.4 | 2/8/4.4 | 1/10/4.1 | 1/10/4.1 | 1/10/4.1 | 1/10/4.0 | 1/2/0.5 |
| 156 | 4/3/3.3 | 2/8/4.3 | 2/8/4.4 | 1/10/4.1 | 1/10/4.1 | 1/10/4.0 | 1/10/4.0 | 1/0/0.0 |
| 161 | 2/8/4.0 | 2/8/4.3 | 2/5/3.7 | 1/10/4.1 | 1/10/4.1 | 1/10/4.0 | 1/6/3.0 | 1/0/0.0 |
| 166 | 2/8/4.0 | 2/8/4.3 | 1/10/4.1 | 1/10/4.1 | 1/10/4.0 | 1/10/4.0 | 1/2/1.7 | 1/0/0.0 |
| 171 | 2/8/4.0 | 2/8/4.3 | 1/12/4.4 | 1/10/4.1 | 1/10/4.0 | 1/10/4.0 | 1/2/0.8 | 1/0/0.0 |
| 176 | 2/8/4.0 | 2/8/4.3 | 1/12/4.4 | 1/12/4.3 | 1/12/4.3 | 1/10/4.0 | 1/0/0.0 | 1/0/0.0 |
| 181 | 2/8/4.0 | 2/8/4.2 | 1/12/4.3 | 1/12/4.3 | 1/12/4.3 | 1/8/3.6 | 1/0/0.0 | 1/0/0.0 |
| 186 | 2/8/3.9 | 2/8/4.2 | 1/12/4.3 | 1/12/4.3 | 1/12/4.2 | 1/4/2.9 | 1/0/0.0 | 1/0/0.0 |
| 191 | 2/8/3.9 | 2/8/4.2 | 1/12/4.3 | 1/12/4.3 | 1/12/4.2 | 1/4/2.0 | 1/0/0.0 | 1/0/0.0 |
| 196 | 2/8/3.9 | 2/8/4.2 | 1/12/4.3 | 1/12/4.3 | 1/12/4.2 | 1/2/1.2 | 1/0/0.0 | 1/0/0.0 |
| 201 | 2/8/3.9 | 2/8/4.2 | 1/12/4.3 | 1/12/4.2 | 1/12/4.2 | 1/2/0.4 | 1/0/0.0 | 1/0/0.0 |
| 206 | 2/8/3.9 | 2/8/4.2 | 1/12/4.3 | 1/12/4.2 | 1/12/4.2 | 1/0/0.0 | 1/0/0.0 | 1/0/0.0 |
| 211 | 2/8/3.9 | 2/7/4.0 | 1/14/4.5 | 1/12/4.2 | 1/10/3.9 | 1/0/0.0 | 1/0/0.0 | 1/0/0.0 |
| 216 | 2/8/3.8 | 2/6/3.8 | 1/14/4.5 | 1/14/4.4 | 1/6/3.2 | 1/0/0.0 | 1/0/0.0 | 1/0/0.0 |
| 221 | 2/8/3.8 | 1/14/4.4 | 1/14/4.4 | 1/14/4.4 | 1/4/2.6 | 1/0/0.0 | 1/0/0.0 | 1/0/0.0 |
| 226 | 2/8/3.8 | 1/14/4.4 | 1/14/4.4 | 1/14/4.4 | 1/4/2.1 | 1/0/0.0 | 1/0/0.0 | 1/0/0.0 |

In an alternate embodiment, because the (s,z)-pairs in G.lite are a subset of the set of (s,z)-pairs in G.dmt, the net coding gain $g_{n,dB}$ data for G.lite can be retrieved from Tables 14 to 36, below.

TABLE 14

(s = 1, z = 2): Net Coding Gain Matrix (dB)

| $n_{eff}$\$\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.1 | 0.3 | 0.3 | 0.4 | 0.3 | 0.3 | 0.3 | 0.3 |
| 31 | 0.3 | 0.5 | 0.6 | 0.6 | 0.6 | 0.6 | 0.6 | 0.6 |
| 36 | 0.5 | 0.7 | 0.8 | 0.8 | 0.8 | 0.8 | 0.7 | 0.7 |

TABLE 14-continued (s = 1, z = 2): Net Coding Gain Matrix (dB)

| $n_{eff}$\$\gamma_{eff}$ | 15 | 20 | 25 | 30 | 35 | 40 | 45 | 50 |
|---|---|---|---|---|---|---|---|---|
| 41 | 0.6 | 0.8 | 0.9 | 0.9 | 0.9 | 0.9 | 0.9 | 0.9 |
| 46 | 0.7 | 0.9 | 1.0 | 1.0 | 1.0 | 1.0 | 1.0 | 1.0 |
| 51 | 0.8 | 1.0 | 1.1 | 1.1 | 1.1 | 1.1 | 1.1 | 1.0 |
| 56 | 0.9 | 1.1 | 1.1 | 1.2 | 1.1 | 1.1 | 1.1 | 1.1 |
| 61 | 0.9 | 1.2 | 1.2 | 1.2 | 1.2 | 1.2 | 1.2 | 1.2 |
| 66 | 1.0 | 1.2 | 1.2 | 1.2 | 1.2 | 1.2 | 1.2 | 1.2 |
| 71 | 1.0 | 1.2 | 1.3 | 1.3 | 1.3 | 1.3 | 1.2 | 1.2 |
| 76 | 1.0 | 1.2 | 1.3 | 1.3 | 1.3 | 1.3 | 1.3 | 1.3 |
| 81 | 1.1 | 1.3 | 1.3 | 1.3 | 1.3 | 1.3 | 1.3 | 1.3 |
| 86 | 1.1 | 1.3 | 1.4 | 1.4 | 1.3 | 1.3 | 1.3 | 1.3 |
| 91 | 1.1 | 1.3 | 1.4 | 1.4 | 1.4 | 1.4 | 1.3 | 1.3 |
| 96 | 1.1 | 1.3 | 1.4 | 1.4 | 1.4 | 1.4 | 1.4 | 1.3 |
| 101 | 1.2 | 1.4 | 1.4 | 1.4 | 1.4 | 1.4 | 1.4 | 1.4 |

TABLE 14-continued (s = 1, z = 2): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 106 | 1.2 | 1.4 | 1.4 | 1.4 | 1.4 | 1.4 | 1.4 | 1.4 |
| 111 | 1.2 | 1.4 | 1.4 | 1.4 | 1.4 | 1.4 | 1.4 | 1.4 |
| 116 | 1.2 | 1.4 | 1.4 | 1.4 | 1.4 | 1.4 | 1.4 | 1.4 |
| 121 | 1.2 | 1.4 | 1.4 | 1.4 | 1.4 | 1.4 | 1.4 | 1.4 |
| 126 | 1.2 | 1.4 | 1.5 | 1.5 | 1.4 | 1.4 | 1.4 | 1.4 |
| 131 | 1.2 | 1.4 | 1.5 | 1.5 | 1.4 | 1.4 | 1.4 | 1.4 |
| 136 | 1.2 | 1.4 | 1.5 | 1.5 | 1.5 | 1.4 | 1.4 | 1.4 |
| 141 | 1.2 | 1.4 | 1.5 | 1.5 | 1.5 | 1.4 | 1.4 | 1.4 |
| 146 | 1.2 | 1.4 | 1.5 | 1.5 | 1.5 | 1.4 | 1.4 | 1.4 |
| 151 | 1.2 | 1.4 | 1.5 | 1.5 | 1.5 | 1.5 | 1.4 | 0.2 |
| 156 | 1.3 | 1.4 | 1.5 | 1.5 | 1.5 | 1.5 | 1.4 | 0.0 |
| 161 | 1.3 | 1.4 | 1.5 | 1.5 | 1.5 | 1.5 | 1.4 | 0.0 |
| 166 | 1.3 | 1.4 | 1.5 | 1.5 | 1.5 | 1.5 | 1.4 | 0.0 |
| 171 | 1.3 | 1.4 | 1.5 | 1.5 | 1.5 | 1.5 | 0.5 | 0.0 |
| 176 | 1.3 | 1.5 | 1.5 | 1.5 | 1.5 | 1.5 | 0.0 | 0.0 |
| 181 | 1.3 | 1.5 | 1.5 | 1.5 | 1.5 | 1.5 | 0.0 | 0.0 |
| 186 | 1.3 | 1.5 | 1.5 | 1.5 | 1.5 | 1.5 | 0.0 | 0.0 |
| 191 | 1.3 | 1.5 | 1.5 | 1.5 | 1.5 | 1.5 | 0.0 | 0.0 |
| 196 | 1.3 | 1.5 | 1.5 | 1.5 | 1.5 | 1.0 | 0.0 | 0.0 |
| 201 | 1.3 | 1.5 | 1.5 | 1.5 | 1.5 | 0.2 | 0.0 | 0.0 |
| 206 | 1.3 | 1.5 | 1.5 | 1.5 | 1.5 | 0.0 | 0.0 | 0.0 |
| 211 | 1.3 | 1.5 | 1.5 | 1.5 | 1.5 | 0.0 | 0.0 | 0.0 |
| 216 | 1.3 | 1.5 | 1.5 | 1.5 | 1.5 | 0.0 | 0.0 | 0.0 |
| 221 | 1.3 | 1.5 | 1.5 | 1.5 | 1.5 | 0.0 | 0.0 | 0.0 |
| 226 | 1.3 | 1.5 | 1.5 | 1.5 | 1.5 | 0.0 | 0.0 | 0.0 |

TABLE 15

(s = 1, z = 4): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.2 | 0.2 | 0.2 | 0.2 | 0.2 | 0.2 | 0.2 |
| 36 | 0.3 | 0.5 | 0.6 | 0.6 | 0.6 | 0.6 | 0.5 | 0.5 |
| 41 | 0.5 | 0.8 | 0.9 | 0.9 | 0.8 | 0.8 | 0.8 | 0.8 |
| 46 | 0.7 | 1.0 | 1.1 | 1.1 | 1.1 | 1.0 | 1.0 | 1.0 |
| 51 | 0.9 | 1.2 | 1.2 | 1.2 | 1.2 | 1.2 | 1.2 | 1.2 |
| 56 | 1.0 | 1.3 | 1.4 | 1.4 | 1.3 | 1.3 | 1.3 | 1.3 |
| 61 | 1.1 | 1.4 | 1.5 | 1.5 | 1.5 | 1.4 | 1.4 | 1.4 |
| 66 | 1.2 | 1.5 | 1.6 | 1.6 | 1.5 | 1.5 | 1.5 | 1.5 |
| 71 | 1.3 | 1.6 | 1.6 | 1.6 | 1.6 | 1.6 | 1.6 | 1.6 |
| 76 | 1.4 | 1.6 | 1.7 | 1.7 | 1.7 | 1.7 | 1.6 | 1.6 |
| 81 | 1.4 | 1.7 | 1.8 | 1.8 | 1.7 | 1.7 | 1.7 | 1.7 |
| 86 | 1.5 | 1.7 | 1.8 | 1.8 | 1.8 | 1.8 | 1.7 | 1.7 |
| 91 | 1.5 | 1.8 | 1.8 | 1.8 | 1.8 | 1.8 | 1.8 | 1.8 |
| 96 | 1.6 | 1.8 | 1.9 | 1.9 | 1.9 | 1.8 | 1.8 | 1.8 |
| 101 | 1.6 | 1.9 | 1.9 | 1.9 | 1.9 | 1.9 | 1.8 | 1.8 |
| 106 | 1.6 | 1.9 | 1.9 | 1.9 | 1.9 | 1.9 | 1.9 | 1.9 |
| 111 | 1.6 | 1.9 | 2.0 | 2.0 | 1.9 | 1.9 | 1.9 | 1.9 |
| 116 | 1.7 | 1.9 | 2.0 | 2.0 | 2.0 | 1.9 | 1.9 | 1.9 |
| 121 | 1.7 | 1.9 | 2.0 | 2.0 | 2.0 | 2.0 | 1.9 | 1.9 |
| 126 | 1.7 | 2.0 | 2.0 | 2.0 | 2.0 | 2.0 | 2.0 | 1.9 |
| 131 | 1.7 | 2.0 | 2.0 | 2.0 | 2.0 | 2.0 | 2.0 | 2.0 |
| 136 | 1.7 | 2.0 | 2.1 | 2.1 | 2.0 | 2.0 | 2.0 | 2.0 |
| 141 | 1.8 | 2.0 | 2.1 | 2.1 | 2.0 | 2.0 | 2.0 | 2.0 |
| 146 | 1.8 | 2.0 | 2.1 | 2.1 | 2.1 | 2.0 | 2.0 | 1.3 |
| 151 | 1.8 | 2.0 | 2.1 | 2.1 | 2.1 | 2.0 | 2.0 | 0.0 |
| 156 | 1.8 | 2.0 | 2.1 | 2.1 | 2.1 | 2.0 | 2.0 | 0.0 |
| 161 | 1.8 | 2.1 | 2.1 | 2.1 | 2.1 | 2.1 | 2.0 | 0.0 |
| 166 | 1.8 | 2.1 | 2.1 | 2.1 | 2.1 | 2.1 | 1.3 | 0.0 |
| 171 | 1.8 | 2.1 | 2.1 | 2.1 | 2.1 | 2.1 | 0.2 | 0.0 |
| 176 | 1.8 | 2.1 | 2.1 | 2.1 | 2.1 | 2.1 | 0.0 | 0.0 |
| 181 | 1.8 | 2.1 | 2.1 | 2.1 | 2.1 | 2.1 | 0.0 | 0.0 |
| 186 | 1.8 | 2.1 | 2.1 | 2.1 | 2.1 | 2.1 | 0.0 | 0.0 |
| 191 | 1.9 | 2.1 | 2.1 | 2.1 | 2.1 | 1.5 | 0.0 | 0.0 |
| 196 | 1.9 | 2.1 | 2.2 | 2.1 | 2.1 | 0.7 | 0.0 | 0.0 |

TABLE 15-continued (s = 1, z = 4): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 201 | 1.9 | 2.1 | 2.2 | 2.1 | 2.1 | 0.0 | 0.0 | 0.0 |
| 206 | 1.9 | 2.1 | 2.2 | 2.2 | 2.1 | 0.0 | 0.0 | 0.0 |
| 211 | 1.9 | 2.1 | 2.2 | 2.2 | 2.1 | 0.0 | 0.0 | 0.0 |
| 216 | 1.9 | 2.1 | 2.2 | 2.2 | 2.1 | 0.0 | 0.0 | 0.0 |
| 221 | 1.9 | 2.1 | 2.2 | 2.2 | 2.1 | 0.0 | 0.0 | 0.0 |
| 226 | 1.9 | 2.1 | 2.2 | 2.2 | 1.6 | 0.0 | 0.0 | 0.0 |

TABLE 16

(s = 1, z = 6): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.0 | 0.0 | 0.0 | 0.1 | 0.0 | 0.0 | 0.0 | 0.0 |
| 41 | 0.1 | 0.4 | 0.5 | 0.5 | 0.4 | 0.4 | 0.4 | 0.4 |
| 46 | 0.4 | 0.7 | 0.8 | 0.8 | 0.8 | 0.7 | 0.7 | 0.7 |
| 51 | 0.7 | 1.0 | 1.0 | 1.0 | 1.0 | 1.0 | 0.9 | 0.9 |
| 56 | 0.9 | 1.2 | 1.2 | 1.2 | 1.2 | 1.2 | 1.1 | 1.1 |
| 61 | 1.0 | 1.3 | 1.4 | 1.4 | 1.4 | 1.3 | 1.3 | 1.3 |
| 66 | 1.2 | 1.5 | 1.5 | 1.5 | 1.5 | 1.5 | 1.5 | 1.4 |
| 71 | 1.3 | 1.6 | 1.7 | 1.7 | 1.6 | 1.6 | 1.6 | 1.5 |
| 76 | 1.4 | 1.7 | 1.8 | 1.8 | 1.7 | 1.7 | 1.7 | 1.6 |
| 81 | 1.5 | 1.8 | 1.8 | 1.8 | 1.8 | 1.8 | 1.8 | 1.7 |
| 86 | 1.6 | 1.8 | 1.9 | 1.9 | 1.9 | 1.9 | 1.8 | 1.8 |
| 91 | 1.6 | 1.9 | 2.0 | 2.0 | 1.9 | 1.9 | 1.9 | 1.9 |
| 96 | 1.7 | 2.0 | 2.0 | 2.0 | 2.0 | 2.0 | 2.0 | 1.9 |
| 101 | 1.7 | 2.0 | 2.1 | 2.1 | 2.1 | 2.0 | 2.0 | 2.0 |
| 106 | 1.7 | 2.1 | 2.1 | 2.1 | 2.1 | 2.1 | 2.0 | 2.0 |
| 111 | 1.8 | 2.1 | 2.2 | 2.2 | 2.1 | 2.1 | 2.1 | 2.1 |
| 116 | 1.8 | 2.2 | 2.2 | 2.2 | 2.2 | 2.1 | 2.1 | 2.1 |
| 121 | 1.9 | 2.2 | 2.2 | 2.2 | 2.2 | 2.2 | 2.2 | 2.1 |
| 126 | 1.9 | 2.2 | 2.3 | 2.3 | 2.2 | 2.2 | 2.2 | 2.2 |
| 131 | 1.9 | 2.3 | 2.3 | 2.3 | 2.3 | 2.2 | 2.2 | 2.2 |
| 136 | 2.0 | 2.3 | 2.3 | 2.3 | 2.3 | 2.3 | 2.2 | 2.2 |
| 141 | 2.0 | 2.3 | 2.3 | 2.3 | 2.3 | 2.3 | 2.2 | 2.2 |
| 146 | 2.0 | 2.3 | 2.4 | 2.4 | 2.2 | 2.2 | 2.3 | 0.9 |
| 151 | 2.0 | 2.3 | 2.4 | 2.4 | 2.3 | 2.3 | 2.3 | 0.0 |
| 156 | 2.1 | 2.3 | 2.4 | 2.4 | 2.4 | 2.3 | 2.3 | 0.0 |
| 161 | 2.1 | 2.4 | 2.4 | 2.4 | 2.4 | 2.3 | 2.1 | 0.0 |
| 166 | 2.1 | 2.4 | 2.4 | 2.4 | 2.4 | 2.4 | 1.0 | 0.0 |
| 171 | 2.1 | 2.4 | 2.4 | 2.4 | 2.4 | 2.4 | 0.0 | 0.0 |
| 176 | 2.1 | 2.4 | 2.5 | 2.5 | 2.4 | 2.4 | 0.0 | 0.0 |
| 181 | 2.1 | 2.4 | 2.5 | 2.5 | 2.4 | 2.4 | 0.0 | 0.0 |
| 186 | 2.1 | 2.4 | 2.5 | 2.5 | 2.4 | 2.1 | 0.0 | 0.0 |
| 191 | 2.2 | 2.4 | 2.5 | 2.5 | 2.4 | 1.3 | 0.0 | 0.0 |
| 196 | 2.2 | 2.4 | 2.5 | 2.5 | 2.4 | 0.5 | 0.0 | 0.0 |
| 201 | 2.2 | 2.4 | 2.5 | 2.5 | 2.5 | 0.0 | 0.0 | 0.0 |
| 206 | 2.2 | 2.4 | 2.5 | 2.5 | 2.5 | 0.0 | 0.0 | 0.0 |
| 211 | 2.2 | 2.5 | 2.5 | 2.5 | 2.5 | 0.0 | 0.0 | 0.0 |
| 216 | 2.2 | 2.5 | 2.5 | 2.5 | 2.5 | 0.0 | 0.0 | 0.0 |
| 221 | 2.2 | 2.5 | 2.5 | 2.5 | 2.0 | 0.0 | 0.0 | 0.0 |
| 226 | 2.2 | 2.5 | 2.5 | 2.5 | 1.4 | 0.0 | 0.0 | 0.0 |

TABLE 17

(s = 1, z = 8): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |

TABLE 17-continued (s = 1, z = 8): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.0 | 0.0 | 0.0 | 0.0 | 0.0 | 0.0 | 0.0 | 0.0 |
| 41 | 0.0 | 0.0 | 0.0 | 0.0 | 0.0 | 0.0 | 0.0 | 0.0 |
| 46 | 0.0 | 0.3 | 0.3 | 0.3 | 0.3 | 0.2 | 0.2 | 0.2 |
| 51 | 0.3 | 0.6 | 0.7 | 0.6 | 0.6 | 0.6 | 0.5 | 0.5 |
| 56 | 0.6 | 0.9 | 0.9 | 0.9 | 0.9 | 0.8 | 0.8 | 0.8 |
| 61 | 0.8 | 1.1 | 1.2 | 1.1 | 1.1 | 1.1 | 1.0 | 1.0 |
| 66 | 1.0 | 1.3 | 1.3 | 1.3 | 1.3 | 1.3 | 1.2 | 1.2 |
| 71 | 1.1 | 1.4 | 1.5 | 1.5 | 1.5 | 1.4 | 1.4 | 1.4 |
| 76 | 1.3 | 1.6 | 1.6 | 1.6 | 1.6 | 1.6 | 1.5 | 1.5 |
| 81 | 1.4 | 1.7 | 1.8 | 1.7 | 1.7 | 1.7 | 1.6 | 1.6 |
| 86 | 1.5 | 1.8 | 1.9 | 1.8 | 1.8 | 1.8 | 1.7 | 1.7 |
| 91 | 1.6 | 1.9 | 2.0 | 1.9 | 1.9 | 1.9 | 1.8 | 1.8 |
| 96 | 1.7 | 2.0 | 2.0 | 2.0 | 2.0 | 1.9 | 1.9 | 1.9 |
| 101 | 1.7 | 2.0 | 2.1 | 2.1 | 2.1 | 2.0 | 2.0 | 2.0 |
| 106 | 1.8 | 2.1 | 2.2 | 2.2 | 2.1 | 2.1 | 2.1 | 2.0 |
| 111 | 1.8 | 2.2 | 2.2 | 2.2 | 2.2 | 2.1 | 2.1 | 2.1 |
| 116 | 1.9 | 2.2 | 2.3 | 2.3 | 2.2 | 2.2 | 2.2 | 2.1 |
| 121 | 1.9 | 2.3 | 2.3 | 2.3 | 2.3 | 2.2 | 2.2 | 2.2 |
| 126 | 2.0 | 2.3 | 2.4 | 2.3 | 2.3 | 2.3 | 2.2 | 2.2 |
| 131 | 2.0 | 2.3 | 2.4 | 2.4 | 2.3 | 2.3 | 2.3 | 2.3 |
| 136 | 2.1 | 2.4 | 2.4 | 2.4 | 2.4 | 2.3 | 2.3 | 2.3 |
| 141 | 2.1 | 2.4 | 2.5 | 2.4 | 2.4 | 2.4 | 2.3 | 2.0 |
| 146 | 2.1 | 2.4 | 2.5 | 2.5 | 2.4 | 2.4 | 2.4 | 0.6 |
| 151 | 2.2 | 2.5 | 2.5 | 2.5 | 2.5 | 2.4 | 2.4 | 0.0 |
| 156 | 2.2 | 2.5 | 2.5 | 2.5 | 2.5 | 2.5 | 2.4 | 0.0 |
| 161 | 2.2 | 2.5 | 2.6 | 2.5 | 2.5 | 2.5 | 1.8 | 0.0 |
| 166 | 2.2 | 2.5 | 2.6 | 2.6 | 2.5 | 2.5 | 0.7 | 0.0 |
| 171 | 2.2 | 2.5 | 2.6 | 2.6 | 2.5 | 2.5 | 0.0 | 0.0 |
| 176 | 2.3 | 2.6 | 2.6 | 2.6 | 2.6 | 2.5 | 0.0 | 0.0 |
| 181 | 2.3 | 2.6 | 2.6 | 2.6 | 2.6 | 2.5 | 0.0 | 0.0 |
| 186 | 2.3 | 2.6 | 2.6 | 2.6 | 2.6 | 1.9 | 0.0 | 0.0 |
| 191 | 2.3 | 2.6 | 2.7 | 2.6 | 2.6 | 1.0 | 0.0 | 0.0 |
| 196 | 2.3 | 2.6 | 2.7 | 2.7 | 2.6 | 0.2 | 0.0 | 0.0 |
| 201 | 2.3 | 2.6 | 2.7 | 2.7 | 2.6 | 0.0 | 0.0 | 0.0 |
| 206 | 2.4 | 2.6 | 2.7 | 2.7 | 2.6 | 0.0 | 0.0 | 0.0 |
| 211 | 2.4 | 2.6 | 2.7 | 2.7 | 2.7 | 0.0 | 0.0 | 0.0 |
| 216 | 2.4 | 2.7 | 2.7 | 2.7 | 2.4 | 0.0 | 0.0 | 0.0 |
| 221 | 2.4 | 2.7 | 2.7 | 2.7 | 1.8 | 0.0 | 0.0 | 0.0 |
| 226 | 2.4 | 2.7 | 2.7 | 2.7 | 1.2 | 0.0 | 0.0 | 0.0 |

TABLE 18

(s = 1, z = 10): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.0 | 0.0 | 0.0 | 0.0 | 0.0 | 0.0 | 0.0 | 0.0 |
| 41 | 0.0 | 0.0 | 0.0 | 0.0 | 0.0 | 0.0 | 0.0 | 0.0 |
| 46 | 0.0 | 0.0 | 0.0 | 0.0 | 0.0 | 0.0 | 0.0 | 0.0 |
| 51 | 0.0 | 0.1 | 0.2 | 0.1 | 0.1 | 0.1 | 0.0 | 0.0 |
| 56 | 0.2 | 0.5 | 0.5 | 0.5 | 0.5 | 0.4 | 0.4 | 0.3 |
| 61 | 0.4 | 0.7 | 0.8 | 0.8 | 0.7 | 0.7 | 0.7 | 0.6 |
| 66 | 0.7 | 1.0 | 1.0 | 1.0 | 1.0 | 0.9 | 0.9 | 0.9 |
| 71 | 0.9 | 1.2 | 1.2 | 1.2 | 1.2 | 1.1 | 1.1 | 1.1 |
| 76 | 1.0 | 1.4 | 1.4 | 1.4 | 1.4 | 1.3 | 1.3 | 1.3 |
| 81 | 1.2 | 1.5 | 1.6 | 1.5 | 1.5 | 1.5 | 1.4 | 1.4 |
| 86 | 1.3 | 1.6 | 1.7 | 1.7 | 1.6 | 1.6 | 1.6 | 1.5 |
| 91 | 1.4 | 1.7 | 1.8 | 1.8 | 1.8 | 1.7 | 1.7 | 1.7 |
| 96 | 1.5 | 1.9 | 1.9 | 1.9 | 1.9 | 1.8 | 1.8 | 1.8 |
| 101 | 1.6 | 1.9 | 2.0 | 2.0 | 2.0 | 1.9 | 1.9 | 1.8 |
| 106 | 1.7 | 2.0 | 2.1 | 2.1 | 2.0 | 2.0 | 2.0 | 1.9 |
| 111 | 1.8 | 2.1 | 2.2 | 2.1 | 2.1 | 2.1 | 2.0 | 2.0 |

TABLE 18-continued (s = 1, z = 10): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 116 | 1.8 | 2.2 | 2.2 | 2.2 | 2.2 | 2.1 | 2.1 | 2.1 |
| 121 | 1.9 | 2.2 | 2.3 | 2.3 | 2.2 | 2.2 | 2.2 | 2.1 |
| 126 | 2.0 | 2.3 | 2.3 | 2.3 | 2.3 | 2.2 | 2.2 | 2.2 |
| 131 | 2.0 | 2.3 | 2.4 | 2.4 | 2.3 | 2.3 | 2.3 | 2.2 |
| 136 | 2.1 | 2.4 | 2.4 | 2.4 | 2.4 | 2.3 | 2.3 | 2.3 |
| 141 | 2.1 | 2.4 | 2.5 | 2.5 | 2.4 | 2.4 | 2.3 | 1.7 |
| 146 | 2.1 | 2.5 | 2.5 | 2.5 | 2.5 | 2.4 | 2.4 | 0.3 |
| 151 | 2.2 | 2.5 | 2.5 | 2.5 | 2.5 | 2.5 | 2.4 | 0.0 |
| 156 | 2.2 | 2.5 | 2.6 | 2.6 | 2.5 | 2.5 | 2.4 | 0.0 |
| 161 | 2.2 | 2.5 | 2.6 | 2.6 | 2.6 | 2.5 | 1.5 | 0.0 |
| 166 | 2.3 | 2.6 | 2.6 | 2.6 | 2.6 | 2.5 | 0.4 | 0.0 |
| 171 | 2.3 | 2.6 | 2.7 | 2.6 | 2.6 | 2.6 | 0.0 | 0.0 |
| 176 | 2.3 | 2.6 | 2.7 | 2.7 | 2.6 | 2.6 | 0.0 | 0.0 |
| 181 | 2.3 | 2.6 | 2.7 | 2.7 | 2.6 | 2.5 | 0.0 | 0.0 |
| 186 | 2.4 | 2.7 | 2.7 | 2.7 | 2.7 | 1.6 | 0.0 | 0.0 |
| 191 | 2.4 | 2.7 | 2.7 | 2.7 | 2.7 | 0.8 | 0.0 | 0.0 |
| 196 | 2.4 | 2.7 | 2.8 | 2.7 | 2.7 | 0.0 | 0.0 | 0.0 |
| 201 | 2.4 | 2.7 | 2.8 | 2.8 | 2.7 | 0.0 | 0.0 | 0.0 |
| 206 | 2.4 | 2.7 | 2.8 | 2.8 | 2.7 | 0.0 | 0.0 | 0.0 |
| 211 | 2.5 | 2.7 | 2.8 | 2.8 | 2.7 | 0.0 | 0.0 | 0.0 |
| 216 | 2.5 | 2.8 | 2.8 | 2.8 | 2.2 | 0.0 | 0.0 | 0.0 |
| 221 | 2.5 | 2.8 | 2.8 | 2.8 | 1.6 | 0.0 | 0.0 | 0.0 |
| 226 | 2.5 | 2.8 | 2.8 | 2.8 | 1.0 | 0.0 | 0.0 | 0.0 |

TABLE 19

(s = 1, z = 12): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.0 | 0.0 | 0.0 | 0.0 | 0.0 | 0.0 | 0.0 | 0.0 |
| 41 | 0.0 | 0.0 | 0.0 | 0.0 | 0.0 | 0.0 | 0.0 | 0.0 |
| 46 | 0.0 | 0.0 | 0.0 | 0.0 | 0.0 | 0.0 | 0.0 | 0.0 |
| 51 | 0.0 | 0.0 | 0.0 | 0.0 | 0.0 | 0.0 | 0.0 | 0.0 |
| 56 | 0.0 | 0.0 | 0.0 | 0.0 | 0.0 | 0.0 | 0.0 | 0.0 |
| 61 | 0.0 | 0.3 | 0.4 | 0.4 | 0.3 | 0.3 | 0.2 | 0.2 |
| 66 | 0.3 | 0.6 | 0.7 | 0.6 | 0.6 | 0.6 | 0.5 | 0.5 |
| 71 | 0.5 | 0.9 | 0.9 | 0.9 | 0.8 | 0.8 | 0.8 | 0.7 |
| 76 | 0.7 | 1.1 | 1.1 | 1.1 | 1.1 | 1.0 | 1.0 | 0.9 |
| 81 | 0.9 | 1.3 | 1.3 | 1.3 | 1.2 | 1.2 | 1.2 | 1.1 |
| 86 | 1.1 | 1.4 | 1.5 | 1.4 | 1.4 | 1.4 | 1.3 | 1.3 |
| 91 | 1.2 | 1.6 | 1.6 | 1.6 | 1.5 | 1.5 | 1.5 | 1.4 |
| 96 | 1.4 | 1.7 | 1.7 | 1.7 | 1.7 | 1.6 | 1.6 | 1.6 |
| 101 | 1.5 | 1.8 | 1.9 | 1.8 | 1.8 | 1.7 | 1.7 | 1.7 |
| 106 | 1.6 | 1.9 | 2.0 | 1.9 | 1.9 | 1.8 | 1.8 | 1.8 |
| 111 | 1.7 | 2.0 | 2.0 | 2.0 | 2.0 | 1.9 | 1.9 | 1.9 |
| 116 | 1.7 | 2.1 | 2.1 | 2.1 | 2.1 | 2.0 | 2.0 | 1.9 |
| 121 | 1.8 | 2.1 | 2.2 | 2.2 | 2.1 | 2.1 | 2.1 | 2.0 |
| 126 | 1.9 | 2.2 | 2.3 | 2.2 | 2.2 | 2.2 | 2.1 | 2.1 |
| 131 | 1.9 | 2.3 | 2.3 | 2.3 | 2.3 | 2.2 | 2.2 | 2.1 |
| 136 | 2.0 | 2.3 | 2.4 | 2.4 | 2.3 | 2.3 | 2.2 | 2.2 |
| 141 | 2.1 | 2.4 | 2.4 | 2.4 | 2.4 | 2.3 | 2.3 | 1.4 |
| 146 | 2.1 | 2.4 | 2.5 | 2.5 | 2.4 | 2.4 | 2.3 | 0.0 |
| 151 | 2.1 | 2.5 | 2.5 | 2.5 | 2.5 | 2.4 | 2.4 | 0.0 |
| 156 | 2.2 | 2.5 | 2.6 | 2.5 | 2.5 | 2.5 | 2.4 | 0.0 |
| 161 | 2.2 | 2.5 | 2.6 | 2.6 | 2.5 | 2.5 | 1.2 | 0.0 |
| 166 | 2.3 | 2.6 | 2.6 | 2.6 | 2.6 | 2.5 | 0.1 | 0.0 |
| 171 | 2.3 | 2.6 | 2.7 | 2.6 | 2.6 | 2.6 | 0.0 | 0.0 |
| 176 | 2.3 | 2.6 | 2.7 | 2.7 | 2.6 | 2.6 | 0.0 | 0.0 |
| 181 | 2.4 | 2.7 | 2.7 | 2.7 | 2.7 | 2.2 | 0.0 | 0.0 |
| 186 | 2.4 | 2.7 | 2.7 | 2.7 | 2.7 | 1.3 | 0.0 | 0.0 |
| 191 | 2.4 | 2.7 | 2.8 | 2.7 | 2.7 | 0.5 | 0.0 | 0.0 |
| 196 | 2.4 | 2.7 | 2.8 | 2.8 | 2.7 | 0.0 | 0.0 | 0.0 |
| 201 | 2.4 | 2.8 | 2.8 | 2.8 | 2.7 | 0.0 | 0.0 | 0.0 |
| 206 | 2.5 | 2.8 | 2.8 | 2.8 | 2.8 | 0.0 | 0.0 | 0.0 |

TABLE 19-continued (s = 1, z = 12): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 211 | 2.5 | 2.8 | 2.9 | 2.8 | 2.6 | 0.0 | 0.0 | 0.0 |
| 216 | 2.5 | 2.8 | 2.9 | 2.8 | 2.0 | 0.0 | 0.0 | 0.0 |
| 221 | 2.5 | 2.8 | 2.9 | 2.9 | 1.4 | 0.0 | 0.0 | 0.0 |
| 226 | 2.5 | 2.8 | 2.9 | 2.9 | 0.8 | 0.0 | 0.0 | 0.0 |

TABLE 20

(s = 1, z = 14): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.0 | 0.0 | 0.0 | 0.0 | 0.0 | 0.0 | 0.0 | 0.0 |
| 41 | 0.0 | 0.0 | 0.0 | 0.0 | 0.0 | 0.0 | 0.0 | 0.0 |
| 46 | 0.0 | 0.0 | 0.0 | 0.0 | 0.0 | 0.0 | 0.0 | 0.0 |
| 51 | 0.0 | 0.0 | 0.0 | 0.0 | 0.0 | 0.0 | 0.0 | 0.0 |
| 56 | 0.0 | 0.0 | 0.0 | 0.0 | 0.0 | 0.0 | 0.0 | 0.0 |
| 61 | 0.0 | 0.0 | 0.0 | 0.0 | 0.0 | 0.0 | 0.0 | 0.0 |
| 66 | 0.0 | 0.2 | 0.3 | 0.2 | 0.2 | 0.1 | 0.1 | 0.0 |
| 71 | 0.2 | 0.5 | 0.5 | 0.5 | 0.5 | 0.4 | 0.4 | 0.3 |
| 76 | 0.4 | 0.7 | 0.8 | 0.8 | 0.7 | 0.7 | 0.6 | 0.6 |
| 81 | 0.6 | 1.0 | 1.0 | 1.0 | 0.9 | 0.9 | 0.8 | 0.8 |
| 86 | 0.8 | 1.1 | 1.2 | 1.2 | 1.1 | 1.1 | 1.0 | 1.0 |
| 91 | 1.0 | 1.3 | 1.4 | 1.3 | 1.3 | 1.2 | 1.2 | 1.2 |
| 96 | 1.1 | 1.5 | 1.5 | 1.5 | 1.4 | 1.4 | 1.4 | 1.3 |
| 101 | 1.3 | 1.6 | 1.6 | 1.6 | 1.6 | 1.5 | 1.5 | 1.5 |
| 106 | 1.4 | 1.7 | 1.8 | 1.7 | 1.7 | 1.6 | 1.6 | 1.6 |
| 111 | 1.5 | 1.8 | 1.9 | 1.8 | 1.8 | 1.8 | 1.7 | 1.7 |
| 116 | 1.6 | 1.9 | 2.0 | 1.9 | 1.9 | 1.9 | 1.8 | 1.8 |
| 121 | 1.7 | 2.0 | 2.1 | 2.0 | 2.0 | 1.9 | 1.9 | 1.9 |
| 126 | 1.8 | 2.1 | 2.1 | 2.1 | 2.1 | 2.0 | 2.0 | 1.9 |
| 131 | 1.8 | 2.2 | 2.2 | 2.2 | 2.1 | 2.1 | 2.1 | 2.0 |
| 136 | 1.9 | 2.2 | 2.3 | 2.3 | 2.2 | 2.2 | 2.1 | 2.1 |
| 141 | 2.0 | 2.3 | 2.3 | 2.3 | 2.3 | 2.2 | 2.2 | 1.0 |
| 146 | 2.0 | 2.3 | 2.4 | 2.4 | 2.3 | 2.3 | 2.2 | 0.0 |
| 151 | 2.1 | 2.4 | 2.4 | 2.4 | 2.3 | 2.3 | 2.3 | 0.0 |
| 156 | 2.1 | 2.4 | 2.5 | 2.5 | 2.4 | 2.4 | 2.1 | 0.0 |
| 161 | 2.2 | 2.5 | 2.5 | 2.5 | 2.5 | 2.4 | 0.9 | 0.0 |
| 166 | 2.2 | 2.5 | 2.6 | 2.6 | 2.5 | 2.5 | 0.0 | 0.0 |
| 171 | 2.3 | 2.6 | 2.6 | 2.6 | 2.6 | 2.5 | 0.0 | 0.0 |
| 176 | 2.3 | 2.6 | 2.7 | 2.6 | 2.6 | 2.5 | 0.0 | 0.0 |
| 181 | 2.4 | 2.6 | 2.7 | 2.7 | 2.6 | 1.9 | 0.0 | 0.0 |
| 186 | 2.4 | 2.7 | 2.7 | 2.7 | 2.7 | 1.1 | 0.0 | 0.0 |
| 191 | 2.4 | 2.7 | 2.8 | 2.7 | 2.7 | 0.3 | 0.0 | 0.0 |
| 196 | 2.4 | 2.7 | 2.8 | 2.8 | 2.7 | 0.0 | 0.0 | 0.0 |
| 201 | 2.4 | 2.7 | 2.8 | 2.8 | 2.7 | 0.0 | 0.0 | 0.0 |
| 206 | 2.5 | 2.8 | 2.8 | 2.8 | 2.8 | 0.0 | 0.0 | 0.0 |
| 211 | 2.5 | 2.8 | 2.8 | 2.8 | 2.4 | 0.0 | 0.0 | 0.0 |
| 216 | 2.5 | 2.8 | 2.9 | 2.8 | 1.8 | 0.0 | 0.0 | 0.0 |
| 221 | 2.5 | 2.8 | 2.9 | 2.9 | 1.2 | 0.0 | 0.0 | 0.0 |
| 226 | 2.5 | 2.9 | 2.9 | 2.9 | 0.6 | 0.0 | 0.0 | 0.0 |

TABLE 21

(s = 1, z = 16): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |

TABLE 21-continued (s = 1, z = 16): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 31 | 0.0 | 0.0 | 0.0 | 0.0 | 0.0 | 0.0 | 0.0 | 0.0 |
| 36 | 0.0 | 0.0 | 0.0 | 0.0 | 0.0 | 0.0 | 0.0 | 0.0 |
| 41 | 0.0 | 0.0 | 0.0 | 0.0 | 0.0 | 0.0 | 0.0 | 0.0 |
| 46 | 0.0 | 0.0 | 0.0 | 0.0 | 0.0 | 0.0 | 0.0 | 0.0 |
| 51 | 0.0 | 0.0 | 0.0 | 0.0 | 0.0 | 0.0 | 0.0 | 0.0 |
| 56 | 0.0 | 0.0 | 0.0 | 0.0 | 0.0 | 0.0 | 0.0 | 0.0 |
| 61 | 0.0 | 0.0 | 0.0 | 0.0 | 0.0 | 0.0 | 0.0 | 0.0 |
| 66 | 0.0 | 0.0 | 0.0 | 0.0 | 0.0 | 0.0 | 0.0 | 0.0 |
| 71 | 0.0 | 0.1 | 0.1 | 0.1 | 0.0 | 0.0 | 0.0 | 0.0 |
| 76 | 0.1 | 0.4 | 0.4 | 0.4 | 0.3 | 0.3 | 0.2 | 0.2 |
| 81 | 0.3 | 0.6 | 0.7 | 0.6 | 0.6 | 0.5 | 0.5 | 0.5 |
| 86 | 0.5 | 0.8 | 0.9 | 0.9 | 0.8 | 0.8 | 0.7 | 0.7 |
| 91 | 0.7 | 1.0 | 1.1 | 1.1 | 1.0 | 1.0 | 0.9 | 0.9 |
| 96 | 0.9 | 1.2 | 1.3 | 1.2 | 1.2 | 1.1 | 1.1 | 1.0 |
| 101 | 1.0 | 1.4 | 1.4 | 1.4 | 1.3 | 1.3 | 1.2 | 1.2 |
| 106 | 1.2 | 1.5 | 1.6 | 1.5 | 1.5 | 1.4 | 1.4 | 1.3 |
| 111 | 1.3 | 1.6 | 1.7 | 1.6 | 1.6 | 1.5 | 1.5 | 1.5 |
| 116 | 1.4 | 1.7 | 1.8 | 1.8 | 1.7 | 1.7 | 1.6 | 1.6 |
| 121 | 1.5 | 1.8 | 1.9 | 1.9 | 1.8 | 1.8 | 1.7 | 1.7 |
| 126 | 1.6 | 1.9 | 2.0 | 2.0 | 1.9 | 1.9 | 1.8 | 1.8 |
| 131 | 1.7 | 2.0 | 2.1 | 2.0 | 2.0 | 1.9 | 1.9 | 1.9 |
| 136 | 1.8 | 2.1 | 2.1 | 2.1 | 2.1 | 2.0 | 2.0 | 1.9 |
| 141 | 1.8 | 2.2 | 2.2 | 2.2 | 2.1 | 2.1 | 2.1 | 0.7 |
| 146 | 1.9 | 2.2 | 2.3 | 2.3 | 2.2 | 2.2 | 2.1 | 0.0 |
| 151 | 2.0 | 2.3 | 2.3 | 2.3 | 2.3 | 2.2 | 2.2 | 0.0 |
| 156 | 2.0 | 2.3 | 2.4 | 2.4 | 2.3 | 2.3 | 1.8 | 0.0 |
| 161 | 2.1 | 2.4 | 2.5 | 2.4 | 2.4 | 2.3 | 0.6 | 0.0 |
| 166 | 2.1 | 2.4 | 2.5 | 2.5 | 2.4 | 2.4 | 0.0 | 0.0 |
| 171 | 2.2 | 2.5 | 2.5 | 2.5 | 2.5 | 2.4 | 0.0 | 0.0 |
| 176 | 2.2 | 2.5 | 2.6 | 2.6 | 2.5 | 2.5 | 0.0 | 0.0 |
| 181 | 2.3 | 2.6 | 2.6 | 2.6 | 2.6 | 1.7 | 0.0 | 0.0 |
| 186 | 2.3 | 2.6 | 2.7 | 2.6 | 2.6 | 0.8 | 0.0 | 0.0 |
| 191 | 2.3 | 2.6 | 2.7 | 2.7 | 2.6 | 0.0 | 0.0 | 0.0 |
| 196 | 2.4 | 2.7 | 2.7 | 2.7 | 2.7 | 0.0 | 0.0 | 0.0 |
| 201 | 2.4 | 2.7 | 2.8 | 2.7 | 2.7 | 0.0 | 0.0 | 0.0 |
| 206 | 2.4 | 2.7 | 2.8 | 2.8 | 2.7 | 0.0 | 0.0 | 0.0 |
| 211 | 2.5 | 2.8 | 2.8 | 2.8 | 2.2 | 0.0 | 0.0 | 0.0 |
| 216 | 2.5 | 2.8 | 2.8 | 2.8 | 1.5 | 0.0 | 0.0 | 0.0 |
| 221 | 2.5 | 2.8 | 2.9 | 2.8 | 0.9 | 0.0 | 0.0 | 0.0 |
| 226 | 2.5 | 2.8 | 2.9 | 2.9 | 0.4 | 0.0 | 0.0 | 0.0 |

TABLE 22

(s = 1, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.1 | 0.1 | 0.1 | 0.0 | 0.0 | 0.0 |
| 16 | 0.3 | 0.5 | 0.6 | 0.6 | 0.6 | 0.6 | 0.6 | 0.6 |
| 21 | 0.6 | 0.8 | 0.9 | 0.9 | 0.9 | 0.9 | 0.9 | 0.9 |
| 26 | 0.8 | 1.0 | 1.1 | 1.1 | 1.1 | 1.1 | 1.1 | 1.0 |
| 31 | 0.9 | 1.1 | 1.2 | 1.2 | 1.2 | 1.2 | 1.2 | 1.2 |
| 36 | 1.0 | 1.2 | 1.3 | 1.3 | 1.3 | 1.3 | 1.2 | 1.2 |
| 41 | 1.0 | 1.2 | 1.3 | 1.3 | 1.3 | 1.3 | 1.3 | 1.3 |
| 46 | 1.1 | 1.3 | 1.4 | 1.4 | 1.4 | 1.3 | 1.3 | 1.3 |
| 51 | 1.1 | 1.3 | 1.4 | 1.4 | 1.4 | 1.4 | 1.4 | 1.4 |
| 56 | 1.2 | 1.4 | 1.4 | 1.4 | 1.4 | 1.4 | 1.4 | 1.4 |
| 61 | 1.2 | 1.4 | 1.4 | 1.4 | 1.4 | 1.4 | 1.4 | 1.4 |
| 66 | 1.2 | 1.4 | 1.4 | 1.5 | 1.4 | 1.4 | 1.4 | 1.4 |
| 71 | 1.2 | 1.4 | 1.5 | 1.5 | 1.5 | 1.4 | 1.4 | 1.4 |
| 76 | 1.2 | 1.4 | 1.5 | 1.5 | 1.5 | 1.4 | 1.4 | 0.0 |
| 81 | 1.2 | 1.4 | 1.5 | 1.5 | 1.5 | 1.5 | 1.4 | 0.0 |
| 86 | 1.2 | 1.4 | 1.5 | 1.5 | 1.5 | 1.5 | 1.4 | 0.0 |
| 91 | 1.2 | 1.4 | 1.5 | 1.5 | 1.5 | 1.5 | 0.3 | 0.0 |
| 96 | 1.3 | 1.4 | 1.5 | 1.5 | 1.5 | 1.5 | 0.0 | 0.0 |
| 101 | 1.3 | 1.4 | 1.5 | 1.5 | 1.5 | 0.0 | 0.0 | 0.0 |
| 106 | 1.3 | 1.4 | 1.5 | 1.5 | 1.5 | 0.0 | 0.0 | 0.0 |
| 111 | 1.3 | 1.4 | 1.5 | 1.5 | 1.5 | 0.0 | 0.0 | 0.0 |
| 116 | 1.3 | 1.5 | 1.5 | 1.5 | 1.1 | 0.0 | 0.0 | 0.0 |
| 121 | 1.3 | 1.5 | 1.5 | 1.5 | 0.1 | 0.0 | 0.0 | 0.0 |

TABLE 22-continued (s = 1, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 126 | 1.3 | 1.5 | 1.5 | 1.5 | 0.0 | 0.0 | 0.0 | 0.0 |
| 131 | 1.3 | 1.5 | 1.5 | 1.5 | 0.0 | 0.0 | 0.0 | 0.0 |
| 136 | 1.3 | 1.5 | 1.5 | 1.5 | 0.0 | 0.0 | 0.0 | 0.0 |
| 141 | 1.3 | 1.5 | 1.5 | 1.5 | 0.0 | 0.0 | 0.0 | 0.0 |
| 146 | 1.3 | 1.5 | 1.5 | 0.7 | 0.0 | 0.0 | 0.0 | 0.0 |
| 151 | 1.3 | 1.5 | 1.5 | 0.1 | 0.0 | 0.0 | 0.0 | 0.0 |
| 156 | 1.3 | 1.5 | 1.5 | 0.0 | 0.0 | 0.0 | 0.0 | 0.0 |
| 161 | 1.3 | 1.5 | 1.5 | 0.0 | 0.0 | 0.0 | 0.0 | 0.0 |
| 166 | 1.3 | 1.5 | 1.5 | 0.0 | 0.0 | 0.0 | 0.0 | 0.0 |
| 171 | 1.3 | 1.4 | 1.5 | 0.0 | 0.0 | 0.0 | 0.0 | 0.0 |
| 176 | 1.3 | 1.4 | 1.5 | 0.0 | 0.0 | 0.0 | 0.0 | 0.0 |
| 181 | 1.3 | 1.4 | 1.2 | 0.0 | 0.0 | 0.0 | 0.0 | 0.0 |
| 186 | 1.3 | 1.4 | 0.8 | 0.0 | 0.0 | 0.0 | 0.0 | 0.0 |
| 191 | 1.3 | 1.4 | 0.3 | 0.0 | 0.0 | 0.0 | 0.0 | 0.0 |
| 196 | 1.3 | 1.4 | 0.0 | 0.0 | 0.0 | 0.0 | 0.0 | 0.0 |
| 201 | 1.3 | 1.4 | 0.0 | 0.0 | 0.0 | 0.0 | 0.0 | 0.0 |
| 206 | 1.3 | 1.4 | 0.0 | 0.0 | 0.0 | 0.0 | 0.0 | 0.0 |
| 211 | 1.3 | 1.4 | 0.0 | 0.0 | 0.0 | 0.0 | 0.0 | 0.0 |
| 216 | 1.3 | 1.4 | 0.0 | 0.0 | 0.0 | 0.0 | 0.0 | 0.0 |
| 221 | 1.3 | 1.4 | 0.0 | 0.0 | 0.0 | 0.0 | 0.0 | 0.0 |
| 226 | 1.3 | 1.4 | 0.0 | 0.0 | 0.0 | 0.0 | 0.0 | 0.0 |

TABLE 23

(s = 2, z = 2): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.2 | 0.3 | 0.3 | 0.3 | 0.3 | 0.2 | 0.2 |
| 21 | 0.5 | 0.8 | 0.9 | 0.9 | 0.9 | 0.9 | 0.8 | 0.8 |
| 26 | 0.8 | 1.1 | 1.2 | 1.2 | 1.2 | 1.2 | 1.2 | 1.2 |
| 31 | 1.1 | 1.4 | 1.5 | 1.5 | 1.5 | 1.4 | 1.4 | 1.4 |
| 36 | 1.2 | 1.5 | 1.6 | 1.6 | 1.6 | 1.6 | 1.6 | 1.6 |
| 41 | 1.4 | 1.7 | 1.7 | 1.7 | 1.7 | 1.7 | 1.7 | 1.7 |
| 46 | 1.5 | 1.7 | 1.8 | 1.8 | 1.8 | 1.8 | 1.8 | 1.8 |
| 51 | 1.5 | 1.8 | 1.9 | 1.9 | 1.9 | 1.9 | 1.8 | 1.8 |
| 56 | 1.6 | 1.9 | 2.0 | 2.0 | 1.9 | 1.9 | 1.9 | 1.9 |
| 61 | 1.7 | 1.9 | 2.0 | 2.0 | 2.0 | 2.0 | 1.9 | 1.9 |
| 66 | 1.7 | 2.0 | 2.0 | 2.0 | 2.0 | 2.0 | 2.0 | 1.9 |
| 71 | 1.7 | 2.0 | 2.1 | 2.1 | 2.0 | 2.0 | 2.0 | 2.0 |
| 76 | 1.8 | 2.0 | 2.1 | 2.1 | 2.1 | 2.0 | 2.0 | 0.0 |
| 81 | 1.8 | 2.0 | 2.1 | 2.1 | 2.1 | 2.0 | 2.0 | 0.0 |
| 86 | 1.8 | 2.0 | 2.1 | 2.1 | 2.1 | 2.1 | 0.0 | 0.0 |
| 91 | 1.8 | 2.1 | 2.1 | 2.1 | 2.1 | 2.1 | 0.0 | 0.0 |
| 96 | 1.8 | 2.1 | 2.1 | 2.1 | 2.1 | 1.4 | 0.0 | 0.0 |
| 101 | 1.8 | 2.1 | 2.1 | 2.1 | 2.1 | 0.0 | 0.0 | 0.0 |
| 106 | 1.8 | 2.1 | 2.2 | 2.1 | 2.1 | 0.0 | 0.0 | 0.0 |
| 111 | 1.9 | 2.1 | 2.2 | 2.2 | 2.1 | 0.0 | 0.0 | 0.0 |
| 116 | 1.9 | 2.1 | 2.2 | 2.2 | 0.9 | 0.0 | 0.0 | 0.0 |
| 121 | 1.9 | 2.1 | 2.2 | 2.2 | 0.0 | 0.0 | 0.0 | 0.0 |
| 126 | 1.9 | 2.1 | 2.2 | 2.2 | 0.0 | 0.0 | 0.0 | 0.0 |
| 131 | 1.9 | 2.1 | 2.2 | 2.2 | 0.0 | 0.0 | 0.0 | 0.0 |
| 136 | 1.9 | 2.1 | 2.2 | 2.1 | 0.0 | 0.0 | 0.0 | 0.0 |
| 141 | 1.9 | 2.1 | 2.2 | 1.3 | 0.0 | 0.0 | 0.0 | 0.0 |
| 146 | 1.9 | 2.1 | 2.2 | 0.6 | 0.0 | 0.0 | 0.0 | 0.0 |
| 151 | 1.9 | 2.1 | 2.2 | 0.0 | 0.0 | 0.0 | 0.0 | 0.0 |
| 156 | 1.9 | 2.1 | 2.2 | 0.0 | 0.0 | 0.0 | 0.0 | 0.0 |
| 161 | 1.9 | 2.1 | 2.2 | 0.0 | 0.0 | 0.0 | 0.0 | 0.0 |
| 166 | 1.9 | 2.1 | 2.2 | 0.0 | 0.0 | 0.0 | 0.0 | 0.0 |
| 171 | 1.9 | 2.1 | 2.2 | 0.0 | 0.0 | 0.0 | 0.0 | 0.0 |
| 176 | 1.9 | 2.1 | 2.0 | 0.0 | 0.0 | 0.0 | 0.0 | 0.0 |
| 181 | 1.9 | 2.1 | 1.5 | 0.0 | 0.0 | 0.0 | 0.0 | 0.0 |
| 186 | 1.9 | 2.1 | 1.1 | 0.0 | 0.0 | 0.0 | 0.0 | 0.0 |
| 191 | 1.9 | 2.1 | 0.6 | 0.0 | 0.0 | 0.0 | 0.0 | 0.0 |
| 196 | 1.9 | 2.1 | 0.2 | 0.0 | 0.0 | 0.0 | 0.0 | 0.0 |
| 201 | 1.9 | 2.1 | 0.0 | 0.0 | 0.0 | 0.0 | 0.0 | 0.0 |
| 206 | 1.9 | 2.1 | 0.0 | 0.0 | 0.0 | 0.0 | 0.0 | 0.0 |
| 211 | 1.9 | 2.1 | 0.0 | 0.0 | 0.0 | 0.0 | 0.0 | 0.0 |
| 216 | 1.9 | 2.1 | 0.0 | 0.0 | 0.0 | 0.0 | 0.0 | 0.0 |

TABLE 23-continued (s = 2, z = 2): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 221 | 1.9 | 2.1 | 0.0 | 0.0 | 0.0 | 0.0 | 0.0 | 0.0 |
| 226 | 1.9 | 2.1 | 0.0 | 0.0 | 0.0 | 0.0 | 0.0 | 0.0 |

TABLE 24

(s = 2, z = 3): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.2 | 0.5 | 0.5 | 0.5 | 0.5 | 0.5 | 0.4 | 0.4 |
| 26 | 0.7 | 1.0 | 1.0 | 1.0 | 1.0 | 1.0 | 1.0 | 1.0 |
| 31 | 1.0 | 1.3 | 1.4 | 1.4 | 1.4 | 1.4 | 1.3 | 1.3 |
| 36 | 1.2 | 1.6 | 1.6 | 1.6 | 1.6 | 1.6 | 1.6 | 1.6 |
| 41 | 1.4 | 1.7 | 1.8 | 1.8 | 1.8 | 1.8 | 1.8 | 1.7 |
| 46 | 1.6 | 1.9 | 2.0 | 2.0 | 1.9 | 1.9 | 1.9 | 1.9 |
| 51 | 1.7 | 2.0 | 2.1 | 2.1 | 2.0 | 2.0 | 2.0 | 2.0 |
| 56 | 1.8 | 2.1 | 2.2 | 2.2 | 2.1 | 2.1 | 2.1 | 2.1 |
| 61 | 1.9 | 2.2 | 2.2 | 2.2 | 2.2 | 2.2 | 2.1 | 2.1 |
| 66 | 1.9 | 2.2 | 2.3 | 2.3 | 2.3 | 2.2 | 2.2 | 2.2 |
| 71 | 2.0 | 2.3 | 2.3 | 2.3 | 2.3 | 2.3 | 2.2 | 2.1 |
| 76 | 2.0 | 2.3 | 2.4 | 2.4 | 2.3 | 2.3 | 2.3 | 0.0 |
| 81 | 2.0 | 2.3 | 2.4 | 2.4 | 2.4 | 2.3 | 1.9 | 0.0 |
| 86 | 2.1 | 2.4 | 2.4 | 2.4 | 2.4 | 2.4 | 0.0 | 0.0 |
| 91 | 2.1 | 2.4 | 2.4 | 2.4 | 2.4 | 2.4 | 0.0 | 0.0 |
| 96 | 2.1 | 2.4 | 2.5 | 2.5 | 2.4 | 1.1 | 0.0 | 0.0 |
| 101 | 2.1 | 2.4 | 2.5 | 2.5 | 2.4 | 0.0 | 0.0 | 0.0 |
| 106 | 2.2 | 2.4 | 2.5 | 2.5 | 2.5 | 0.0 | 0.0 | 0.0 |
| 111 | 2.2 | 2.4 | 2.5 | 2.5 | 1.9 | 0.0 | 0.0 | 0.0 |
| 116 | 2.2 | 2.5 | 2.5 | 2.5 | 0.7 | 0.0 | 0.0 | 0.0 |
| 121 | 2.2 | 2.5 | 2.5 | 2.5 | 0.0 | 0.0 | 0.0 | 0.0 |
| 126 | 2.2 | 2.5 | 2.5 | 2.5 | 0.0 | 0.0 | 0.0 | 0.0 |
| 131 | 2.2 | 2.5 | 2.5 | 2.5 | 0.0 | 0.0 | 0.0 | 0.0 |
| 136 | 2.2 | 2.5 | 2.5 | 1.9 | 0.0 | 0.0 | 0.0 | 0.0 |
| 141 | 2.2 | 2.5 | 2.5 | 1.1 | 0.0 | 0.0 | 0.0 | 0.0 |
| 146 | 2.2 | 2.5 | 2.6 | 0.4 | 0.0 | 0.0 | 0.0 | 0.0 |
| 151 | 2.2 | 2.5 | 2.6 | 0.0 | 0.0 | 0.0 | 0.0 | 0.0 |
| 156 | 2.2 | 2.5 | 2.6 | 0.0 | 0.0 | 0.0 | 0.0 | 0.0 |
| 161 | 2.2 | 2.5 | 2.6 | 0.0 | 0.0 | 0.0 | 0.0 | 0.0 |
| 166 | 2.2 | 2.5 | 2.6 | 0.0 | 0.0 | 0.0 | 0.0 | 0.0 |
| 171 | 2.3 | 2.5 | 2.3 | 0.0 | 0.0 | 0.0 | 0.0 | 0.0 |
| 176 | 2.3 | 2.5 | 1.8 | 0.0 | 0.0 | 0.0 | 0.0 | 0.0 |
| 181 | 2.3 | 2.5 | 1.4 | 0.0 | 0.0 | 0.0 | 0.0 | 0.0 |
| 186 | 2.3 | 2.5 | 0.9 | 0.0 | 0.0 | 0.0 | 0.0 | 0.0 |
| 191 | 2.3 | 2.5 | 0.5 | 0.0 | 0.0 | 0.0 | 0.0 | 0.0 |
| 196 | 2.3 | 2.5 | 0.1 | 0.0 | 0.0 | 0.0 | 0.0 | 0.0 |
| 201 | 2.3 | 2.5 | 0.0 | 0.0 | 0.0 | 0.0 | 0.0 | 0.0 |
| 206 | 2.3 | 2.5 | 0.0 | 0.0 | 0.0 | 0.0 | 0.0 | 0.0 |
| 211 | 2.3 | 2.5 | 0.0 | 0.0 | 0.0 | 0.0 | 0.0 | 0.0 |
| 216 | 2.3 | 2.5 | 0.0 | 0.0 | 0.0 | 0.0 | 0.0 | 0.0 |
| 221 | 2.3 | 2.5 | 0.0 | 0.0 | 0.0 | 0.0 | 0.0 | 0.0 |
| 226 | 2.3 | 2.5 | 0.0 | 0.0 | 0.0 | 0.0 | 0.0 | 0.0 |

TABLE 25

(s = 2, z = 4): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.3 | 0.6 | 0.7 | 0.7 | 0.7 | 0.6 | 0.6 | 0.6 |
| 31 | 0.8 | 1.1 | 1.2 | 1.2 | 1.1 | 1.1 | 1.1 | 1.0 |
| 36 | 1.1 | 1.4 | 1.5 | 1.5 | 1.5 | 1.4 | 1.4 | 1.4 |

TABLE 25-continued (s = 2, z = 4): Net Coding Gain Matrix (dB)

| $n_{eff}$\\$\gamma_{eff}$ | 15 | 20 | 25 | 30 | 35 | 40 | 45 | 50 |
|---|---|---|---|---|---|---|---|---|
| 41 | 1.3 | 1.7 | 1.7 | 1.7 | 1.7 | 1.7 | 1.7 | 1.6 |
| 46 | 1.5 | 1.9 | 1.9 | 1.9 | 1.9 | 1.9 | 1.8 | 1.8 |
| 51 | 1.7 | 2.0 | 2.1 | 2.1 | 2.0 | 2.0 | 2.0 | 2.0 |
| 56 | 1.8 | 2.1 | 2.2 | 2.2 | 2.2 | 2.1 | 2.1 | 2.1 |
| 61 | 1.9 | 2.2 | 2.3 | 2.3 | 2.3 | 2.2 | 2.2 | 2.2 |
| 66 | 2.0 | 2.3 | 2.4 | 2.4 | 2.3 | 2.3 | 2.3 | 2.3 |
| 71 | 2.1 | 2.4 | 2.4 | 2.4 | 2.4 | 2.4 | 2.3 | 1.7 |
| 76 | 2.1 | 2.4 | 2.5 | 2.5 | 2.5 | 2.4 | 2.4 | 0.0 |
| 81 | 2.2 | 2.5 | 2.5 | 2.5 | 2.5 | 2.5 | 1.6 | 0.0 |
| 86 | 2.2 | 2.5 | 2.6 | 2.6 | 2.5 | 2.5 | 0.0 | 0.0 |
| 91 | 2.2 | 2.5 | 2.6 | 2.6 | 2.6 | 2.5 | 0.0 | 0.0 |
| 96 | 2.3 | 2.6 | 2.6 | 2.6 | 2.6 | 0.9 | 0.0 | 0.0 |
| 101 | 2.3 | 2.6 | 2.7 | 2.7 | 2.6 | 0.0 | 0.0 | 0.0 |
| 106 | 2.3 | 2.6 | 2.7 | 2.7 | 2.6 | 0.0 | 0.0 | 0.0 |
| 111 | 2.4 | 2.6 | 2.7 | 2.7 | 1.7 | 0.0 | 0.0 | 0.0 |
| 116 | 2.4 | 2.7 | 2.7 | 2.7 | 0.5 | 0.0 | 0.0 | 0.0 |
| 121 | 2.4 | 2.7 | 2.7 | 2.7 | 0.0 | 0.0 | 0.0 | 0.0 |
| 126 | 2.4 | 2.7 | 2.8 | 2.7 | 0.0 | 0.0 | 0.0 | 0.0 |
| 131 | 2.4 | 2.7 | 2.8 | 2.6 | 0.0 | 0.0 | 0.0 | 0.0 |
| 136 | 2.4 | 2.7 | 2.8 | 1.7 | 0.0 | 0.0 | 0.0 | 0.0 |
| 141 | 2.4 | 2.7 | 2.8 | 1.0 | 0.0 | 0.0 | 0.0 | 0.0 |
| 146 | 2.4 | 2.7 | 2.8 | 0.2 | 0.0 | 0.0 | 0.0 | 0.0 |
| 151 | 2.5 | 2.7 | 2.8 | 0.0 | 0.0 | 0.0 | 0.0 | 0.0 |
| 156 | 2.5 | 2.7 | 2.8 | 0.0 | 0.0 | 0.0 | 0.0 | 0.0 |
| 161 | 2.5 | 2.7 | 2.8 | 0.0 | 0.0 | 0.0 | 0.0 | 0.0 |
| 166 | 2.5 | 2.7 | 2.7 | 0.0 | 0.0 | 0.0 | 0.0 | 0.0 |
| 171 | 2.5 | 2.8 | 2.2 | 0.0 | 0.0 | 0.0 | 0.0 | 0.0 |
| 176 | 2.5 | 2.8 | 1.7 | 0.0 | 0.0 | 0.0 | 0.0 | 0.0 |
| 181 | 2.5 | 2.8 | 1.2 | 0.0 | 0.0 | 0.0 | 0.0 | 0.0 |
| 186 | 2.5 | 2.8 | 0.8 | 0.0 | 0.0 | 0.0 | 0.0 | 0.0 |
| 191 | 2.5 | 2.8 | 0.4 | 0.0 | 0.0 | 0.0 | 0.0 | 0.0 |
| 196 | 2.5 | 2.8 | 0.0 | 0.0 | 0.0 | 0.0 | 0.0 | 0.0 |
| 201 | 2.5 | 2.8 | 0.0 | 0.0 | 0.0 | 0.0 | 0.0 | 0.0 |
| 206 | 2.5 | 2.8 | 0.0 | 0.0 | 0.0 | 0.0 | 0.0 | 0.0 |
| 211 | 2.5 | 2.8 | 0.0 | 0.0 | 0.0 | 0.0 | 0.0 | 0.0 |
| 216 | 2.5 | 2.8 | 0.0 | 0.0 | 0.0 | 0.0 | 0.0 | 0.0 |
| 221 | 2.5 | 2.8 | 0.0 | 0.0 | 0.0 | 0.0 | 0.0 | 0.0 |
| 226 | 2.5 | 2.7 | 0.0 | 0.0 | 0.0 | 0.0 | 0.0 | 0.0 |

TABLE 26

(s = 2, z = 5): Net Coding Gain Matrix (dB)

| $n_{eff}$\\$\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.2 | 0.2 | 0.2 | 0.2 | 0.1 | 0.1 | 0.1 |
| 31 | 0.4 | 0.8 | 0.8 | 0.8 | 0.8 | 0.7 | 0.7 | 0.7 |
| 36 | 0.9 | 1.2 | 1.3 | 1.2 | 1.2 | 1.2 | 1.1 | 1.1 |
| 41 | 1.2 | 1.5 | 1.6 | 1.6 | 1.5 | 1.5 | 1.5 | 1.4 |
| 46 | 1.4 | 1.7 | 1.8 | 1.8 | 1.8 | 1.7 | 1.7 | 1.7 |
| 51 | 1.6 | 1.9 | 2.0 | 2.0 | 2.0 | 1.9 | 1.9 | 1.9 |
| 56 | 1.7 | 2.1 | 2.2 | 2.1 | 2.1 | 2.1 | 2.0 | 2.0 |
| 61 | 1.9 | 2.2 | 2.3 | 2.3 | 2.2 | 2.2 | 2.2 | 2.1 |
| 66 | 2.0 | 2.3 | 2.4 | 2.4 | 2.3 | 2.3 | 2.3 | 2.2 |
| 71 | 2.1 | 2.4 | 2.5 | 2.4 | 2.4 | 2.4 | 2.3 | 1.4 |
| 76 | 2.1 | 2.5 | 2.5 | 2.5 | 2.5 | 2.4 | 2.4 | 0.0 |
| 81 | 2.2 | 2.5 | 2.6 | 2.6 | 2.5 | 2.5 | 1.3 | 0.0 |
| 86 | 2.3 | 2.6 | 2.6 | 2.6 | 2.6 | 2.6 | 0.0 | 0.0 |
| 91 | 2.3 | 2.6 | 2.7 | 2.7 | 2.6 | 2.3 | 0.0 | 0.0 |
| 96 | 2.4 | 2.7 | 2.7 | 2.7 | 2.7 | 0.6 | 0.0 | 0.0 |
| 101 | 2.4 | 2.7 | 2.8 | 2.7 | 2.7 | 0.0 | 0.0 | 0.0 |
| 106 | 2.4 | 2.7 | 2.8 | 2.8 | 2.7 | 0.0 | 0.0 | 0.0 |
| 111 | 2.5 | 2.8 | 2.8 | 2.8 | 1.5 | 0.0 | 0.0 | 0.0 |
| 116 | 2.5 | 2.8 | 2.8 | 2.8 | 0.3 | 0.0 | 0.0 | 0.0 |
| 121 | 2.5 | 2.8 | 2.9 | 2.8 | 0.0 | 0.0 | 0.0 | 0.0 |
| 126 | 2.5 | 2.8 | 2.9 | 2.9 | 0.0 | 0.0 | 0.0 | 0.0 |
| 131 | 2.5 | 2.8 | 2.9 | 2.4 | 0.0 | 0.0 | 0.0 | 0.0 |

TABLE 26-continued (s = 2, z = 5): Net Coding Gain Matrix (dB)

| $n_{eff}$\\$\gamma_{eff}$ | 15 | 20 | 25 | 30 | 35 | 40 | 45 | 50 |
|---|---|---|---|---|---|---|---|---|
| 136 | 2.6 | 2.8 | 2.9 | 1.6 | 0.0 | 0.0 | 0.0 | 0.0 |
| 141 | 2.6 | 2.9 | 2.9 | 0.8 | 0.0 | 0.0 | 0.0 | 0.0 |
| 146 | 2.6 | 2.9 | 2.9 | 0.1 | 0.0 | 0.0 | 0.0 | 0.0 |
| 151 | 2.6 | 2.9 | 2.9 | 0.0 | 0.0 | 0.0 | 0.0 | 0.0 |
| 156 | 2.6 | 2.9 | 2.9 | 0.0 | 0.0 | 0.0 | 0.0 | 0.0 |
| 161 | 2.6 | 2.9 | 3.0 | 0.0 | 0.0 | 0.0 | 0.0 | 0.0 |
| 166 | 2.6 | 2.9 | 2.6 | 0.0 | 0.0 | 0.0 | 0.0 | 0.0 |
| 171 | 2.6 | 2.9 | 2.1 | 0.0 | 0.0 | 0.0 | 0.0 | 0.0 |
| 176 | 2.6 | 2.9 | 1.6 | 0.0 | 0.0 | 0.0 | 0.0 | 0.0 |
| 181 | 2.6 | 2.9 | 1.1 | 0.0 | 0.0 | 0.0 | 0.0 | 0.0 |
| 186 | 2.6 | 2.9 | 0.7 | 0.0 | 0.0 | 0.0 | 0.0 | 0.0 |
| 191 | 2.6 | 2.9 | 0.3 | 0.0 | 0.0 | 0.0 | 0.0 | 0.0 |
| 196 | 2.7 | 2.9 | 0.0 | 0.0 | 0.0 | 0.0 | 0.0 | 0.0 |
| 201 | 2.7 | 2.9 | 0.0 | 0.0 | 0.0 | 0.0 | 0.0 | 0.0 |
| 206 | 2.7 | 2.9 | 0.0 | 0.0 | 0.0 | 0.0 | 0.0 | 0.0 |
| 211 | 2.7 | 2.9 | 0.0 | 0.0 | 0.0 | 0.0 | 0.0 | 0.0 |
| 216 | 2.7 | 2.9 | 0.0 | 0.0 | 0.0 | 0.0 | 0.0 | 0.0 |
| 221 | 2.7 | 2.9 | 0.0 | 0.0 | 0.0 | 0.0 | 0.0 | 0.0 |
| 226 | 2.7 | 2.6 | 0.0 | 0.0 | 0.0 | 0.0 | 0.0 | 0.0 |

TABLE 27

(s = 2, z = 6): Net Coding Gain Matrix (dB)

| $n_{eff}$\\$\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.1 | 0.4 | 0.4 | 0.4 | 0.4 | 0.3 | 0.3 | 0.2 |
| 36 | 0.6 | 0.9 | 0.9 | 0.9 | 0.9 | 0.8 | 0.8 | 0.8 |
| 41 | 0.9 | 1.3 | 1.3 | 1.3 | 1.3 | 1.2 | 1.2 | 1.2 |
| 46 | 1.2 | 1.5 | 1.6 | 1.6 | 1.6 | 1.5 | 1.5 | 1.5 |
| 51 | 1.4 | 1.8 | 1.8 | 1.8 | 1.8 | 1.8 | 1.7 | 1.7 |
| 56 | 1.6 | 2.0 | 2.0 | 2.0 | 2.0 | 1.9 | 1.9 | 1.9 |
| 61 | 1.8 | 2.1 | 2.2 | 2.2 | 2.1 | 2.1 | 2.1 | 2.0 |
| 66 | 1.9 | 2.2 | 2.3 | 2.3 | 2.3 | 2.2 | 2.2 | 2.2 |
| 71 | 2.0 | 2.3 | 2.4 | 2.4 | 2.4 | 2.3 | 2.3 | 1.1 |
| 76 | 2.1 | 2.4 | 2.5 | 2.5 | 2.4 | 2.4 | 2.4 | 0.0 |
| 81 | 2.2 | 2.5 | 2.6 | 2.6 | 2.5 | 2.5 | 1.0 | 0.0 |
| 86 | 2.3 | 2.6 | 2.6 | 2.6 | 2.6 | 2.6 | 0.0 | 0.0 |
| 91 | 2.3 | 2.6 | 2.7 | 2.7 | 2.6 | 2.0 | 0.0 | 0.0 |
| 96 | 2.4 | 2.7 | 2.8 | 2.7 | 2.7 | 0.4 | 0.0 | 0.0 |
| 101 | 2.4 | 2.7 | 2.8 | 2.8 | 2.7 | 0.0 | 0.0 | 0.0 |
| 106 | 2.5 | 2.8 | 2.8 | 2.8 | 2.5 | 0.0 | 0.0 | 0.0 |
| 111 | 2.5 | 2.8 | 2.9 | 2.8 | 1.2 | 0.0 | 0.0 | 0.0 |
| 116 | 2.5 | 2.8 | 2.9 | 2.9 | 0.1 | 0.0 | 0.0 | 0.0 |
| 121 | 2.6 | 2.9 | 2.9 | 2.9 | 0.0 | 0.0 | 0.0 | 0.0 |
| 126 | 2.6 | 2.9 | 2.9 | 2.9 | 0.0 | 0.0 | 0.0 | 0.0 |
| 131 | 2.6 | 2.9 | 3.0 | 2.2 | 0.0 | 0.0 | 0.0 | 0.0 |
| 136 | 2.6 | 2.9 | 3.0 | 1.4 | 0.0 | 0.0 | 0.0 | 0.0 |
| 141 | 2.6 | 2.9 | 3.0 | 0.6 | 0.0 | 0.0 | 0.0 | 0.0 |
| 146 | 2.7 | 3.0 | 3.0 | 0.0 | 0.0 | 0.0 | 0.0 | 0.0 |
| 151 | 2.7 | 3.0 | 3.0 | 0.0 | 0.0 | 0.0 | 0.0 | 0.0 |
| 156 | 2.7 | 3.0 | 3.0 | 0.0 | 0.0 | 0.0 | 0.0 | 0.0 |
| 161 | 2.7 | 3.0 | 3.0 | 0.0 | 0.0 | 0.0 | 0.0 | 0.0 |
| 166 | 2.7 | 3.0 | 2.4 | 0.0 | 0.0 | 0.0 | 0.0 | 0.0 |
| 171 | 2.7 | 3.0 | 1.9 | 0.0 | 0.0 | 0.0 | 0.0 | 0.0 |
| 176 | 2.7 | 3.0 | 1.4 | 0.0 | 0.0 | 0.0 | 0.0 | 0.0 |
| 181 | 2.7 | 3.0 | 1.0 | 0.0 | 0.0 | 0.0 | 0.0 | 0.0 |
| 186 | 2.7 | 3.0 | 0.5 | 0.0 | 0.0 | 0.0 | 0.0 | 0.0 |
| 191 | 2.8 | 3.0 | 0.1 | 0.0 | 0.0 | 0.0 | 0.0 | 0.0 |
| 196 | 2.8 | 3.0 | 0.0 | 0.0 | 0.0 | 0.0 | 0.0 | 0.0 |
| 201 | 2.8 | 3.1 | 0.0 | 0.0 | 0.0 | 0.0 | 0.0 | 0.0 |
| 206 | 2.8 | 3.1 | 0.0 | 0.0 | 0.0 | 0.0 | 0.0 | 0.0 |
| 211 | 2.8 | 3.1 | 0.0 | 0.0 | 0.0 | 0.0 | 0.0 | 0.0 |
| 216 | 2.8 | 3.1 | 0.0 | 0.0 | 0.0 | 0.0 | 0.0 | 0.0 |
| 221 | 2.8 | 2.8 | 0.0 | 0.0 | 0.0 | 0.0 | 0.0 | 0.0 |
| 226 | 2.8 | 2.5 | 0.0 | 0.0 | 0.0 | 0.0 | 0.0 | 0.0 |

TABLE 28

(s = 2, z = 7): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.2 | 0.5 | 0.6 | 0.6 | 0.5 | 0.5 | 0.4 | 0.4 |
| 41 | 0.6 | 1.0 | 1.0 | 1.0 | 1.0 | 0.9 | 0.9 | 0.8 |
| 46 | 1.0 | 1.3 | 1.4 | 1.4 | 1.3 | 1.3 | 1.2 | 1.2 |
| 51 | 1.2 | 1.6 | 1.7 | 1.6 | 1.6 | 1.5 | 1.5 | 1.5 |
| 56 | 1.5 | 1.8 | 1.9 | 1.8 | 1.8 | 1.8 | 1.7 | 1.7 |
| 61 | 1.7 | 2.0 | 2.1 | 2.0 | 2.0 | 1.9 | 1.9 | 1.9 |
| 66 | 1.8 | 2.1 | 2.2 | 2.2 | 2.1 | 2.1 | 2.1 | 2.0 |
| 71 | 1.9 | 2.3 | 2.3 | 2.3 | 2.3 | 2.2 | 2.2 | 0.7 |
| 76 | 2.0 | 2.4 | 2.4 | 2.4 | 2.3 | 2.3 | 2.3 | 0.0 |
| 81 | 2.1 | 2.5 | 2.5 | 2.5 | 2.5 | 2.4 | 0.7 | 0.0 |
| 86 | 2.2 | 2.5 | 2.6 | 2.6 | 2.5 | 2.5 | 0.0 | 0.0 |
| 91 | 2.3 | 2.6 | 2.7 | 2.7 | 2.6 | 1.8 | 0.0 | 0.0 |
| 96 | 2.4 | 2.7 | 2.7 | 2.7 | 2.7 | 0.1 | 0.0 | 0.0 |
| 101 | 2.4 | 2.7 | 2.8 | 2.8 | 2.7 | 0.0 | 0.0 | 0.0 |
| 106 | 2.5 | 2.8 | 2.8 | 2.8 | 2.3 | 0.0 | 0.0 | 0.0 |
| 111 | 2.5 | 2.8 | 2.9 | 2.9 | 1.0 | 0.0 | 0.0 | 0.0 |
| 116 | 2.5 | 2.9 | 2.9 | 2.9 | 0.0 | 0.0 | 0.0 | 0.0 |
| 121 | 2.6 | 2.9 | 2.9 | 2.9 | 0.0 | 0.0 | 0.0 | 0.0 |
| 126 | 2.6 | 2.9 | 3.0 | 2.9 | 0.0 | 0.0 | 0.0 | 0.0 |
| 131 | 2.6 | 2.9 | 3.0 | 2.0 | 0.0 | 0.0 | 0.0 | 0.0 |
| 136 | 2.7 | 3.0 | 3.0 | 1.2 | 0.0 | 0.0 | 0.0 | 0.0 |
| 141 | 2.7 | 3.0 | 3.0 | 0.5 | 0.0 | 0.0 | 0.0 | 0.0 |
| 146 | 2.7 | 3.0 | 3.1 | 0.0 | 0.0 | 0.0 | 0.0 | 0.0 |
| 151 | 2.7 | 3.0 | 3.1 | 0.0 | 0.0 | 0.0 | 0.0 | 0.0 |
| 156 | 2.7 | 3.0 | 3.1 | 0.0 | 0.0 | 0.0 | 0.0 | 0.0 |
| 161 | 2.8 | 3.1 | 2.8 | 0.0 | 0.0 | 0.0 | 0.0 | 0.0 |
| 166 | 2.8 | 3.1 | 2.3 | 0.0 | 0.0 | 0.0 | 0.0 | 0.0 |
| 171 | 2.8 | 3.1 | 1.8 | 0.0 | 0.0 | 0.0 | 0.0 | 0.0 |
| 176 | 2.8 | 3.1 | 1.3 | 0.0 | 0.0 | 0.0 | 0.0 | 0.0 |
| 181 | 2.8 | 3.1 | 0.8 | 0.0 | 0.0 | 0.0 | 0.0 | 0.0 |
| 186 | 2.8 | 3.1 | 0.4 | 0.0 | 0.0 | 0.0 | 0.0 | 0.0 |
| 191 | 2.8 | 3.1 | 0.0 | 0.0 | 0.0 | 0.0 | 0.0 | 0.0 |
| 196 | 2.8 | 3.1 | 0.0 | 0.0 | 0.0 | 0.0 | 0.0 | 0.0 |
| 201 | 2.8 | 3.1 | 0.0 | 0.0 | 0.0 | 0.0 | 0.0 | 0.0 |
| 206 | 2.8 | 3.1 | 0.0 | 0.0 | 0.0 | 0.0 | 0.0 | 0.0 |
| 211 | 2.9 | 3.1 | 0.0 | 0.0 | 0.0 | 0.0 | 0.0 | 0.0 |
| 216 | 2.9 | 3.0 | 0.0 | 0.0 | 0.0 | 0.0 | 0.0 | 0.0 |
| 221 | 2.9 | 2.7 | 0.0 | 0.0 | 0.0 | 0.0 | 0.0 | 0.0 |
| 226 | 2.9 | 2.4 | 0.0 | 0.0 | 0.0 | 0.0 | 0.0 | 0.0 |

TABLE 29

(s = 2, z = 8): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.0 | 0.0 | 0.0 | 0.0 | 0.0 | 0.0 | 0.0 | 0.0 |
| 26 | 0.0 | 0.0 | 0.0 | 0.0 | 0.0 | 0.0 | 0.0 | 0.0 |
| 31 | 0.0 | 0.0 | 0.0 | 0.0 | 0.0 | 0.0 | 0.0 | 0.0 |
| 36 | 0.0 | 0.1 | 0.2 | 0.2 | 0.1 | 0.0 | 0.0 | 0.0 |
| 41 | 0.3 | 0.6 | 0.7 | 0.7 | 0.6 | 0.6 | 0.5 | 0.5 |
| 46 | 0.7 | 1.0 | 1.1 | 1.1 | 1.0 | 1.0 | 0.9 | 0.9 |
| 51 | 1.0 | 1.4 | 1.4 | 1.4 | 1.3 | 1.3 | 1.3 | 1.2 |
| 56 | 1.3 | 1.6 | 1.7 | 1.7 | 1.6 | 1.6 | 1.5 | 1.5 |
| 61 | 1.5 | 1.8 | 1.9 | 1.9 | 1.8 | 1.8 | 1.7 | 1.7 |
| 66 | 1.7 | 2.0 | 2.1 | 2.0 | 2.0 | 1.9 | 1.9 | 1.9 |
| 71 | 1.8 | 2.1 | 2.2 | 2.2 | 2.1 | 2.1 | 2.1 | 0.4 |
| 76 | 1.9 | 2.3 | 2.3 | 2.3 | 2.3 | 2.2 | 2.2 | 0.0 |
| 81 | 2.1 | 2.4 | 2.4 | 2.4 | 2.4 | 2.3 | 0.4 | 0.0 |
| 86 | 2.1 | 2.5 | 2.5 | 2.5 | 2.5 | 2.4 | 0.0 | 0.0 |
| 91 | 2.2 | 2.6 | 2.6 | 2.6 | 2.6 | 1.5 | 0.0 | 0.0 |
| 96 | 2.3 | 2.6 | 2.7 | 2.7 | 2.6 | 0.0 | 0.0 | 0.0 |
| 101 | 2.4 | 2.7 | 2.8 | 2.7 | 2.7 | 0.0 | 0.0 | 0.0 |
| 106 | 2.4 | 2.7 | 2.8 | 2.8 | 2.0 | 0.0 | 0.0 | 0.0 |
| 111 | 2.5 | 2.8 | 2.9 | 2.8 | 0.8 | 0.0 | 0.0 | 0.0 |
| 116 | 2.5 | 2.8 | 2.9 | 2.9 | 0.0 | 0.0 | 0.0 | 0.0 |
| 121 | 2.6 | 2.9 | 2.9 | 2.9 | 0.0 | 0.0 | 0.0 | 0.0 |
| 126 | 2.6 | 2.9 | 3.0 | 2.7 | 0.0 | 0.0 | 0.0 | 0.0 |
| 131 | 2.6 | 3.0 | 3.0 | 1.8 | 0.0 | 0.0 | 0.0 | 0.0 |
| 136 | 2.7 | 3.0 | 3.0 | 1.0 | 0.0 | 0.0 | 0.0 | 0.0 |
| 141 | 2.7 | 3.0 | 3.1 | 0.3 | 0.0 | 0.0 | 0.0 | 0.0 |
| 146 | 2.7 | 3.0 | 3.1 | 0.0 | 0.0 | 0.0 | 0.0 | 0.0 |
| 151 | 2.7 | 3.1 | 3.1 | 0.0 | 0.0 | 0.0 | 0.0 | 0.0 |
| 156 | 2.8 | 3.1 | 3.1 | 0.0 | 0.0 | 0.0 | 0.0 | 0.0 |
| 161 | 2.8 | 3.1 | 2.7 | 0.0 | 0.0 | 0.0 | 0.0 | 0.0 |
| 166 | 2.8 | 3.1 | 2.1 | 0.0 | 0.0 | 0.0 | 0.0 | 0.0 |
| 171 | 2.8 | 3.1 | 1.6 | 0.0 | 0.0 | 0.0 | 0.0 | 0.0 |
| 176 | 2.8 | 3.1 | 1.2 | 0.0 | 0.0 | 0.0 | 0.0 | 0.0 |
| 181 | 2.8 | 3.1 | 0.7 | 0.0 | 0.0 | 0.0 | 0.0 | 0.0 |
| 186 | 2.9 | 3.2 | 0.3 | 0.0 | 0.0 | 0.0 | 0.0 | 0.0 |
| 191 | 2.9 | 3.2 | 0.0 | 0.0 | 0.0 | 0.0 | 0.0 | 0.0 |
| 196 | 2.9 | 3.2 | 0.0 | 0.0 | 0.0 | 0.0 | 0.0 | 0.0 |
| 201 | 2.9 | 3.2 | 0.0 | 0.0 | 0.0 | 0.0 | 0.0 | 0.0 |
| 206 | 2.9 | 3.2 | 0.0 | 0.0 | 0.0 | 0.0 | 0.0 | 0.0 |
| 211 | 2.9 | 3.2 | 0.0 | 0.0 | 0.0 | 0.0 | 0.0 | 0.0 |
| 216 | 2.9 | 2.9 | 0.0 | 0.0 | 0.0 | 0.0 | 0.0 | 0.0 |
| 221 | 2.9 | 2.6 | 0.0 | 0.0 | 0.0 | 0.0 | 0.0 | 0.0 |
| 226 | 2.9 | 2.3 | 0.0 | 0.0 | 0.0 | 0.0 | 0.0 | 0.0 |

TABLE 30

(s = 4, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.5 | 0.8 | 0.9 | 0.9 | 0.9 | 0.9 | 0.9 | 0.9 |
| 16 | 1.0 | 1.3 | 1.4 | 1.4 | 1.4 | 1.4 | 1.4 | 1.4 |
| 21 | 1.3 | 1.6 | 1.7 | 1.7 | 1.7 | 1.7 | 1.7 | 1.7 |
| 26 | 1.5 | 1.8 | 1.9 | 1.9 | 1.9 | 1.8 | 1.8 | 1.8 |
| 31 | 1.6 | 1.9 | 2.0 | 2.0 | 2.0 | 1.9 | 1.9 | 1.9 |
| 36 | 1.7 | 1.9 | 2.0 | 2.0 | 2.0 | 2.0 | 2.0 | 1.8 |
| 41 | 1.7 | 2.0 | 2.1 | 2.1 | 2.1 | 2.0 | 1.7 | 0.0 |
| 46 | 1.8 | 2.0 | 2.1 | 2.1 | 2.1 | 2.1 | 0.0 | 0.0 |
| 51 | 1.8 | 2.0 | 2.1 | 2.1 | 2.1 | 0.0 | 0.0 | 0.0 |
| 56 | 1.8 | 2.1 | 2.1 | 2.1 | 1.8 | 0.0 | 0.0 | 0.0 |
| 61 | 1.8 | 2.1 | 2.1 | 2.1 | 0.0 | 0.0 | 0.0 | 0.0 |
| 66 | 1.8 | 2.1 | 2.1 | 2.1 | 0.0 | 0.0 | 0.0 | 0.0 |
| 71 | 1.8 | 2.1 | 2.2 | 1.1 | 0.0 | 0.0 | 0.0 | 0.0 |
| 76 | 1.9 | 2.1 | 2.2 | 0.0 | 0.0 | 0.0 | 0.0 | 0.0 |
| 81 | 1.9 | 2.1 | 2.2 | 0.0 | 0.0 | 0.0 | 0.0 | 0.0 |
| 86 | 1.9 | 2.1 | 2.2 | 0.0 | 0.0 | 0.0 | 0.0 | 0.0 |
| 91 | 1.9 | 2.1 | 1.4 | 0.0 | 0.0 | 0.0 | 0.0 | 0.0 |
| 96 | 1.9 | 2.1 | 0.5 | 0.0 | 0.0 | 0.0 | 0.0 | 0.0 |
| 101 | 1.9 | 2.1 | 0.0 | 0.0 | 0.0 | 0.0 | 0.0 | 0.0 |
| 106 | 1.9 | 2.1 | 0.0 | 0.0 | 0.0 | 0.0 | 0.0 | 0.0 |
| 111 | 1.9 | 2.1 | 0.0 | 0.0 | 0.0 | 0.0 | 0.0 | 0.0 |
| 116 | 1.9 | 2.1 | 0.0 | 0.0 | 0.0 | 0.0 | 0.0 | 0.0 |
| 121 | 1.9 | 2.0 | 0.0 | 0.0 | 0.0 | 0.0 | 0.0 | 0.0 |
| 126 | 1.9 | 1.5 | 0.0 | 0.0 | 0.0 | 0.0 | 0.0 | 0.0 |
| 131 | 1.9 | 1.1 | 0.0 | 0.0 | 0.0 | 0.0 | 0.0 | 0.0 |
| 136 | 1.9 | 0.6 | 0.0 | 0.0 | 0.0 | 0.0 | 0.0 | 0.0 |
| 141 | 1.9 | 0.3 | 0.0 | 0.0 | 0.0 | 0.0 | 0.0 | 0.0 |
| 146 | 1.9 | 0.0 | 0.0 | 0.0 | 0.0 | 0.0 | 0.0 | 0.0 |
| 151 | 1.9 | 0.0 | 0.0 | 0.0 | 0.0 | 0.0 | 0.0 | 0.0 |
| 156 | 1.8 | 0.0 | 0.0 | 0.0 | 0.0 | 0.0 | 0.0 | 0.0 |
| 161 | 1.8 | 0.0 | 0.0 | 0.0 | 0.0 | 0.0 | 0.0 | 0.0 |
| 166 | 1.8 | 0.0 | 0.0 | 0.0 | 0.0 | 0.0 | 0.0 | 0.0 |
| 171 | 1.8 | 0.0 | 0.0 | 0.0 | 0.0 | 0.0 | 0.0 | 0.0 |
| 176 | 1.8 | 0.0 | 0.0 | 0.0 | 0.0 | 0.0 | 0.0 | 0.0 |
| 181 | 1.8 | 0.0 | 0.0 | 0.0 | 0.0 | 0.0 | 0.0 | 0.0 |
| 186 | 1.8 | 0.0 | 0.0 | 0.0 | 0.0 | 0.0 | 0.0 | 0.0 |

TABLE 30-continued (s = 4, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 191 | 1.7 | 0.0 | 0.0 | 0.0 | 0.0 | 0.0 | 0.0 | 0.0 |
| 196 | 1.5 | 0.0 | 0.0 | 0.0 | 0.0 | 0.0 | 0.0 | 0.0 |
| 201 | 1.3 | 0.0 | 0.0 | 0.0 | 0.0 | 0.0 | 0.0 | 0.0 |
| 206 | 1.1 | 0.0 | 0.0 | 0.0 | 0.0 | 0.0 | 0.0 | 0.0 |
| 211 | 0.9 | 0.0 | 0.0 | 0.0 | 0.0 | 0.0 | 0.0 | 0.0 |
| 216 | 0.8 | 0.0 | 0.0 | 0.0 | 0.0 | 0.0 | 0.0 | 0.0 |
| 221 | 0.6 | 0.0 | 0.0 | 0.0 | 0.0 | 0.0 | 0.0 | 0.0 |
| 226 | 0.4 | 0.0 | 0.0 | 0.0 | 0.0 | 0.0 | 0.0 | 0.0 |

TABLE 31

(s = 4, z = 2): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.1 | 0.2 | 0.1 | 0.1 | 0.1 | 0.0 | 0.0 |
| 16 | 0.7 | 1.1 | 1.2 | 1.2 | 1.2 | 1.1 | 1.1 | 1.1 |
| 21 | 1.3 | 1.6 | 1.7 | 1.7 | 1.7 | 1.7 | 1.7 | 1.6 |
| 26 | 1.6 | 2.0 | 2.1 | 2.1 | 2.0 | 2.0 | 2.0 | 2.0 |
| 31 | 1.8 | 2.2 | 2.3 | 2.3 | 2.2 | 2.2 | 2.2 | 2.2 |
| 36 | 2.0 | 2.3 | 2.4 | 2.4 | 2.4 | 2.4 | 2.3 | 1.1 |
| 41 | 2.1 | 2.4 | 2.5 | 2.5 | 2.5 | 2.5 | 1.1 | 0.0 |
| 46 | 2.2 | 2.5 | 2.6 | 2.6 | 2.6 | 2.2 | 0.0 | 0.0 |
| 51 | 2.2 | 2.6 | 2.6 | 2.6 | 2.6 | 0.0 | 0.0 | 0.0 |
| 56 | 2.3 | 2.6 | 2.7 | 2.7 | 1.4 | 0.0 | 0.0 | 0.0 |
| 61 | 2.3 | 2.6 | 2.7 | 2.7 | 0.0 | 0.0 | 0.0 | 0.0 |
| 66 | 2.4 | 2.7 | 2.7 | 2.4 | 0.0 | 0.0 | 0.0 | 0.0 |
| 71 | 2.4 | 2.7 | 2.8 | 0.8 | 0.0 | 0.0 | 0.0 | 0.0 |
| 76 | 2.4 | 2.7 | 2.8 | 0.0 | 0.0 | 0.0 | 0.0 | 0.0 |
| 81 | 2.4 | 2.7 | 2.8 | 0.0 | 0.0 | 0.0 | 0.0 | 0.0 |
| 86 | 2.4 | 2.7 | 2.1 | 0.0 | 0.0 | 0.0 | 0.0 | 0.0 |
| 91 | 2.4 | 2.7 | 1.1 | 0.0 | 0.0 | 0.0 | 0.0 | 0.0 |
| 96 | 2.5 | 2.7 | 0.3 | 0.0 | 0.0 | 0.0 | 0.0 | 0.0 |
| 101 | 2.5 | 2.7 | 0.0 | 0.0 | 0.0 | 0.0 | 0.0 | 0.0 |
| 106 | 2.5 | 2.7 | 0.0 | 0.0 | 0.0 | 0.0 | 0.0 | 0.0 |
| 111 | 2.5 | 2.7 | 0.0 | 0.0 | 0.0 | 0.0 | 0.0 | 0.0 |
| 116 | 2.5 | 2.3 | 0.0 | 0.0 | 0.0 | 0.0 | 0.0 | 0.0 |
| 121 | 2.5 | 1.8 | 0.0 | 0.0 | 0.0 | 0.0 | 0.0 | 0.0 |
| 126 | 2.5 | 1.3 | 0.0 | 0.0 | 0.0 | 0.0 | 0.0 | 0.0 |
| 131 | 2.5 | 0.9 | 0.0 | 0.0 | 0.0 | 0.0 | 0.0 | 0.0 |
| 136 | 2.5 | 0.5 | 0.0 | 0.0 | 0.0 | 0.0 | 0.0 | 0.0 |
| 141 | 2.5 | 0.1 | 0.0 | 0.0 | 0.0 | 0.0 | 0.0 | 0.0 |
| 146 | 2.5 | 0.0 | 0.0 | 0.0 | 0.0 | 0.0 | 0.0 | 0.0 |
| 151 | 2.5 | 0.0 | 0.0 | 0.0 | 0.0 | 0.0 | 0.0 | 0.0 |
| 156 | 2.5 | 0.0 | 0.0 | 0.0 | 0.0 | 0.0 | 0.0 | 0.0 |
| 161 | 2.5 | 0.0 | 0.0 | 0.0 | 0.0 | 0.0 | 0.0 | 0.0 |
| 166 | 2.5 | 0.0 | 0.0 | 0.0 | 0.0 | 0.0 | 0.0 | 0.0 |
| 171 | 2.4 | 0.0 | 0.0 | 0.0 | 0.0 | 0.0 | 0.0 | 0.0 |
| 176 | 2.2 | 0.0 | 0.0 | 0.0 | 0.0 | 0.0 | 0.0 | 0.0 |
| 181 | 2.0 | 0.0 | 0.0 | 0.0 | 0.0 | 0.0 | 0.0 | 0.0 |
| 186 | 1.7 | 0.0 | 0.0 | 0.0 | 0.0 | 0.0 | 0.0 | 0.0 |
| 191 | 1.5 | 0.0 | 0.0 | 0.0 | 0.0 | 0.0 | 0.0 | 0.0 |
| 196 | 1.3 | 0.0 | 0.0 | 0.0 | 0.0 | 0.0 | 0.0 | 0.0 |
| 201 | 1.2 | 0.0 | 0.0 | 0.0 | 0.0 | 0.0 | 0.0 | 0.0 |
| 206 | 1.0 | 0.0 | 0.0 | 0.0 | 0.0 | 0.0 | 0.0 | 0.0 |
| 211 | 0.8 | 0.0 | 0.0 | 0.0 | 0.0 | 0.0 | 0.0 | 0.0 |
| 216 | 0.6 | 0.0 | 0.0 | 0.0 | 0.0 | 0.0 | 0.0 | 0.0 |
| 221 | 0.5 | 0.0 | 0.0 | 0.0 | 0.0 | 0.0 | 0.0 | 0.0 |
| 226 | 0.3 | 0.0 | 0.0 | 0.0 | 0.0 | 0.0 | 0.0 | 0.0 |

TABLE 32

(s = 4, z = 3): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.2 | 0.4 | 0.5 | 0.5 | 0.5 | 0.4 | 0.4 | 0.4 |
| 21 | 0.9 | 1.2 | 1.3 | 1.3 | 1.3 | 1.3 | 1.2 | 1.2 |
| 26 | 1.4 | 1.7 | 1.8 | 1.8 | 1.8 | 1.8 | 1.7 | 1.7 |
| 31 | 1.7 | 2.1 | 2.2 | 2.2 | 2.1 | 2.1 | 2.1 | 2.0 |
| 36 | 2.0 | 2.3 | 2.4 | 2.4 | 2.4 | 2.3 | 2.3 | 0.5 |
| 41 | 2.1 | 2.5 | 2.6 | 2.5 | 2.5 | 2.5 | 0.5 | 0.0 |
| 46 | 2.3 | 2.6 | 2.7 | 2.7 | 2.6 | 1.7 | 0.0 | 0.0 |
| 51 | 2.4 | 2.7 | 2.8 | 2.8 | 2.7 | 0.0 | 0.0 | 0.0 |
| 56 | 2.4 | 2.8 | 2.8 | 2.8 | 1.0 | 0.0 | 0.0 | 0.0 |
| 61 | 2.5 | 2.8 | 2.9 | 2.9 | 0.0 | 0.0 | 0.0 | 0.0 |
| 66 | 2.6 | 2.9 | 2.9 | 2.0 | 0.0 | 0.0 | 0.0 | 0.0 |
| 71 | 2.6 | 2.9 | 3.0 | 0.5 | 0.0 | 0.0 | 0.0 | 0.0 |
| 76 | 2.6 | 2.9 | 3.0 | 0.0 | 0.0 | 0.0 | 0.0 | 0.0 |
| 81 | 2.7 | 3.0 | 2.8 | 0.0 | 0.0 | 0.0 | 0.0 | 0.0 |
| 86 | 2.7 | 3.0 | 1.8 | 0.0 | 0.0 | 0.0 | 0.0 | 0.0 |
| 91 | 2.7 | 3.0 | 0.9 | 0.0 | 0.0 | 0.0 | 0.0 | 0.0 |
| 96 | 2.7 | 3.0 | 0.0 | 0.0 | 0.0 | 0.0 | 0.0 | 0.0 |
| 101 | 2.7 | 3.0 | 0.0 | 0.0 | 0.0 | 0.0 | 0.0 | 0.0 |
| 106 | 2.7 | 3.0 | 0.0 | 0.0 | 0.0 | 0.0 | 0.0 | 0.0 |
| 111 | 2.7 | 2.7 | 0.0 | 0.0 | 0.0 | 0.0 | 0.0 | 0.0 |
| 116 | 2.8 | 2.1 | 0.0 | 0.0 | 0.0 | 0.0 | 0.0 | 0.0 |
| 121 | 2.8 | 1.6 | 0.0 | 0.0 | 0.0 | 0.0 | 0.0 | 0.0 |
| 126 | 2.8 | 1.1 | 0.0 | 0.0 | 0.0 | 0.0 | 0.0 | 0.0 |
| 131 | 2.8 | 0.7 | 0.0 | 0.0 | 0.0 | 0.0 | 0.0 | 0.0 |
| 136 | 2.8 | 0.3 | 0.0 | 0.0 | 0.0 | 0.0 | 0.0 | 0.0 |
| 141 | 2.8 | 0.0 | 0.0 | 0.0 | 0.0 | 0.0 | 0.0 | 0.0 |
| 146 | 2.8 | 0.0 | 0.0 | 0.0 | 0.0 | 0.0 | 0.0 | 0.0 |
| 151 | 2.8 | 0.0 | 0.0 | 0.0 | 0.0 | 0.0 | 0.0 | 0.0 |
| 156 | 2.8 | 0.0 | 0.0 | 0.0 | 0.0 | 0.0 | 0.0 | 0.0 |
| 161 | 2.8 | 0.0 | 0.0 | 0.0 | 0.0 | 0.0 | 0.0 | 0.0 |
| 166 | 2.5 | 0.0 | 0.0 | 0.0 | 0.0 | 0.0 | 0.0 | 0.0 |
| 171 | 2.3 | 0.0 | 0.0 | 0.0 | 0.0 | 0.0 | 0.0 | 0.0 |
| 176 | 2.1 | 0.0 | 0.0 | 0.0 | 0.0 | 0.0 | 0.0 | 0.0 |
| 181 | 1.8 | 0.0 | 0.0 | 0.0 | 0.0 | 0.0 | 0.0 | 0.0 |
| 186 | 1.6 | 0.0 | 0.0 | 0.0 | 0.0 | 0.0 | 0.0 | 0.0 |
| 191 | 1.4 | 0.0 | 0.0 | 0.0 | 0.0 | 0.0 | 0.0 | 0.0 |
| 196 | 1.2 | 0.0 | 0.0 | 0.0 | 0.0 | 0.0 | 0.0 | 0.0 |
| 201 | 1.0 | 0.0 | 0.0 | 0.0 | 0.0 | 0.0 | 0.0 | 0.0 |
| 206 | 0.9 | 0.0 | 0.0 | 0.0 | 0.0 | 0.0 | 0.0 | 0.0 |
| 211 | 0.7 | 0.0 | 0.0 | 0.0 | 0.0 | 0.0 | 0.0 | 0.0 |
| 216 | 0.5 | 0.0 | 0.0 | 0.0 | 0.0 | 0.0 | 0.0 | 0.0 |
| 221 | 0.4 | 0.0 | 0.0 | 0.0 | 0.0 | 0.0 | 0.0 | 0.0 |
| 226 | 0.2 | 0.0 | 0.0 | 0.0 | 0.0 | 0.0 | 0.0 | 0.0 |

TABLE 33

(s = 4, z = 4): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 |
| 21 | 0.4 | 0.7 | 0.8 | 0.7 | 0.7 | 0.7 | 0.6 | 0.6 |
| 26 | 1.0 | 1.4 | 1.4 | 1.4 | 1.4 | 1.3 | 1.3 | 1.3 |
| 31 | 1.4 | 1.8 | 1.9 | 1.9 | 1.8 | 1.8 | 1.8 | 1.7 |
| 36 | 1.8 | 2.1 | 2.2 | 2.2 | 2.1 | 2.1 | 2.1 | 0.0 |
| 41 | 2.0 | 2.3 | 2.4 | 2.4 | 2.4 | 2.3 | 0.0 | 0.0 |
| 46 | 2.2 | 2.5 | 2.6 | 2.6 | 2.5 | 1.1 | 0.0 | 0.0 |
| 51 | 2.3 | 2.7 | 2.7 | 2.7 | 2.7 | 0.0 | 0.0 | 0.0 |
| 56 | 2.4 | 2.8 | 2.8 | 2.8 | 0.6 | 0.0 | 0.0 | 0.0 |
| 61 | 2.5 | 2.8 | 2.9 | 2.9 | 0.0 | 0.0 | 0.0 | 0.0 |
| 66 | 2.6 | 2.9 | 3.0 | 1.7 | 0.0 | 0.0 | 0.0 | 0.0 |
| 71 | 2.6 | 3.0 | 3.0 | 0.1 | 0.0 | 0.0 | 0.0 | 0.0 |
| 76 | 2.7 | 3.0 | 3.1 | 0.0 | 0.0 | 0.0 | 0.0 | 0.0 |
| 81 | 2.7 | 3.1 | 2.5 | 0.0 | 0.0 | 0.0 | 0.0 | 0.0 |
| 86 | 2.8 | 3.1 | 1.5 | 0.0 | 0.0 | 0.0 | 0.0 | 0.0 |
| 91 | 2.8 | 3.1 | 0.6 | 0.0 | 0.0 | 0.0 | 0.0 | 0.0 |
| 96 | 2.8 | 3.1 | 0.0 | 0.0 | 0.0 | 0.0 | 0.0 | 0.0 |
| 101 | 2.9 | 3.2 | 0.0 | 0.0 | 0.0 | 0.0 | 0.0 | 0.0 |

TABLE 33-continued (s = 4, z = 4): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 106 | 2.9 | 3.1 | 0.0 | 0.0 | 0.0 | 0.0 | 0.0 | 0.0 |
| 111 | 2.9 | 2.5 | 0.0 | 0.0 | 0.0 | 0.0 | 0.0 | 0.0 |
| 116 | 2.9 | 1.9 | 0.0 | 0.0 | 0.0 | 0.0 | 0.0 | 0.0 |
| 121 | 2.9 | 1.4 | 0.0 | 0.0 | 0.0 | 0.0 | 0.0 | 0.0 |
| 126 | 2.9 | 1.0 | 0.0 | 0.0 | 0.0 | 0.0 | 0.0 | 0.0 |
| 131 | 2.9 | 0.5 | 0.0 | 0.0 | 0.0 | 0.0 | 0.0 | 0.0 |
| 136 | 2.9 | 0.1 | 0.0 | 0.0 | 0.0 | 0.0 | 0.0 | 0.0 |
| 141 | 2.9 | 0.0 | 0.0 | 0.0 | 0.0 | 0.0 | 0.0 | 0.0 |
| 146 | 2.9 | 0.0 | 0.0 | 0.0 | 0.0 | 0.0 | 0.0 | 0.0 |
| 151 | 3.0 | 0.0 | 0.0 | 0.0 | 0.0 | 0.0 | 0.0 | 0.0 |
| 156 | 3.0 | 0.0 | 0.0 | 0.0 | 0.0 | 0.0 | 0.0 | 0.0 |
| 161 | 2.7 | 0.0 | 0.0 | 0.0 | 0.0 | 0.0 | 0.0 | 0.0 |
| 166 | 2.4 | 0.0 | 0.0 | 0.0 | 0.0 | 0.0 | 0.0 | 0.0 |
| 171 | 2.2 | 0.0 | 0.0 | 0.0 | 0.0 | 0.0 | 0.0 | 0.0 |
| 176 | 1.9 | 0.0 | 0.0 | 0.0 | 0.0 | 0.0 | 0.0 | 0.0 |
| 181 | 1.7 | 0.0 | 0.0 | 0.0 | 0.0 | 0.0 | 0.0 | 0.0 |
| 186 | 1.5 | 0.0 | 0.0 | 0.0 | 0.0 | 0.0 | 0.0 | 0.0 |
| 191 | 1.3 | 0.0 | 0.0 | 0.0 | 0.0 | 0.0 | 0.0 | 0.0 |
| 196 | 1.1 | 0.0 | 0.0 | 0.0 | 0.0 | 0.0 | 0.0 | 0.0 |
| 201 | 0.9 | 0.0 | 0.0 | 0.0 | 0.0 | 0.0 | 0.0 | 0.0 |
| 206 | 0.7 | 0.0 | 0.0 | 0.0 | 0.0 | 0.0 | 0.0 | 0.0 |
| 211 | 0.6 | 0.0 | 0.0 | 0.0 | 0.0 | 0.0 | 0.0 | 0.0 |
| 216 | 0.4 | 0.0 | 0.0 | 0.0 | 0.0 | 0.0 | 0.0 | 0.0 |
| 221 | 0.3 | 0.0 | 0.0 | 0.0 | 0.0 | 0.0 | 0.0 | 0.0 |
| 226 | 0.1 | 0.0 | 0.0 | 0.0 | 0.0 | 0.0 | 0.0 | 0.0 |

TABLE 34

(s = 8, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.3 | 0.4 | 0.4 | 0.4 | 0.3 | 0.3 | 0.3 |
| 11 | 1.1 | 1.5 | 1.7 | 1.7 | 1.7 | 1.7 | 1.7 | 1.7 |
| 16 | 1.7 | 2.1 | 2.2 | 2.2 | 2.2 | 2.2 | 2.2 | 2.2 |
| 21 | 2.0 | 2.3 | 2.4 | 2.5 | 2.4 | 2.4 | 0.3 | 0.0 |
| 26 | 2.1 | 2.5 | 2.6 | 2.6 | 2.6 | 0.0 | 0.0 | 0.0 |
| 31 | 2.2 | 2.6 | 2.7 | 2.7 | 0.0 | 0.0 | 0.0 | 0.0 |
| 36 | 2.3 | 2.6 | 2.7 | 0.5 | 0.0 | 0.0 | 0.0 | 0.0 |
| 41 | 2.3 | 2.7 | 2.7 | 0.0 | 0.0 | 0.0 | 0.0 | 0.0 |
| 46 | 2.4 | 2.7 | 0.9 | 0.0 | 0.0 | 0.0 | 0.0 | 0.0 |
| 51 | 2.4 | 2.7 | 0.0 | 0.0 | 0.0 | 0.0 | 0.0 | 0.0 |
| 56 | 2.4 | 2.7 | 0.0 | 0.0 | 0.0 | 0.0 | 0.0 | 0.0 |
| 61 | 2.4 | 1.7 | 0.0 | 0.0 | 0.0 | 0.0 | 0.0 | 0.0 |
| 66 | 2.4 | 0.8 | 0.0 | 0.0 | 0.0 | 0.0 | 0.0 | 0.0 |
| 71 | 2.4 | 0.0 | 0.0 | 0.0 | 0.0 | 0.0 | 0.0 | 0.0 |
| 76 | 2.4 | 0.0 | 0.0 | 0.0 | 0.0 | 0.0 | 0.0 | 0.0 |
| 81 | 2.4 | 0.0 | 0.0 | 0.0 | 0.0 | 0.0 | 0.0 | 0.0 |
| 86 | 2.3 | 0.0 | 0.0 | 0.0 | 0.0 | 0.0 | 0.0 | 0.0 |
| 91 | 1.9 | 0.0 | 0.0 | 0.0 | 0.0 | 0.0 | 0.0 | 0.0 |
| 96 | 1.5 | 0.0 | 0.0 | 0.0 | 0.0 | 0.0 | 0.0 | 0.0 |
| 101 | 1.1 | 0.0 | 0.0 | 0.0 | 0.0 | 0.0 | 0.0 | 0.0 |
| 106 | 0.8 | 0.0 | 0.0 | 0.0 | 0.0 | 0.0 | 0.0 | 0.0 |
| 111 | 0.5 | 0.0 | 0.0 | 0.0 | 0.0 | 0.0 | 0.0 | 0.0 |
| 116 | 0.2 | 0.0 | 0.0 | 0.0 | 0.0 | 0.0 | 0.0 | 0.0 |
| 121 | 0.0 | 0.0 | 0.0 | 0.0 | 0.0 | 0.0 | 0.0 | 0.0 |
| 126 | 0.0 | 0.0 | 0.0 | 0.0 | 0.0 | 0.0 | 0.0 | 0.0 |
| 131 | 0.0 | 0.0 | 0.0 | 0.0 | 0.0 | 0.0 | 0.0 | 0.0 |
| 136 | 0.0 | 0.0 | 0.0 | 0.0 | 0.0 | 0.0 | 0.0 | 0.0 |
| 141 | 0.0 | 0.0 | 0.0 | 0.0 | 0.0 | 0.0 | 0.0 | 0.0 |
| 146 | 0.0 | 0.0 | 0.0 | 0.0 | 0.0 | 0.0 | 0.0 | 0.0 |
| 151 | 0.0 | 0.0 | 0.0 | 0.0 | 0.0 | 0.0 | 0.0 | 0.0 |
| 156 | 0.0 | 0.0 | 0.0 | 0.0 | 0.0 | 0.0 | 0.0 | 0.0 |
| 161 | 0.0 | 0.0 | 0.0 | 0.0 | 0.0 | 0.0 | 0.0 | 0.0 |
| 166 | 0.0 | 0.0 | 0.0 | 0.0 | 0.0 | 0.0 | 0.0 | 0.0 |
| 171 | 0.0 | 0.0 | 0.0 | 0.0 | 0.0 | 0.0 | 0.0 | 0.0 |
| 176 | 0.0 | 0.0 | 0.0 | 0.0 | 0.0 | 0.0 | 0.0 | 0.0 |
| 181 | 0.0 | 0.0 | 0.0 | 0.0 | 0.0 | 0.0 | 0.0 | 0.0 |
| 186 | 0.0 | 0.0 | 0.0 | 0.0 | 0.0 | 0.0 | 0.0 | 0.0 |
| 191 | 0.0 | 0.0 | 0.0 | 0.0 | 0.0 | 0.0 | 0.0 | 0.0 |
| 196 | 0.0 | 0.0 | 0.0 | 0.0 | 0.0 | 0.0 | 0.0 | 0.0 |

TABLE 34-continued (s = 8, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 201 | 0.0 | 0.0 | 0.0 | 0.0 | 0.0 | 0.0 | 0.0 | 0.0 |
| 206 | 0.0 | 0.0 | 0.0 | 0.0 | 0.0 | 0.0 | 0.0 | 0.0 |
| 211 | 0.0 | 0.0 | 0.0 | 0.0 | 0.0 | 0.0 | 0.0 | 0.0 |
| 216 | 0.0 | 0.0 | 0.0 | 0.0 | 0.0 | 0.0 | 0.0 | 0.0 |
| 221 | 0.0 | 0.0 | 0.0 | 0.0 | 0.0 | 0.0 | 0.0 | 0.0 |
| 226 | 0.0 | 0.0 | 0.0 | 0.0 | 0.0 | 0.0 | 0.0 | 0.0 |

TABLE 35

(s = 8, z = 2): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 11 | 0.4 | 0.8 | 0.9 | 0.9 | 0.8 | 0.8 | 0.8 | 0.7 |
| 16 | 1.4 | 1.8 | 1.9 | 1.9 | 1.8 | 1.8 | 1.8 | 1.8 |
| 21 | 1.9 | 2.3 | 2.4 | 2.4 | 2.4 | 2.3 | 0.0 | 0.0 |
| 26 | 2.2 | 2.6 | 2.7 | 2.7 | 2.5 | 0.0 | 0.0 | 0.0 |
| 31 | 2.4 | 2.8 | 2.9 | 2.9 | 0.0 | 0.0 | 0.0 | 0.0 |
| 36 | 2.6 | 2.9 | 3.0 | 0.0 | 0.0 | 0.0 | 0.0 | 0.0 |
| 41 | 2.7 | 3.0 | 2.3 | 0.0 | 0.0 | 0.0 | 0.0 | 0.0 |
| 46 | 2.7 | 3.1 | 0.4 | 0.0 | 0.0 | 0.0 | 0.0 | 0.0 |
| 51 | 2.8 | 3.1 | 0.0 | 0.0 | 0.0 | 0.0 | 0.0 | 0.0 |
| 56 | 2.8 | 2.3 | 0.0 | 0.0 | 0.0 | 0.0 | 0.0 | 0.0 |
| 61 | 2.9 | 1.3 | 0.0 | 0.0 | 0.0 | 0.0 | 0.0 | 0.0 |
| 66 | 2.9 | 0.4 | 0.0 | 0.0 | 0.0 | 0.0 | 0.0 | 0.0 |
| 71 | 2.9 | 0.0 | 0.0 | 0.0 | 0.0 | 0.0 | 0.0 | 0.0 |
| 76 | 2.9 | 0.0 | 0.0 | 0.0 | 0.0 | 0.0 | 0.0 | 0.0 |
| 81 | 2.6 | 0.0 | 0.0 | 0.0 | 0.0 | 0.0 | 0.0 | 0.0 |
| 86 | 2.1 | 0.0 | 0.0 | 0.0 | 0.0 | 0.0 | 0.0 | 0.0 |
| 91 | 1.6 | 0.0 | 0.0 | 0.0 | 0.0 | 0.0 | 0.0 | 0.0 |
| 96 | 1.2 | 0.0 | 0.0 | 0.0 | 0.0 | 0.0 | 0.0 | 0.0 |
| 101 | 0.9 | 0.0 | 0.0 | 0.0 | 0.0 | 0.0 | 0.0 | 0.0 |
| 106 | 0.5 | 0.0 | 0.0 | 0.0 | 0.0 | 0.0 | 0.0 | 0.0 |
| 111 | 0.2 | 0.0 | 0.0 | 0.0 | 0.0 | 0.0 | 0.0 | 0.0 |
| 116 | 0.0 | 0.0 | 0.0 | 0.0 | 0.0 | 0.0 | 0.0 | 0.0 |
| 121 | 0.0 | 0.0 | 0.0 | 0.0 | 0.0 | 0.0 | 0.0 | 0.0 |
| 126 | 0.0 | 0.0 | 0.0 | 0.0 | 0.0 | 0.0 | 0.0 | 0.0 |
| 131 | 0.0 | 0.0 | 0.0 | 0.0 | 0.0 | 0.0 | 0.0 | 0.0 |
| 136 | 0.0 | 0.0 | 0.0 | 0.0 | 0.0 | 0.0 | 0.0 | 0.0 |
| 141 | 0.0 | 0.0 | 0.0 | 0.0 | 0.0 | 0.0 | 0.0 | 0.0 |
| 146 | 0.0 | 0.0 | 0.0 | 0.0 | 0.0 | 0.0 | 0.0 | 0.0 |
| 151 | 0.0 | 0.0 | 0.0 | 0.0 | 0.0 | 0.0 | 0.0 | 0.0 |
| 156 | 0.0 | 0.0 | 0.0 | 0.0 | 0.0 | 0.0 | 0.0 | 0.0 |
| 161 | 0.0 | 0.0 | 0.0 | 0.0 | 0.0 | 0.0 | 0.0 | 0.0 |
| 166 | 0.0 | 0.0 | 0.0 | 0.0 | 0.0 | 0.0 | 0.0 | 0.0 |
| 171 | 0.0 | 0.0 | 0.0 | 0.0 | 0.0 | 0.0 | 0.0 | 0.0 |
| 176 | 0.0 | 0.0 | 0.0 | 0.0 | 0.0 | 0.0 | 0.0 | 0.0 |
| 181 | 0.0 | 0.0 | 0.0 | 0.0 | 0.0 | 0.0 | 0.0 | 0.0 |
| 186 | 0.0 | 0.0 | 0.0 | 0.0 | 0.0 | 0.0 | 0.0 | 0.0 |
| 191 | 0.0 | 0.0 | 0.0 | 0.0 | 0.0 | 0.0 | 0.0 | 0.0 |
| 196 | 0.0 | 0.0 | 0.0 | 0.0 | 0.0 | 0.0 | 0.0 | 0.0 |
| 201 | 0.0 | 0.0 | 0.0 | 0.0 | 0.0 | 0.0 | 0.0 | 0.0 |
| 206 | 0.0 | 0.0 | 0.0 | 0.0 | 0.0 | 0.0 | 0.0 | 0.0 |
| 211 | 0.0 | 0.0 | 0.0 | 0.0 | 0.0 | 0.0 | 0.0 | 0.0 |
| 216 | 0.0 | 0.0 | 0.0 | 0.0 | 0.0 | 0.0 | 0.0 | 0.0 |
| 221 | 0.0 | 0.0 | 0.0 | 0.0 | 0.0 | 0.0 | 0.0 | 0.0 |
| 226 | 0.0 | 0.0 | 0.0 | 0.0 | 0.0 | 0.0 | 0.0 | 0.0 |

TABLE 36

(s = 16, z = 1): Net Coding Gain Matrix (dB)

| $n_{eff}\backslash\gamma_{eff}$ | 15 | 20 | 25 | 30 | 35 | 40 | 45 | 50 |
|---|---|---|---|---|---|---|---|---|
| 1 | 0.0 | 0.0 | 0.0 | 0.0 | 0.0 | 0.0 | 0.0 | 0.0 |
| 6 | 0.4 | 0.8 | 1.0 | 1.0 | 1.0 | 1.0 | 1.0 | 1.0 |
| 11 | 1.7 | 2.1 | 2.3 | 2.3 | 2.3 | 2.3 | 0.0 | 0.0 |
| 16 | 2.2 | 2.6 | 2.8 | 2.2 | 0.0 | 0.0 | 0.0 | 0.0 |

TABLE 36-continued (s = 16, z = 1): Net Coding Gain Matrix (dB)

| $n_{eff}$\\$\gamma_{eff}$ | 15 | 20 | 25 | 30 | 35 | 40 | 45 | 50 |
|---|---|---|---|---|---|---|---|---|
| 21 | 2.5 | 2.9 | 1.8 | 0.0 | 0.0 | 0.0 | 0.0 | 0.0 |
| 26 | 2.6 | 3.0 | 0.0 | 0.0 | 0.0 | 0.0 | 0.0 | 0.0 |
| 31 | 2.7 | 1.1 | 0.0 | 0.0 | 0.0 | 0.0 | 0.0 | 0.0 |
| 36 | 2.8 | 0.0 | 0.0 | 0.0 | 0.0 | 0.0 | 0.0 | 0.0 |
| 41 | 2.4 | 0.0 | 0.0 | 0.0 | 0.0 | 0.0 | 0.0 | 0.0 |
| 46 | 1.5 | 0.0 | 0.0 | 0.0 | 0.0 | 0.0 | 0.0 | 0.0 |
| 51 | 0.8 | 0.0 | 0.0 | 0.0 | 0.0 | 0.0 | 0.0 | 0.0 |
| 56 | 0.2 | 0.0 | 0.0 | 0.0 | 0.0 | 0.0 | 0.0 | 0.0 |
| 61 | 0.0 | 0.0 | 0.0 | 0.0 | 0.0 | 0.0 | 0.0 | 0.0 |
| 66 | 0.0 | 0.0 | 0.0 | 0.0 | 0.0 | 0.0 | 0.0 | 0.0 |
| 71 | 0.0 | 0.0 | 0.0 | 0.0 | 0.0 | 0.0 | 0.0 | 0.0 |
| 76 | 0.0 | 0.0 | 0.0 | 0.0 | 0.0 | 0.0 | 0.0 | 0.0 |
| 81 | 0.0 | 0.0 | 0.0 | 0.0 | 0.0 | 0.0 | 0.0 | 0.0 |
| 86 | 0.0 | 0.0 | 0.0 | 0.0 | 0.0 | 0.0 | 0.0 | 0.0 |
| 91 | 0.0 | 0.0 | 0.0 | 0.0 | 0.0 | 0.0 | 0.0 | 0.0 |
| 96 | 0.0 | 0.0 | 0.0 | 0.0 | 0.0 | 0.0 | 0.0 | 0.0 |
| 101 | 0.0 | 0.0 | 0.0 | 0.0 | 0.0 | 0.0 | 0.0 | 0.0 |
| 106 | 0.0 | 0.0 | 0.0 | 0.0 | 0.0 | 0.0 | 0.0 | 0.0 |
| 111 | 0.0 | 0.0 | 0.0 | 0.0 | 0.0 | 0.0 | 0.0 | 0.0 |
| 116 | 0.0 | 0.0 | 0.0 | 0.0 | 0.0 | 0.0 | 0.0 | 0.0 |
| 121 | 0.0 | 0.0 | 0.0 | 0.0 | 0.0 | 0.0 | 0.0 | 0.0 |
| 126 | 0.0 | 0.0 | 0.0 | 0.0 | 0.0 | 0.0 | 0.0 | 0.0 |
| 131 | 0.0 | 0.0 | 0.0 | 0.0 | 0.0 | 0.0 | 0.0 | 0.0 |
| 136 | 0.0 | 0.0 | 0.0 | 0.0 | 0.0 | 0.0 | 0.0 | 0.0 |
| 141 | 0.0 | 0.0 | 0.0 | 0.0 | 0.0 | 0.0 | 0.0 | 0.0 |
| 146 | 0.0 | 0.0 | 0.0 | 0.0 | 0.0 | 0.0 | 0.0 | 0.0 |
| 151 | 0.0 | 0.0 | 0.0 | 0.0 | 0.0 | 0.0 | 0.0 | 0.0 |
| 156 | 0.0 | 0.0 | 0.0 | 0.0 | 0.0 | 0.0 | 0.0 | 0.0 |
| 161 | 0.0 | 0.0 | 0.0 | 0.0 | 0.0 | 0.0 | 0.0 | 0.0 |
| 166 | 0.0 | 0.0 | 0.0 | 0.0 | 0.0 | 0.0 | 0.0 | 0.0 |
| 171 | 0.0 | 0.0 | 0.0 | 0.0 | 0.0 | 0.0 | 0.0 | 0.0 |
| 176 | 0.0 | 0.0 | 0.0 | 0.0 | 0.0 | 0.0 | 0.0 | 0.0 |
| 181 | 0.0 | 0.0 | 0.0 | 0.0 | 0.0 | 0.0 | 0.0 | 0.0 |
| 186 | 0.0 | 0.0 | 0.0 | 0.0 | 0.0 | 0.0 | 0.0 | 0.0 |
| 191 | 0.0 | 0.0 | 0.0 | 0.0 | 0.0 | 0.0 | 0.0 | 0.0 |
| 196 | 0.0 | 0.0 | 0.0 | 0.0 | 0.0 | 0.0 | 0.0 | 0.0 |
| 201 | 0.0 | 0.0 | 0.0 | 0.0 | 0.0 | 0.0 | 0.0 | 0.0 |
| 206 | 0.0 | 0.0 | 0.0 | 0.0 | 0.0 | 0.0 | 0.0 | 0.0 |
| 211 | 0.0 | 0.0 | 0.0 | 0.0 | 0.0 | 0.0 | 0.0 | 0.0 |
| 216 | 0.0 | 0.0 | 0.0 | 0.0 | 0.0 | 0.0 | 0.0 | 0.0 |
| 221 | 0.0 | 0.0 | 0.0 | 0.0 | 0.0 | 0.0 | 0.0 | 0.0 |
| 226 | 0.0 | 0.0 | 0.0 | 0.0 | 0.0 | 0.0 | 0.0 | 0.0 |

4. The Existence of a Transitional Zone in the Net and Line Coding Gain at a High Signal-to-noise Ratio Tables 12 and 13, above, show that in the G.dmt standard, when an effective number of subchannels $n_{eff}$ is greater than 151 ($n_{eff}$>151), there is a threshold value of the signal-to-noise ratio $\gamma_{thresh}(n_{eff})$<50 dB such that when $\gamma > \gamma_{thresh}(n_{eff})$ both inequalities (17.6) and (17.7) hold. At such signal-to-noise ratio, the uncoded case provides better channel throughput with a BER less than $10^{-7}$ than G.dmt-appropriate coding. This feature appears at a sufficiently large value of the effective number of subchannels $n_{eff}$ (right lower corner of Tables 12 and 13), and was not observed for G.lite. In this situation, using the general method described in subsection 2 of this section modifies the net coding gain $g_{n,dB}$, the number of DMT symbols per FEC frame s, and the number of FEC control code symbols per DMT symbol z. The change occurs in the transitional zone with the width of ~1 dB separating the ($\gamma_{eff}$, $n_{eff}$) areas where no coding is needed and where some coding is still beneficial. Table 37, below, presents the values of a preferred set of values of ($s(\gamma_{eff})$, $z(\gamma_{eff})$, $g_{n,dB}(\gamma_{eff})$) at $n_{eff}$=201 obtained using the generalized method in this embodiment, for the G.dmt standard, in the transitional zone.

TABLE 37

Change in the $g_{n,dB}$, s, and z with respect to $\gamma_{eff}$

| $\gamma_{eff}$ | 35 | 36 | 37 | 38 | 39 | 40 | 41 |
|---|---|---|---|---|---|---|---|
| $g_{c,dB}$ | 2.74 | 2.73 | 2.47 | 1.95 | 1.19 | 0.19 | 0 |
| s | 1 | 1 | 1 | 1 | 1 | 1 | 1 |
| z | 12 | 12 | 8 | 4 | 2 | 2 | 0 |

Table 38, below, presents the corresponding values of a preferred set of values of ($g_{n,dB}(\gamma_{eff})$, $s(\gamma_{eff})$, $z(\gamma_{eff})$) at $n_{eff}$=201 obtained using the method described in U.S. patent application Ser. No. 09/689,367 filed on Oct. 12, 2000, titled "Method of Selecting Initialization Parameters for Multichannel Data Communication with Forward Error Correction", to Vlad Mitlin, Tim Murphy, and Richard G. C. Williams.

TABLE 38

Change in $g_{n,dB}$, S, and z VS. $\gamma$eff

| $\gamma$eff | 35 | 36 | 37 | 38 | 38.7− | 38.7+ | 39 | 40 | 41 |
|---|---|---|---|---|---|---|---|---|---|
| $g_{c,\,dB}$ | 2.74 | 2.73 | 2.44 | 1.47 | 1.47 | 0 | 0 | 0 | 0 |
| s | 1 | 1 | 1 | 1 | 1 | 1 | 1 | 1 | 1 |
| z | 12 | 12 | 6 | 2 | 2 | 0 | 0 | 0 | 0 |

In both tables 37 and 38, the number of DMT frames in a FEC frame s is equal to 1 in the transitional zone while the number FEC control symbols in a DMT symbol z decreases with increasing signal-to-noise ratio. However, the value of the number of FEC control code symbols per DMT symbol z in Table 37 decreases slower than the value of the number of FEC control code symbols per DMT symbol z in Table 38. The value of the net coding gain $g_{n,dB}$ in the generalized method described in this embodiment (Table 37) gradually decreases to 0. In Table 38, the value of the net coding gain $g_{n,dB}$ decreases to a value of 1.47 dB at a signal-to-noise ratio of 38.7 dB, and then jumps to zero discontinuously.

The method of Table 38 underestimates the net coding gain $g_{n,dB}$ in the transitional zone. The differences in optimum FEC parameters obtained by these two methods occurs in a narrow (~1 to 2 dB) zone, but is accounted for in G.dmt. As the maximum number of subchannels in G.lite is equal to 96, while the maximum number of subchannels in G.dmt is equal to 224, the tables published in U.S. patent application Ser. No. 09/689,367 filed on Oct. 12, 2000, titled "Method of Selecting Initialization Parameters for Multichannel Data Communication with Forward Error Correction", to Vlad Mitlin, Tim Murphy, and Richard G. C. Williams, are not changed when the generalized method of this embodiment is used.

Figure 10A:
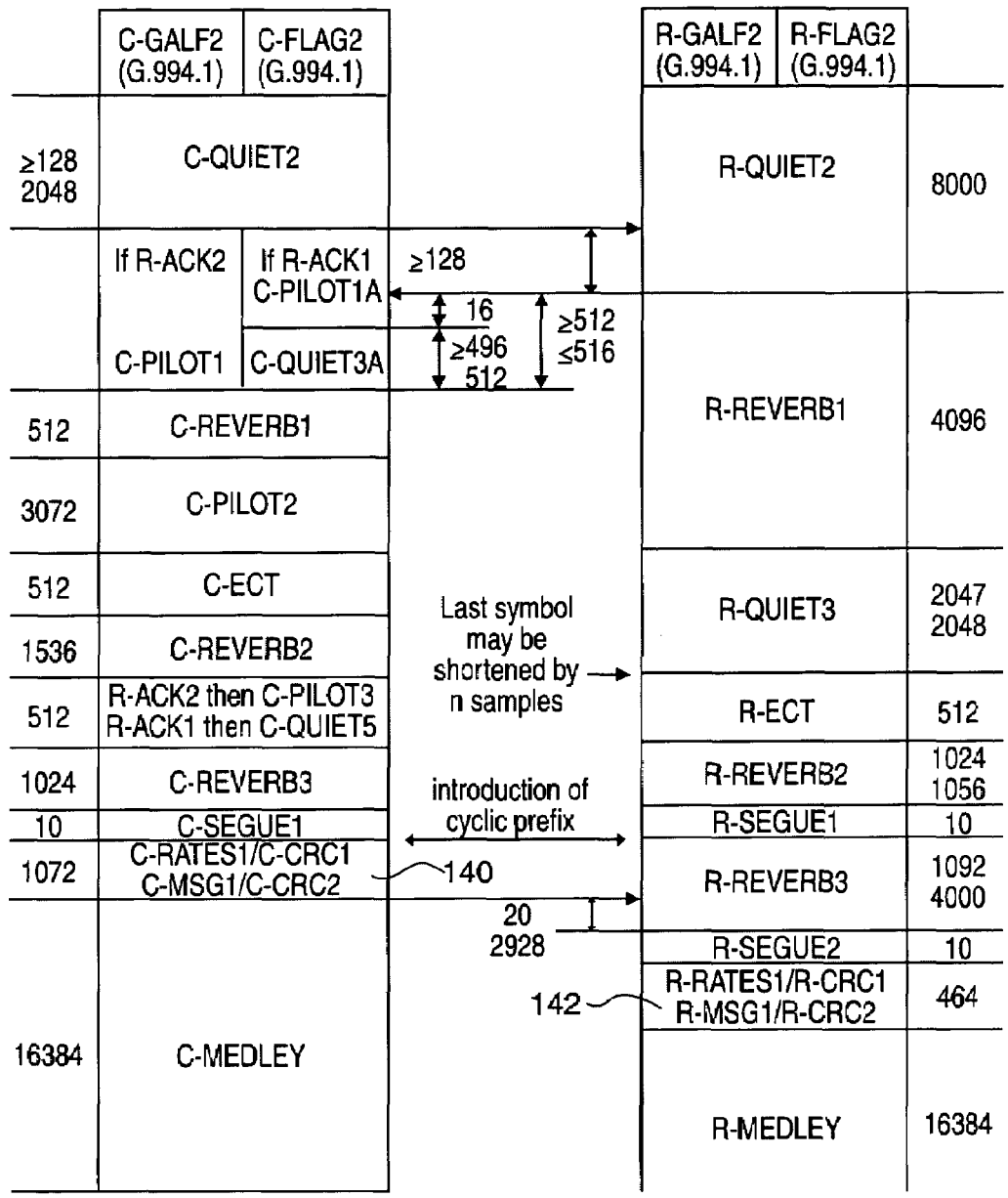
FIGS. 10A and 10B illustrate an exemplary initialization protocol in accordance with the 1999 version of the ITU G.992.1 Recommendation.
Figure 10B:
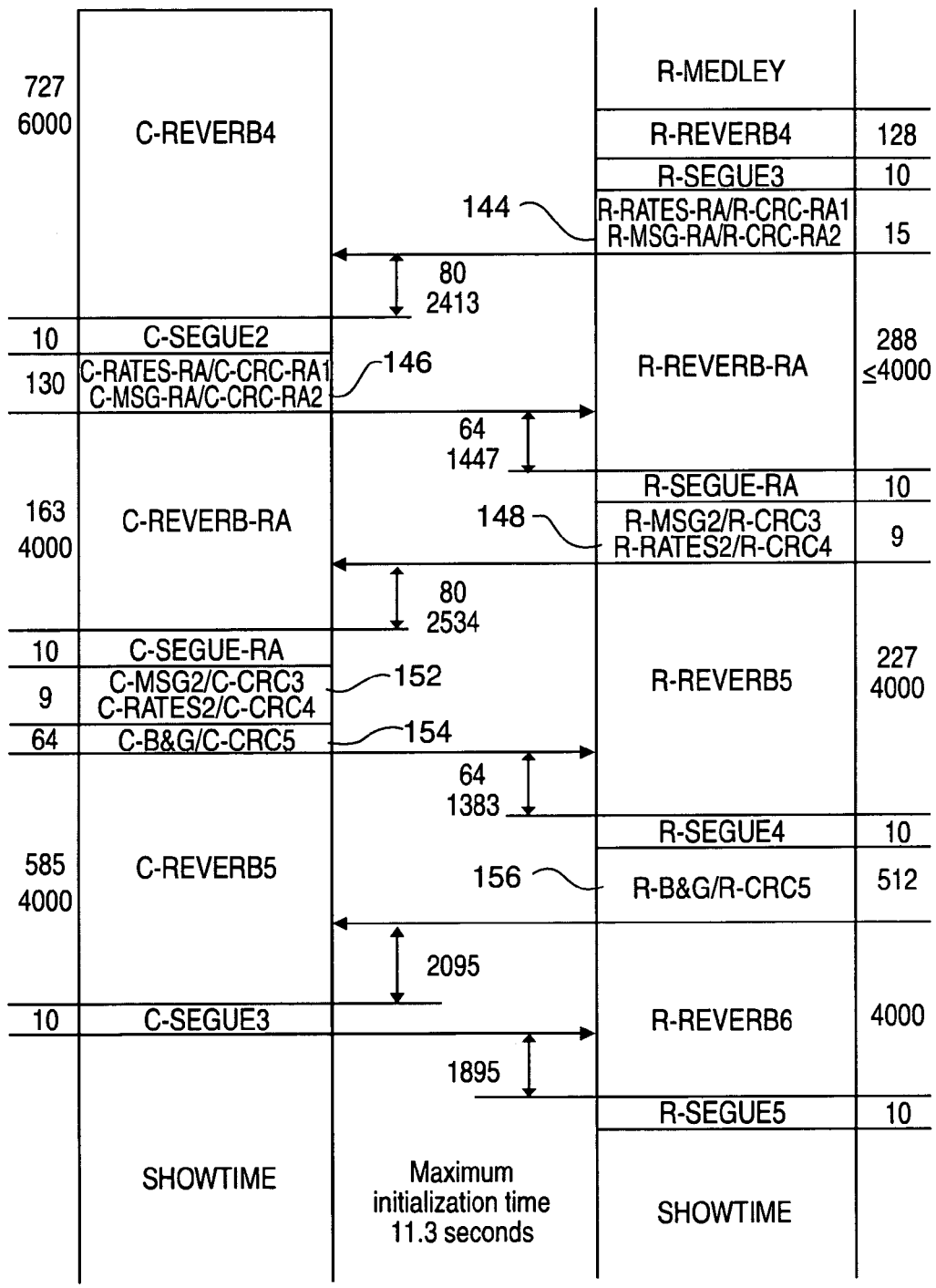

5. FEC-setting Message Sequence Between CO and RT and the Related Problems Involving Coding Gain Tables In the environment of DSL communications and particularly in the environment of G.dmt and G.lite compliance, the present invention can be applied to the initialization protocols specified in the 1999 versions of the G.992.1 and G.992.2 Recommendations. FIGS. 10A and 10B are from the 1999 version of the G.992.1 standard.

The aspects of the standard DSL initialization procedure considered relevant for negotiation of FEC parameters are labeled in FIGS. 10A and 10B. The left hand column represents messages originating with the central office (C) terminal and the right column represents messages originating with the remote (R) terminal. Negotiations regarding downstream and upstream communications proceed in parallel.

The procedure of setting FEC parameters in a DSL G.lite/G.dmt-compliant system comprises an exchange of the following messages between the central office and remote terminal. When two logical messages appear on the same line, those messages can be combined into a single transmission:

C-RATES1→C-MSG1→
R-RATES1←R-MSG1←
R-MSG-RA←R-RATES-RA←
C-RATES-RA→C-MSG-RA→
R-MSG2←R-RATES2←
C-MSG2→C-RATES2→

This exchange of messages is explained first with respect to the remote terminal, then with respect to the central office because the exchange of messages is not entirely symmetrical.

6. Remote Terminal Side of the Exchange

The remote terminal side of the FEC-related information exchange proceeds as follows. At 140, the remote terminal receives a C-RATES1 message from the central office. This message includes four options for s, the number of DMT symbols per FEC frame, and z, the number of control code symbols per DMT symbol. Options are transmitted for both upstream and downstream channels and are listed in order of decreasing preference. The remote terminal also receives C-MSG1 from the central office. This message includes the margin $\mu$, and $b_{max}$, the maximum number of bits per subchannel for downstream transmission. These values are preliminary, as they precede measurements of signal strength.

At 142, the remote terminal sends R-RATES1 to the central office providing four options of (s, z) parameters transmitted in order of decreasing preference, for upstream transmission. As the central office has control over the data rates, these options may be copied from C-RATES1. The remote terminal also sends R-MSG1 to the central office providing the maximum number of bits per subchannel for upstream transmission.

At 144, the remote terminal sends R-MSG-RA to the central office providing the following parameters for downstream transmission: $n_{eff}$, the number of subcarriers, the best (at s=1) estimates of z and K=N–ρs–sz, where N is the number of code symbols in a FEC frame, K is the number of code symbols in the information field, ρ is the mode index value, $g_{l,dB}$ is the line coding gain per subcarrier; and $B_{DMT}$ is the DMT symbol size.

When preparing R-MSG-RA, the remote terminal should take advantage of having measured the downstream signal-to-noise ratio ($\Gamma_i$) distribution over subcarriers or channels. The remote terminal computes $\gamma_i=\Gamma_i-\mu$, the margin-corrected signal-to-noise ratio distribution. (The margin value $\mu$ was received in C-MSG1.) The remote terminal determines the number of subcarriers carrying data downstream, $n_{eff}$ as follows: (i) for each subcarrier, $b_{i,0}$, the number of bits to be loaded at that subcarrier without FEC at the bit error rate $\epsilon=10^{-7}$ is computed; and (ii) the effective number of channels, $$n_{eff} = \sum_{b_{i,0}>0} 1,$$

the number of channels loaded with one or more bits, is estimated. The remote terminal computes $\gamma_{eff}=\Sigma\gamma_i/n_{eff}$, the average signal-to-noise ratio of the downstream channel. The remote terminal should find the best set or sets of (z; $g_{l,dB}$; N–ρs–sz, $b_i=b_{i,0}+g_{l,dB}/3.01$, i=1, ..., $n_{eff}$, $B_{DMT}=\Sigma$min($b_i$, $b_{max}$)) at s=1 and $\epsilon=10^{-7}$. In this manner, the remote terminal can send R-RATES-RA to the central office providing the best (s,z) option(s) from C-RATES1, for downstream transmission, based on signal-to-noise ratio measurements.

When preparing R-RATES-RA, the remote terminal should determine $\gamma_i$, $n_{eff}$, and $\gamma_{eff}$ as described above. With this information, the remote terminal can find the best (s, z, $g_{d,dB}$) triplet(s) at the specified bit error rate $\epsilon=10^{-7}$, applying the equations and procedure set forth above. If the best triplet(s) matches one of the options remote terminal received with C-RATES1, the remote terminal sends that option's number to the central office in R-RATES-RA. Otherwise, the remote terminal indicates that no option was selected in R-RATES-RA.

At 146, the remote terminal receives C-RATES-RA with 4 options of (s, z) parameters transmitted in order of decreasing preference. This list of options is not constrained by previous messages. The remote terminal also receives C-MSG-RA with a potentially revised margin for downstream transmission.

At 148, the remote terminal sends R-MSG2 to the central office providing the DMT symbol size for downstream transmission corresponding to the downstream margin received in C-MSG-RA and the (s, z) option chosen in R-RATES2 at $\epsilon=10^{-7}$. It also sends R-RATES2 to the central office providing the best (s,z) option from C-RATES-RA.

When preparing R-MSG2 and R-RATES2, the remote terminal should computes $\gamma d_i=\Gamma_i-\mu$, the margin-corrected signal-to-noise ratio distribution. The margin value is received in C-MSG-RA. If the margin and channel strengths are unchanged, this calculation is easily optimized. The remote terminal determines $\{b_{i,0}\}$ and $n_{eff}$ and $\gamma_{eff}$ as described above. The remote terminal finds the best (s, z, $g_{l,dB}$) triplet(s) chosen from 4 options it received in C-RATES-RA at $\epsilon=10^{-7}$, as described in the equations and procedures above. Then it computes the size of DMT symbol for sending it with R-MSG2, as follows: $b_i=b_{i,0}+g_{l,dB}/3.01$, i=1, ..., $n_{eff}$; $B_{DMT}=\Sigma$min($b_i$, $b_{max}$).

At 150, the remote terminal receives C-MSG2 with the margin and DMT symbol size the upstream channel can support. The remote terminal also receives C-RATES2, a reply to R-RATES-RA from the central office, with final downstream and upstream FEC sets.

A. Central Office Side of the Exchange

The central office side of the FEC-related information exchange is substantially, but not completely, the same as the remote terminal side of the exchange. At 90, the central office sends C-RATES1 to the remote terminal providing 4 options of (s, z) parameters transmitted in order of decreasing preference. When preparing C-RATES1, the central office does not have any downstream signal-to-noise ratio information, unless the central office uses historical information from prior communication sessions. Therefore, four best (s, z) sets for downstream transmission are determined from lookup tables at values such as $\gamma_{eff}=50$ dB and $n_{eff}=96$, which are the best possible performance conditions of the downstream channel in one set of tables embodying aspects of the present invention. At this point, the central office has not measured the upstream signal-to-noise ratio. Therefore, four best (s,z) sets for upstream transmission are also determined from lookup tables, preferably at an effective signal-to-noise ratio $\gamma_{eff}$ equal to 50 dB and effective number of subchannels $n_{eff}$ equal to 26, when these are the best possible performance conditions of the upstream channel). The central office also sends C-MSG1 to the remote terminal providing the margin and maximum number of bits per subchannel for downstream transmission.

At 142, the central office receives R-RATES1 with the remote terminal's choice of four options of (s, z) parameters for upstream transmission. The central office also receives R-MSG1 with the remote terminal's choice of the margin and maximum number of bits per subchannel, for upstream transmission.

At 144, the central office receives R-MSG-RA with the remote terminal's best (at s=1) estimates of z; K=N−ρs−sz, the line coding gain, and the size of the DMT symbol (with margin from C-MSG1), for downstream transmission. The central office also receives R-RATES-RA with the remote terminal's best (s, z) choice from the 4 options that the central office previously sent with C-RATES1, for downstream transmission.

At 146, the central office sends C-RATES-RA to the remote terminal providing 4 options of (s, z) parameters, transmitted in order of decreasing preference. These options are not constrained by previous messages. When preparing C-RATES-RA, the central office takes advantage of ($g_{l,dB}$, $n_{eff}$, $B_{DMT}$) received from the remote terminal in R-MSG-RA. The central office determines the effective signal-to-noise ratio $\gamma_{eff}$ of the signal from the downstream station in accordance with the following equation:

$$\gamma_{eff} = 9.8 + \frac{(3.01 B_{DMT} - n_{eff} g_{l,db})}{n_{eff}}. \quad (17.12)$$

Given the effective signal-to-noise ratio $\gamma_{eff}$ and effective number of subchannels $n_{eff}$, the central office finds four best or preferred sets of (s, z) for downstream transmission at $\epsilon=10^{-7}$. Depending on the central office's affinity with the remote terminal, the central office may use the (s, z) set from R-RATES-RA, as one of the four best sets of (s, z) parameters. In an alternate embodiment, the four sets of (s, z) parameters are not distinct. By this time, the central office has measured the upstream signal-to-noise ratio ($\Gamma_i$) distribution over a the subchannels. The central office computes $\gamma_i=\Gamma_i-\mu$, the margin-corrected signal-to-noise distribution. The margin value is typically predefined by standard or the central office operator. The central office computes {$b_{i,0}$} and the effective number of subchannels $n_{eff}$ of the upstream channel, as described above. The central office computes the effective signal-to-noise ratio $\gamma_{eff}$ of the upstream channel, as described above. The central office finds, for upstream transmission, the four best (s, z, $g_{l,dB}$) triplets at $\epsilon=10^{-7}$, as described above.

Also at 146, the central office sends C-MSG-RA to the remote terminal providing a potentially revised margin for downstream transmission.

At 148, the central office receives R-MSG2 with the remote terminal's estimate of the size of DMT symbol, based on the downstream margin the central office sent in C-MSG-RA and the option chosen by the remote terminal in R-RATES2, at $\epsilon=10^{-7}$ for downstream transmission. The central office also receives R-RATES2 with the remote terminal's best (s, z) option from C-RATES-RA based on the remote terminal's downstream channel analysis.

At 152, the central office sends C-MSG2 to the remote terminal providing the margin and DMT symbol size the upstream channel can support. When preparing C-MSG2, the central office should take advantage of having measured the upstream signal-to-noise ratio ($\Gamma_i$) distribution over the subchannels. The central office computes the margin-corrected signal-to-noise ratio distribution $\gamma_i=\Gamma_i-\mu$. The margin value, again, is typically predefined. The central office computes {$b_{i,0}$}, the effective number of subchannels $n_{eff}$ and the effective signal-to-noise ratio $\gamma_{eff}$ of the upstream channel, as described for the remote terminal. The central office then finds one or more preferred triplet(s) (s, z, $g_{l,dB}$) at $\epsilon=10^{-7}$, using the equations and methods described above. The central office computes $b_i=b_{i,0}+g_{l,dB}/3.01$, i=1, . . . , $n_{eff}$; $B_{DMT}=\Sigma\min(b_i, b_{max})$. The central office sends the number of bits per DMT symbol $B_{DMT}$ obtained for the best set of (s, z) values, with C-MSG2. The best (s, z) set is used later in C-RATES2. The central office also sends C-RATES2 to the remote terminal, with final downstream and upstream FEC sets. For preparation of C-RATES2, for upstream transmission, the central office uses the FEC settings determined in for C-MSG2. For downstream transmission, the central office uses the best (s, z) set at a code symbol error rate $\epsilon$ of $10^{-7}$, as defined in C-RATES-RA. Alternately, depending on the central office's affinity with the remote terminal, the central office may use the set received from the remote terminal in R-RATES2.

The exchange leads to transmission of detailed bits and gain information, on a channel by channel basis, at 154 and 156.

As described above, the central office and remote terminal can successfully negotiate FEC parameters to attain the maximum throughput in the upstream/downstream directions if they both have (s,z)-associated $g_{c,dB}(n_{eff}, \gamma_{eff})$ lookup tables in accordance with an embodiment of the present invention. A typical problem in the FEC parameters negotiation involving these lookup tables consists of the following: given a subset, alternately, the whole set, of (s, z) pairs from Table 11 and a ($n_{eff}$, $\gamma_{eff}$) pair, determine the maximum net coding gain $g_{n,dB}$ from the corresponding subset of (s,z)-associated net coding gain $g_{n,dB}$ lookup tables, such as Tables 14–36. This problem reduces to determining the net coding gain $g_{n,dB}$ in the point ($n_{eff}$, $\gamma_{eff}$) inside a grid block from four net coding gain $g_{n,dB}$ values in the vertices of that grid block, ($n_{eff,i}$, $\gamma_{eff,j}$), i,j=1, . . . , 2.

This problem can be solved using the bilinear approximation inside the grid block in accordance with the following relationships:

$$g_{n,dB}(n_{eff}, \gamma_{eff,1}) = g_{n,dB}(n_{eff,1}, \gamma_{eff,1})n_{eff,2} - \quad (18.1)$$
$$\frac{n_{eff}}{n_{eff,2} - n_{eff,1}} + g_{n,dB}(n_{eff,2}, \gamma_{eff,1})n_{eff} - \frac{n_{eff,1}}{n_{eff,2} - n_{eff,1}}$$

$$g_{n,dB}(n_{eff}, \gamma_{eff,2}) = g_{n,dB}(n_{eff,1}, \gamma_{eff,2})n_{eff,2} - \quad (18.2)$$
$$\frac{n_{eff}}{n_{eff,2} - n_{eff,1}} + g_{n,dB}(n_{eff,2}, \gamma_{eff,2})n_{eff} - \frac{n_{eff,1}}{n_{eff,2} - n_{eff,1}}$$

$$g_{n,dB}(n_{eff}, \gamma_{eff}) = g_{n,dB}(n_{eff}, \gamma_{eff,1})\gamma_{eff,2} - \quad (18.3)$$
$$\frac{\gamma_{eff}}{\gamma_{eff,2} - \gamma_{eff,1}} + g_{n,dB}(n_{eff}, \gamma_{eff,2})\gamma_{eff} - \frac{\gamma_{eff,1}}{\gamma_{eff,2} - \gamma_{eff,1}}$$

The approximation given by Equations (18.1) to (18.3) is continuous across the boundaries of adjacent grid blocks and is well-suited for the slowly changing (s, z)-associated net coding gain $g_{n,dB}(n_{eff}, \gamma_{eff})$ values shown above in Tables 14 to 36.

7. Memory Management

Storing all 23 (s,z)-associated net coding gain $g_{n,dB}(n_{eff}, \gamma_{eff})$ tables is a substantial burden for G.dmt driver code. In one embodiment, the amount of data stored is reduced as follows. First, each (s,z)-associated table is stored as a one-dimensional array. Second, most of the values in each table are zeroes, and often several subsequent nonzero net coding gain values $g_{n,dB}$ (stored with the precision of 0.1 dB) are identical. Each net coding gain value $g_{n,dB}$ can be stored in an 8-bit (unsigned char) field. The 6 least significant bits of each byte are used for data, and the 2 most significant bits are used for flags. Specifically, if the net coding gain $g_{n,dB}$ is nonzero and non-repetitive, the flag bits are both equal to zero.

Storing a sequence of repeating zeroes uses 1 byte, with the first most sigificant bit set equal to 1 and the second most $\text{sig}_n$ificant bit set equal to 0, the remaining 6 bits representing a repetition index.

Storing a sequence of repeating nonzero values uses 2 bytes. The first byte has the first most significant bit set to 0 and the second most significant bit set to 1, the remaining 6 bits representing the repetition index. The second byte has the first most significant bit set equal to 1 and the second most significant bit set equal to 1, the remaining 6 bits represent the repeating net coding gain value $g_{n,dB}$. In this case, the repetition index should be equal to at least 3.

In one embodiment, the 23 tables storing the net coding gain values $g_{n,dB}(n_{eff}, \gamma_{eff})$ are determined once during the transceiver initiation session. This requires a one-time determination of 4×23 net coding gain $g_{n,dB}$ values in the vertices of the grid block $(n_{eff,i}, \gamma_{eff,j})$, i,j=1, ..., 2., where the point $(n_{eff}, \gamma_{eff})$ belongs Each of the 4 values are substituted into Equations (18.1), (18.2) and (18.3) yielding 23 values of the net coding gain $g_{n,dB}(n_{eff}, \gamma_{eff})$ which are then used throughout the transceiver initiation session.

8. Generalized Method: Multicarrier Channel with FEC and ARQ

As discussed above, ARQ is another method of correcting errors in multicarrier channels. The formulas of the generalized method of performance evaluation of a DMT channel with FEC and ARQ are presented below. Including ARQ results in the following modification of the equations in Sections II and III. Equation (16.3) is modified as follows:

Equation (16.8) is modified as follows:

$$1 - \left(1 - W(s, z, K, k)\varepsilon_S^{\frac{1}{k(0.5sz+1)}}\right)^{1/\alpha} = \qquad (19.4)$$

$$\omega\left(\frac{\alpha}{sn_{eff}}(K + \rho s + zs)\right)\left(1 - 2^{\frac{\alpha}{2sn_{eff}}(K+\rho s+zs)}\right)$$

$$erfc\left(\sqrt{3 \cdot 10^{\gamma_{eff}/10} / \left(2^{\frac{\alpha}{sn_{eff}}(K+\rho s+zs)+1} - 2\right)}\right) \times$$

$$\left[2 - \left(1 - 2^{\frac{\alpha}{2sn_{eff}}(K+\rho s+zs)}\right)\right.$$

$$\left.erfc\left(\sqrt{3 \cdot 10^{\gamma_{eff}/10} / \left(2^{\frac{\alpha}{sn_{eff}}(K+\rho s+zs)+1} - 2\right)}\right)\right]$$

Finally, the definition of $\Theta(K)$ is modified as follows:

$$\Theta(K) = \omega\left(\frac{\alpha}{sn_{eff}}(K + \rho s + zs)\right)\left(1 - 2^{\frac{\alpha}{2sn_{eff}}(K+\rho s+zs)}\right) \qquad (19.5)$$

$$erfc\left(\sqrt{3 \cdot 10^{\gamma_{eff}/10} / \left(2^{\frac{\alpha}{sn_{eff}}(K+\rho s+zs)+1} - 2\right)}\right) \times$$

$$\left[2 - \left(1 - 2^{\frac{\alpha}{2sn_{eff}}(K+\rho s+zs)}\right)\right.$$

$$\left.erfc\left(\sqrt{3 \cdot 10^{\gamma_{eff}/10} / \left(2^{\frac{\alpha}{sn_{eff}}(K+\rho s+zs)+1} - 2\right)}\right)\right] -$$

$$\left[1 - \left(1 - W(s, z, K, k)\varepsilon_S^{\frac{1}{k(0.5 \cdot sz+1)}}\right)^{1/\alpha}\right]$$

A method for determining the performance of multicarrier channels with FEC has been provided. In an alternate embodiment, the method determines the performance of $$W = \left[\frac{\Gamma(K + \rho s + sz)}{\Gamma(K + \rho s + 0.5 \cdot sz)\Gamma(0.5 \cdot sz + 1)}\right]^{-1/(0.5 \cdot sz+1)} \left[\frac{\Gamma(K + \rho s + sz + 1)}{\Gamma(K + \rho s + 0.5 \cdot sz)\Gamma(0.5 \cdot sz + 2)}\right]^{-(k-1)/(0.5 \cdot sz+1)k} \qquad (19.1)$$

where k represents the maximum number of transmissions allowed for a FEC frame. Equation (16.10) is modified as follows:

$$g_{n,dB}(s, z) = \qquad (19.2)$$

$$3.01\left[\frac{K}{K+\rho s+sz}\frac{b(\gamma_{eff}, s, z, k)}{v} - \frac{K}{K+\rho s}b(\gamma_{eff}, 1, 0, 1)\right]$$

where v is the average number of transmissions:

$$v = \left(1 - \frac{K+\rho s+sz}{0.5 \cdot sz + 1}\varepsilon_s\right) / \left[1 - \left(\frac{K+\rho s+sz}{0.5 \cdot sz + 1}\varepsilon_s\right)^{1/k}\right] \qquad (19.3)$$

multicarrier channels with FEC and ARQ. A technique for optimizing a G.992.2-compliant modem has also been described. In one embodiment, the net coding gain attained using the G.992.2 standard is restricted by Equation (8.4). In an alternate embodiment, the restriction of Equation (8.4) can be lifted. In an alternate embodiment, the method may be used to determine the optimum parameters for other types of systems with less restrictive relationships (or with no restrictions at all) between the parameters of the DMT frame and data link (FEC/ARQ) layer. In another alternate embodiment, the method is applied to G.992.1 compliant modems.

Although various embodiments, each of which incorporates the teachings of the present invention, have been shown and described in detail herein, those skilled in the art can readily devise many other embodiments that still utilize these teachings.

We claim:

1. A method of determining an optimum bit load per subchannel in a multicarrier system with forward error correction, comprising:

computing one or more values of a number of bit positions b of a quadrature-amplitude-modulation symbol, based on one or more values of a number of symbols in an information field K, and one or more values of a number of control code symbols per discrete-multi-tone symbol z, to provide one or more determined values of b, in accordance with the following relationship:

$$1 - \left(1 - W(s, z, K)\varepsilon_S^{\frac{1}{0.5 \cdot sz+1}}\right)^{1/\alpha} =$$

$$\omega(b(\gamma_{\mathit{eff}}, s, z))\left(1 - 2^{-b(\gamma_{\mathit{eff}},s,z)/2}\right) \mathit{erfc}\left(\sqrt{3 \cdot 10^{\gamma_{\mathit{eff}}/10} / \left(2^{b(\gamma_{\mathit{eff}},s,z)+1} - 2\right)}\right) \times$$

$$\left[2 - \left(1 - 2^{-b(\gamma_{\mathit{eff}},s,z)/2}\right) \mathit{erfc}\left(\sqrt{3 \cdot 10^{\gamma_{\mathit{eff}}/10} / \left(2^{b(\gamma_{\mathit{eff}},s,z)+1} - 2\right)}\right)\right]$$

$$W(s, z, K) = \left[\frac{\Gamma(K+s+sz)}{\Gamma(K+s+0.5 \cdot sz)\Gamma(0.5 \cdot sz+1)}\right]^{-1/(0.5 \cdot sz+1)}$$

$$\omega(b) = \frac{4}{2b+3},$$

$\Gamma(x) = (x-1)!$, and $$b(\gamma_{\mathit{eff}}, s, z) = \frac{\alpha}{sn_{\mathit{eff}}}(K + \rho s + zs)$$

s represents a number of discrete-multi-tone symbols in a frame, $\varepsilon_s$ represents a symbol error rate, $\alpha$ represents the size of a code symbol, $\rho$ represents a framing mode index, $\omega(b)$ represents an average fraction of erroneous bits in an erroneous b-sized quadrature-amplitude-modulation symbol, $\gamma_{\mathit{eff}}$ represents an effective signal-to-noise ratio, and $n_{\mathit{eff}}$ represents an effective number of subchannels; and selecting the value of K and the value of z which provides a maximum number of bit positions based on the one or more determined values of b.

2. The method of claim 1 wherein the effective signal-to-noise ratio $\gamma_{\mathit{eff}}$ is an average signal-to-noise ratio of at least a subset of the channels.

3. The method of claim 1 wherein the size of the frame ranges from 0 to $N_{max}-s-zs$ symbols, where $N_{max}$ is a predetermined value.

4. The method of claim 1 further comprising:

determining a difference $\Theta(K)$ between a bit error rate prior to decoding and a target bit error rate ($p_e$) based on one or more values of a length of the information field K within a range from 0 to $N_{max}-\rho s-sz$, where $N_{max}$ is a predetermined value, in accordance with the following relationship:

$\Theta(K) = \omega(b(\gamma_{\mathit{eff}},s,z))p_{QAM}-p_e$, and $$\omega(b(\gamma_{\mathit{eff}}, s, z))p_{QAM} = \omega\left(\frac{\alpha}{sn_{\mathit{eff}}}(K+\rho s+zs)\right)$$

$$\left(1 - 2^{\frac{\alpha}{2sn_{\mathit{eff}}}(K+\rho s+zs)}\right) \times \mathit{erfc}\left(\sqrt{3 \cdot 10^{\gamma_{\mathit{eff}}/10} / \left(2^{\frac{\alpha}{sn_{\mathit{eff}}}(K+\rho s+zs)+1} - 2\right)}\right) \times$$

$$\left[2 - \left(1 - 2^{\frac{\alpha}{2sn_{\mathit{eff}}}(K+\rho s+zs)}\right) \mathit{erfc}\left(\sqrt{3 \cdot 10^{\gamma_{\mathit{eff}}/10} / \left(2^{\frac{\alpha}{sn_{\mathit{eff}}}(K+\rho s+zs)+1} - 2\right)}\right)\right]$$

$$p_e = \left[1 - \left(1 - W(s, z, K)\varepsilon_S^{\frac{1}{0.5 \cdot sz+1}}\right)^{1/\alpha}\right]$$

wherein $p_{QAM}$ represents a probability of error in transmitting a quadrature-amplitude-modulation waveform representing a $2^b$ point constellation; and comparing the value of $\Theta(0)$ and $\Theta(N_{max}-s-zs)$ to 0; and setting the value of K in response to the comparing.

5. The method of claim 4 further comprising: when $\Theta(0)<0$ and $\Theta(N_{max}-s-sz)<0$, setting $K=N_{max}-s-zs$.

6. The method of claim 4 further comprising: setting $b(\gamma_{\mathit{eff}}, s, z)$ equal to $(\alpha N_{max})/(s n_{\mathit{eff}})$ for all values of $\gamma_{\mathit{eff}}$ and z.

7. The method of claim 4 wherein when $\Theta(0)>0$ and $\Theta(N_{max}-s-sz)>0$, setting $K=N_{max}-1$.

8. The method of claim 7 further comprising: setting s=1 and z=0.

9. A method of selecting forward error correction parameters in a channel having a plurality of subchannels in a multicarrier communications system, comprising:

storing, in a table, selected sets of forward error correction parameters and associated net coding gains from using the sets, the selected sets including at least a number (s) of discrete multi-tone symbols in a forward-error-correction frame and a corresponding number (z) of forward-error-correction control symbols in each discrete multi-tone symbol, the sets and associated net coding gains corresponding to combinations of a signal-to-noise ratio and a number of subchannels carrying discrete multi-tone symbol signals;

determining a signal-to-noise ratio representing a set of the plurality of subchannels carrying the discrete multi-tone symbol signals; and using the table, selecting a particular set of forward error correction parameters for the channel based on at least the signal-to-noise ratio representing the set of the plurality of subchannels and the net coding gain for the selected particular set.

10. The method of claim 9 wherein the net coding gains are stored as bilinear approximations.

11. A method of selecting forward error correction parameters in a channel having a plurality of subchannels in a multicarrier communications system, comprising:

storing, in a table, selected sets of forward error correction parameters and associated net coding gains from using the sets, the selected sets including at least a number (s) of discrete multi-tone symbols in a forward-error-correction frame, a corresponding number (z) of forward-error-correction control symbols in each discrete multi-tone symbol, and a maximum number of transmissions (k), the sets and associated net coding gains corresponding to combinations of a signal-to-noise ratio and a number of subchannels carrying discrete multi-tone symbol signals;

determining a signal-to-noise ratio representing a set of the plurality of subchannels carrying discrete multi-tone symbol signals; and using the table, selecting a particular set of forward error correction parameters for the channel based on at least the signal-to-noise ratio renresenting the set of the plurality of subchannels and the net coding gain for the selected particular set.

12. The method of claim 11 wherein the net coding gains are stored as bilinear approximations.

13. The method of claim 11 wherein and the values of s and z are in accordance with the G.dmt standard.

14. The method of claim 11 wherein the values of s and z are in accordance with the G.lite standard, such that a subset of the tables associated with the values of s and z in accordance with the G.dmt standard are used when the channel uses the G.lite standard.

15. A method of increasing a bit load of a multicarrier system comprising a channel having a plurality of subchannels, comprising:

determining a bit load for at least one subchannel based on a target symbol error rate $\epsilon_s$, a maximum number of symbol errors that can be corrected t, a number of symbols in an information field K, a maximum number of transmissions k, and a number of bits per subchannel; and selecting the maximum number of symbol errors t, the number of symbols in the information field K and the maximum number of transmissions k, such that a net coding gain is increased, and wherein t, K and k are also selected such that no forward error correction is applied when the number of subchannels exceeds a predetermined threshold number of subchannels.

16. The method of claim 15 wherein the channel uses the G.dmt standard.

17. The method of claim 15 wherein the channel uses the G.lite standard.

18. A method of determining an optimum bit load per subchannel in a multicarrier system with forward error correction, comprising:

computing one or more values of a number of bit positions b of a quadrature-amplitude-modulation symbol based on one or more values of a number of symbols in an information field K, one or more values of a number of control code symbols per discrete-multi-tone symbol z, and a maximum number of transmissions k, to provide one or more determined values of b, in accordance with the following relationship:

$$1 - \left(1 - W(s, z, K, k)\varepsilon_S^{\frac{1}{k(0.5sz+1)}}\right)^{1/\alpha} = \omega(b(\gamma_{eff}, s, z))\left(1 - 2^{-b(\gamma_{eff},s,z)/2}\mathrm{erfc}\left(\sqrt{3 \cdot 10^{\gamma_{eff}/10}/\left(2^{b(\gamma_{eff},s,z)+1} - 2\right)}\right)\right) \times$$

$$\left[2 - \left(1 - 2^{-b(\gamma_{eff},s,z)/2}\right)\mathrm{erfc}\left(\sqrt{3 \cdot 10^{\gamma_{eff}/10}/\left(2^{b(\gamma_{eff},s,z)+1} - 2\right)}\right)\right]$$

$$W(s, z, K, k) = \left[\frac{\Gamma(K + \rho s + sz)}{\Gamma(K + \rho s + 0.5 \cdot sz)\Gamma(0.5 \cdot sz + 1)}\right]^{-1/(0.5 \cdot sz+1)} \times$$

$$\left[\frac{\Gamma(K + \rho s + sz + 1)}{\Gamma(K + \rho s + 0.5 \cdot sz)\Gamma(0.5 \cdot sz + 2)}\right]^{-(k-1)/(0.5 \cdot sz+1)k}$$

-continued $$\omega(b) = \frac{4}{2b + 3},$$

$$\Gamma(x) = (x-1)!, \text{ and}$$

$$b(\gamma_{eff}, s, z) = \frac{\alpha}{sn_{eff}}(K + \rho s + zs)$$

s represents a number of discrete-multi-tone symbols in a frame, $\epsilon_s$ represents a symbol error rate, $\alpha$ represents the size of a code symbol, $\omega(b)$ represents an average fraction of erroneous bits in an erroneous b-sized quadrature-amplitude-modulation symbol, $\gamma_{eff}$ represents an effective signal-to-noise ratio, $\rho$ represents a framing mode index; and $n_{eff}$ represents an effective number of subchannels; and selecting the value of K and the value of z which provides a maximum number of bit positions based on the one or more determined values of b.

19. The method of claim 18 wherein the effective signal-to-noise ratio $\gamma_{eff}$ is an average signal-to-noise ratio of at least a subset of the channels.

20. The method of claim 18 wherein the size of the frame ranges from 0 to $N_{max}-\rho s-z$ symbols, where $N_{max}$ is a predetermined value.

21. The method of claim 18 further comprising:

determining a difference $\Theta(K)$ between a bit error rate prior to decoding and a target bit error rate ($p_e$) based on one or more values of a length of the information field K within a range from 0 to $N_{max}-\rho s-z$, where $N_{max}$ is a predetermined value, in accordance with the following relationship:

$$\Theta(K) = \omega\left(\frac{\alpha}{sn_{eff}}(K + \rho s + zs)\right)\left(1 - 2^{\frac{\alpha}{2sn_{eff}}(K+\rho s+zs)}\right) \times$$

$$\mathrm{erfc}\left(\sqrt{3 \cdot 10^{\gamma_{eff}/10}/\left(2^{\frac{\alpha}{sn_{eff}}(K+\rho s+zs)+1} - 2\right)}\right) \times \left[2 - \left(1 - 2^{\frac{\alpha}{2sn_{eff}}(K+\rho s+zs)}\right)\mathrm{erfc}\left(\sqrt{3 \cdot 10^{\gamma_{eff}/10}/\left(2^{\frac{\alpha}{sn_{eff}}(K+\rho s+zs)+1} - 2\right)}\right)\right] - $$

$$\left[1 - \left(1 - W(s, z, K, k)\varepsilon_s^{\frac{1}{k(0.5 \cdot sz+1)}}\right)^{1/\alpha}\right]$$

wherein $p_{QAM}$ represents a probability of error in transmitting a quadrature-amplitude-modulation waveform representing a $2^b$ point constellation; and comparing the value of $\Theta(0)$ and $\Theta(N_{max}-\rho s-sz)$ to 0; and setting the value of K in response to the comparing.

22. The method of claim 21 wherein when $\Theta(0)<0$ and $\Theta(N_{max}-\rho s-sz)<0$ setting $K=N_{max}-\rho s-sz$.

23. The method of claim 18 further comprising:

setting $b(\gamma_{eff}, s, z)$ equal to $(\alpha N_{max})/(s n_{eff})$ for all values of $\gamma_{eff}$ and z.

24. The method of claim 18 wherein when $\Theta(0)>0$ and $\Theta(N_{max}-\rho s-sz)>0$, setting $K=N_{max}-\rho$.

25. The method of claim 24 further comprising:
setting s=1 and z=0.

26. An apparatus for determining an optimum bit load per subchannel in a multicarrier system with forward error correction, comprising:
  means for computing a number of bit positions b of a quadrature-amplitude-modulation symbol based on one or more values of a number of symbols in an information field K and one or more values of a number of control code symbols per discrete-multi-tone symbol z, to provide one or more determined values of b, in accordance with the following relationship:

$$1 - \left(1 - W(s, z, K)\varepsilon_s^{\frac{1}{0.5 \cdot sz+1}}\right)^{1/\alpha} =$$

$$\omega(b(\gamma_{\mathit{eff}}, s, z))(1 - 2^{-b(\gamma_{\mathit{eff}}, s, z)/2}) \mathrm{erfc}\left(\sqrt{3 \cdot 10^{\gamma_{\mathit{eff}}/10} / \left(2^{b(\gamma_{\mathit{eff}}, s, z)+1} - 2\right)}\right),$$

$$\text{and} \times \left[2 - (1 - 2^{-b(\gamma_{\mathit{eff}}, s, z)/2}) \mathrm{erfc}\left(\sqrt{3 \cdot 10^{\gamma_{\mathit{eff}}/10} / \left(2^{b(\gamma_{\mathit{eff}}, s, z)+1} - 2\right)}\right)\right]$$

$$W(s, z, K) = \left[\frac{\Gamma(K + \rho s + sz)}{\Gamma(K + \rho s + 0.5 \cdot sz)\Gamma(0.5 \cdot sz + 1)}\right]^{-1/(0.5 \cdot sz+1)}$$

$$\omega(b) = \frac{4}{2b+3}, \text{ and}$$

$$\Gamma(x) = (x-1)!,$$

s represents a number of discrete-multi-tone symbols in a frame, $\epsilon_s$ represents a symbol error rate, $\alpha$ represents the size of a code symbol, $\rho$ represents a framing mode index, $\omega(b)$ represents an average fraction of erroneous bits in an erroneous b-sized quadrature-amplitude-modulation symbol, $\gamma_{\mathit{eff}}$ represents an effective signal-to-noise ratio, and $n_{\mathit{eff}}$ represents an effective number of subchannels; and
  means for selecting the value of K and the value of z which provides a maximum number of bit positions based on the one or more determined values of b.

27. The apparatus of claim 26 wherein the effective signal-to-noise ratio $\gamma_{\mathit{eff}}$ is an average signal-to-noise ratio of at least a subset of the channels.

28. The apparatus of claim 26 wherein the size of the frame ranges from 0 to $N_{max}$–s–zs symbols, where $N_{max}$ is a predetermined value.

29. The apparatus of claim 26 further comprising:
  means for determining a difference $\Theta(K)$ between a bit error rate prior to decoding and a target bit error rate ($p_e$) based on one or more values of a length of an information field K within a range from 0 to $N_{max}$–$\rho$s–sz, where $N_{max}$ is a predetermined value, in accordance with the following relationship:

$$\Theta(K) = \omega(b(\gamma_{\mathit{eff}}, s, z)) p_{QAM} - p_e, \text{ and}$$

$$\omega(b(\gamma_{\mathit{eff}}, s, z)) p_{QAM} = \omega\left(\frac{\alpha}{sn_{\mathit{eff}}}(K + \rho s + zs)\right)\left(1 - 2^{-\frac{\alpha}{2sn_{\mathit{eff}}}(K+\rho s+zs)}\right) \times$$

$$\mathrm{erfc}\left(\sqrt{3 \cdot 10^{\gamma_{\mathit{eff}}/10} / \left(2^{\frac{\alpha}{sn_{\mathit{eff}}}(K+\rho s+zs)+1} - 2\right)}\right) \times$$

$$\left[2 - \left(1 - 2^{-\frac{\alpha}{2sn_{\mathit{eff}}}(K+\rho s+zs)}\right)\mathrm{erfc}\left(\sqrt{3 \cdot 10^{\gamma_{\mathit{eff}}/10} / \left(2^{\frac{\alpha}{sn_{\mathit{eff}}}(K+\rho s+zs)+1} - 2\right)}\right)\right]$$

-continued $$p_e = \left[1 - \left(1 - W(s, z, K)\varepsilon_s^{\frac{1}{0.5 \cdot sz+1}}\right)^{1/\alpha}\right]$$

wherein $p_{QAM}$ represents a probability of error in transmitting a quadrature-amplitude-modulation waveform representing a $2^b$ point constellation; and
  means for comparing the value of $\Theta(0)$ and $\Theta(N_{max}$–s–zs) to 0; and
  means for setting the value of K in response to the means for comparing.

30. The apparatus of claim 29 wherein when $\Theta(0)<0$ and $\Theta(N_{max}$–s–sz)<0, said means for setting sets K=$N_{max}$–s–zs.

31. The apparatus of claim 30 further comprising:
  means for setting $b(\gamma_{\mathit{eff}}, s, z)$ equal to $(\alpha N_{max})/(s\, n_{\mathit{eff}})$ for all values of $\gamma_{\mathit{eff}}$ and z.

32. The apparatus of claim 30 wherein when $\Theta(0)>0$ and $\Theta(N_{max}$–s–sz)>0, said means for setting sets K=$N_{max}$–1.

33. The apparatus of claim 32 wherein said means for setting sets s=1 and z=0.

34. An apparatus for selecting forward error correction parameters in a channel having a plurality of subchannels in a multicarrier communications system, comprising:
  means for storing, in a table, selected sets of forward error correction parameters and associated net coding gains from using the sets, the selected sets including at least a number (s) of discrete multi-tone symbols in a forward-error-correction frame and a number (z) of forward-error-correction control symbols in each discrete multi-tone symbol, the sets and associated net coding gains corresponding to combinations of a signal-to-noise ratio and a number of subchannels carrying discrete multi-tone symbol signals;
  means for determining a signal-to-noise ratio representing a set of the plurality of subchannels carrying the discrete multi-tone symbol signals; and
  means for selecting a particular set of forward error correction parameters for the channel based on at least the signal-to-noise ratio representing the set of the plurality of subchannels and the net coding gain for the particular set.

35. The apparatus of claim 34 wherein the net coding gains are stored as bilinear approximations.

36. An apparatus for selecting forward error correction parameters in a channel having a plurality of subchannels in a multicarrier communications system, comprising:
  means for storing, in a table, selected sets of forward error correction parameters and associated net coding gains from using the sets, the selected sets including at least a number (s) of discrete multi-tone symbols in a forward-error-correction frame, a number (z) of forward-error-correction control symbols in each discrete multi-tone symbol, and a maximum number of transmissions (k), the sets and associated net coding gains corresponding to combinations of a signal-to-noise ratio and a number of subchannels carrying discrete multi-tone symbol signals;
  means for determining a signal-to-noise ratio representing a set of the plurality of subchannels carrying discrete multi-tone symbol signals; and
  means for selecting a particular set of forward error correction parameters for the channel based on at least the signal-to-noise ratio representing the set of the plurality of subchannels and the net coding gain for the particular set.

37. The apparatus of claim 36 wherein the net coding gains are stored as bilinear approximations.

38. The apparatus of claim 36 wherein the values of s and z are in accordance with the G.dmt standard.

39. The apparatus of claim 38 wherein the values of s and z are in accordance with the G.lite standard, such that a subset of the tables associated with the values of s and z in accordance with the G.dmt standard are used when the channel uses the G.lite standard.

40. An apparatus for increasing a bit load of a multicarrier system comprising a channel having a plurality of subchannels, comprising:

means for determining a bit load for at least one subchannel based on a target symbol error rate $\epsilon_s$, a maximum number of symbol errors that can be corrected t, a number of symbols in an information field K, a maximum number of transmissions k, and a number of bits per subchannel; and means for selecting a maximum number of symbol errors t, the number of symbols in the information field K and the maximum number of transmissions k, such that a net coding gain is increased wherein the means for selecting also selects t, K and k such that no forward error correction is applied when the number of subchannels exceeds a predetermined threshold number of subchannels.

41. An apparatus for determining an optimum bit load per subchannel in a multicarrier system with forward error correction, comprising:

means for computing one or more values of a number of bit positions b of a quadrature-amplitude-modulation symbol based on one or more values of a number of symbols in an information field K, one or more values of a number of control code symbols per discrete-multi-tone symbol z, and a maximum number of transmissions k, to provide one or more determined values of b, in accordance with the following relationship:

$$1 - \left(1 - W(s, z, K, k)\varepsilon_S^{\frac{1}{k(0.5sz+1)}}\right)^{1/\alpha} =$$

$$\omega(b(\gamma_{e\!f\!f}, s, z))\left(1 - 2^{-b(\gamma_{e\!f\!f}, s, z)/2}\right)\mathrm{erfc}\left(\sqrt{3 \cdot 10^{\gamma_{e\!f\!f}/10} / \left(2^{b(\gamma_{e\!f\!f}, s, z)+1} - 2\right)}\right) \times$$

$$\left[2 - \left(1 - 2^{-b(\gamma_{e\!f\!f}, s, z)/2}\right) \times \mathrm{erfc}\left(\sqrt{3 \cdot 10^{\gamma_{e\!f\!f}/10} / \left(2^{b(\gamma_{e\!f\!f}, s, z)+1} - 2\right)}\right)\right]$$

$$W(s, z, K, k) = \left[\frac{\Gamma(K + \rho s + sz)}{\Gamma(K + \rho s + 0.5 \cdot sz)\Gamma(0.5 \cdot sz + 1)}\right]^{-1/(0.5 \cdot sz+1)} \times$$

$$\left[\frac{\Gamma(K + \rho s + sz + 1)}{\Gamma(K + \rho s + 0.5 \cdot sz)\Gamma(0.5 \cdot sz + 2)}\right]^{-(k-1)/(0.5 \cdot sz+1)k}$$

$$b(\gamma_{e\!f\!f}, s, z) = \frac{\alpha}{sn_{e\!f\!f}}(K + \rho s + zs)$$

$$\omega(b) = \frac{4}{2b+3}, \text{ and}$$

$$\Gamma(x) = (x-1)!,$$

s represents a number of discrete-multi-tone symbols in a frame, $\epsilon_s$ represents a symbol error rate, $\alpha$ represents the size of a code symbol, $\omega(b)$ represents an average fraction of erroneous bits in an erroneous b-sized quadrature-amplitude-modulation symbol, $\gamma_{e\!f\!f}$ represents an effective signal-to-noise ratio, and $\rho$ represents framing mode index; and $n_{e\!f\!f}$ represents an effective number of subchannels; and means for selecting the value of K and z to provide a maximum number of bit positions based on the one or more determined values of b.

42. The apparatus of claim 41 wherein the effective signal-to-noise ratio $\gamma_{e\!f\!f}$ is an average signal-to-noise ratio of at least a subset of the channels.

43. The apparatus of claim 41 wherein the size of the frame ranges from 0 to $N_{max}-\rho s-sz$ symbols, where $N_{max}$ is a predetermined value.

44. The apparatus of claim 41 further comprising:

means for determining a difference $\Theta(K)$ between a bit error rate prior to decoding and a target bit error rate $(p_e)$ in accordance with the following relationship:

$$\Theta(K) = \omega\left(\frac{\alpha}{sn_{e\!f\!f}}(K + \rho s + zs)\right)\left(1 - 2^{-\frac{\alpha}{2sn_{e\!f\!f}}(K+\rho s+zs)}\right) \times$$

$$\mathrm{erfc}\left(\sqrt{3 \cdot 10^{\gamma_{e\!f\!f}/10} / \left(2^{\frac{\alpha}{sn_{e\!f\!f}}(K+\rho s+zs)+1} - 2\right)}\right) \times \left[2 - \left(1 - \right.\right.$$

$$\left.\left.2^{-\frac{\alpha}{2sn_{e\!f\!f}}(K+\rho s+zs)}\right)\mathrm{erfc}\left(\sqrt{3 \cdot 10^{\gamma_{e\!f\!f}/10} / \left(2^{\frac{\alpha}{sn_{e\!f\!f}}(K+\rho s+zs)+1} - 2\right)}\right)\right] -$$

$$\left[1 - \left(1 - W(s, z, K, k)\varepsilon_S^{\frac{1}{k(0.5 \cdot sz+1)}}\right)^{1/\alpha}\right]$$

wherein $p_{QAM}$ represents a probability of error in transmitting a quadrature-amplitude-modulation waveform representing a $2^b$ point constellation;

means for comparing the value of $\Theta(0)$ and $\Theta(N_{max}-\rho s-zs)$ to 0; and means for setting the value of K in response to the comparing.

45. The apparatus of claim 44 wherein when $\Theta(0)<0$ and $\Theta(N_{max}-\rho s-sz)<0$, said means for setting sets $K=N_{max}-\rho s-zs$.

46. The apparatus of claim 45 further comprising: means for setting $b(\gamma_{e\!f\!f}, s, z)$ equal to $(\alpha\, N_{max})/(s\, n_{e\!f\!f})$ for all values of $\gamma_{e\!f\!f}$ and z.

47. The apparatus of claim 41 wherein when $\Theta(0)>0$ and $\Theta(N_{max}-\rho s-sz)>0$, said means for setting sets $K=N_{max}-\rho$.

48. The apparatus of claim 47 wherein said means for setting sets s=1 and z=0.

49. A method of selecting forward error correction parameters in a channel having a plurality of subchannels in a multicarrier communications system, comprising:

storing, in one or more tables, net coding gains for a plurality of values of signal-to-noise ratios and numbers of subchannels, the net coding gains corresponding to particular sets of forward error correction parameters, the sets including a number (s) of discrete multi-tone symbols in a forward-error-correction frame, a number (z) of forward-error-correction control symbols, and a maximum number of transmissions (k);

determining a signal-to-noise ratio representing a subset of the subchannels to provide a representative performance measurement; and selecting from the tables a particular set of values of s, z and k based on at least the representative performance measurement and the net coding gains.

50. The method of claim 49 wherein the net coding gains are stored as bilinear approximations.

51. The method of claim 49 wherein and the values of s and z are in accordance with the G.dmt standard.

* * * * *